US00RE36100E

United States Patent [19]

Kondo et al.

[11] E Patent Number: Re. 36,100

[45] Reissued Date of Patent: Feb. 16, 1999

[54] SOFTWARE ASSET SYSTEMIZER

[75] Inventors: Syuji Kondo, Kawasaki; Kenji Ohkushi, Tokyo, both of Japan

[73] Assignee: Fujitsu Limited, Kawasaki, Japan

[21] Appl. No.: 736,585

[22] Filed: Oct. 24, 1996

Related U.S. Patent Documents

Reissue of:

[64] Patent No.: 5,361,355
Issued: Nov. 1, 1994
Appl. No.: 833,119
Filed: Feb. 10, 1992

[30] Foreign Application Priority Data

Feb. 8, 1991 [JP] Japan ..... 3-039076
May 16, 1991 [JP] Japan ..... 3-111283

[51] Int. Cl.[6] ..... G06F 9/44

[52] U.S. Cl. ..... 395/701; 395/712

[58] Field of Search ..... 395/701, 704, 395/712

[56] References Cited

U.S. PATENT DOCUMENTS 4,435,759 3/1984 Baum et al. ..... 364/200
4,558,413 12/1985 Schmidt et al. ..... 395/700
4,937,740 6/1990 Agarwal et al. ..... 364/200
5,101,491 3/1992 Katzeff ..... 395/500

*Primary Examiner*—Kevin A. Kriess

[57] ABSTRACT

A software asset systemizing apparatus which arranges existing software assets. A language determinant keyword storing unit stores keywords for judging the descriptive language names of software assets. An asset name analysis keyword storing unit stores keywords for analyzing the asset names of the software assets. A characteristic information analysis keyword storing unit analyzes characteristics of the software assets. An interrelated asset analysis keyword storing unit stores keywords for analyzing interrelations among the software assets. A software asset analyzing unit executes analyses for software assets by using contents stored in the language determinant keyword storing unit, asset name analysis keyword storing unit, characteristic information analysis keyword storing unit and interrelation asset analysis keyword storing unit An intermediate asset information storing unit stores works-in-process of the analyses by the software asset analyzing unit. An asset information storing unit stores, as asset information for the software assets, finalized results of the analyses by software asset analyzing unit. An asset systemizing information outputting unit outputs an arranged result obtained by systemizing asset information stored in the asset information storing unit.

21 Claims, 65 Drawing Sheets

FIG. 5A

RECORD FORMAT OF LANGUAGE DETERMINANT KEYWORD TABLE 21

| DETERMINANT CONDITIONS | | DETERMINED RESULT |
|---|---|---|
| LANGUAGE DETERMINANT KEYBOARD | COLUMN POSITION | DESCRIPTIVE LANGUAGE NAME |

FIG. 5B

RECORD FORMAT OF ASSET NAME ANALYSIS KEYWORD TABLE 22

| ANALYSIS CONDITIONS | | | | ANALYSIS RESULTS | |
|---|---|---|---|---|---|
| ASSET NAME ANALYSIS KEYWORD | COLUMN POSITION | DESCRIPTIVE LANGUAGE NAME | ASSET NAME OBTAINING CONDITION | ASSET TYPE | ASSET UNIT |

FIG. 5C

RECORD FORMAT OF CHARACTERISTIC INFORMATION ANALYSIS KEYWORD TABLE 23

| ANALYSIS CONDITIONS | | | ANALYSIS RESULT |
|---|---|---|---|
| CHARACTERISTIC INFORMATION ANALYSIS KEYWORD | COLUMN POSITION | DESCRIPTIVE LANGUAGE NAME | ASSET CHARACTERISTIC |

FIG. 5D

RECORD FORMAT OF INTERRELATED ASSET ANALYSIS KEYWORD TABLE 24

| ANALYSIS CONDITIONS | | | | | ANALYSIS RESULTS | | |
|---|---|---|---|---|---|---|---|
| PARENT ASSET | | | | | CHILD ASSET | | |
| DESCRIPTIVE LANGUAGE NAME | ASSET TYPE | ASSET UNIT | INTERRELATED ASSET ANALYSIS KEYWORD | COLUMN POSITION | DESCRIPTIVE LANGUAGE NAME | ASSET TYPE | ASSET UNIT |

FIG. 6A

RECORD FORMAT OF BASIC ASSET INFORMATION INTERMEDIATE TABLE 27

| LIBRARY NAME | MEMBER NAME | LANGUAGE | ASSET NAME | ASSET TYPE | ASSET UNIT | ASSET EXISTENCE | USAGE NUMBERS | ASSET CHARACT-ERISTIC | IDENTICAL ASSET EXISTENCE |
|---|---|---|---|---|---|---|---|---|---|

FIG. 6B

RECORD FORMAT OF INTERRELATED ASSET INFORMATION INTERMEDIATE TABLE 28

| PARENT ASSET | | | | | | CHILD ASSET | | | |
|---|---|---|---|---|---|---|---|---|---|
| LIBRARY NAME | MEMBER NAME | LANGUAGE | ASSET NAME | ASSET TYPE | ASSET UNIT | ASSET EXISTENCE | ASSET NAME | ASSET TYPE | ASSET UNIT | LANGUAGE | ASSET EXISTENCE |

FIG. 7A

RECORD FORMAT OF BASIC ASSET INFORMATION 29a

| LIBRARY NAME | MEMBER NAME | LANGUAGE | ASSET NAME | ASSET TYPE | ASSET UNIT | ASSET EXISTENCE | USAGE NUMBERS | ASSET CHARACT-ERISTIC | IDENTICAL ASSET EXISTENCE |
|---|---|---|---|---|---|---|---|---|---|

FIG. 7B

RECORD FORMAT OF INTERRELATED ASSET INFORMATION 29b

| PARENT ASSET | | | | | | CHILD ASSET | | | |
|---|---|---|---|---|---|---|---|---|---|
| LIBRARY NAME | MEMBER NAME | LANGUAGE | ASSET NAME | ASSET TYPE | ASSET UNIT | ASSET NAME | ASSET TYPE | ASSET UNIT | LANGUAGE |

FIG. 10A

| SEQUENCE COLUMN POSITION | MARKER REGION | REGION A | REGION B | IDENTIFICATION COLUMN POSITION |
|---|---|---|---|---|
| COLUMNS 01 ~ 06 | COLUMN 07 | COLUMNS 08 ~ 11 | COLUMNS 12 ~ 72 | COLUMNS 73 ~ 80 |

FIG. 10B

| SEQUENCE COLUMN POSITION | MARKER REGION | REGION A | REGION B |
|---|---|---|---|
| COLUMNS 01 ~ 06 | COLUMN 07 | COLUMNS 08 ~ 11 | COLUMNS 12 ~ 251(MAX) |

FIG. 10C

| CONTROL COLUMN POSITION | OPERATION COLUMN POSITION | OPERAND COLUMN POSITION | CONTINUATION COLUMN POSITION | SEQUENCE COLUMNS POSITION |
|---|---|---|---|---|
| COLUMN 01 ~ COLUMN 06 | | | COLUMN 72 | COLUMNS 73 ~ 80 |

FIG. 11

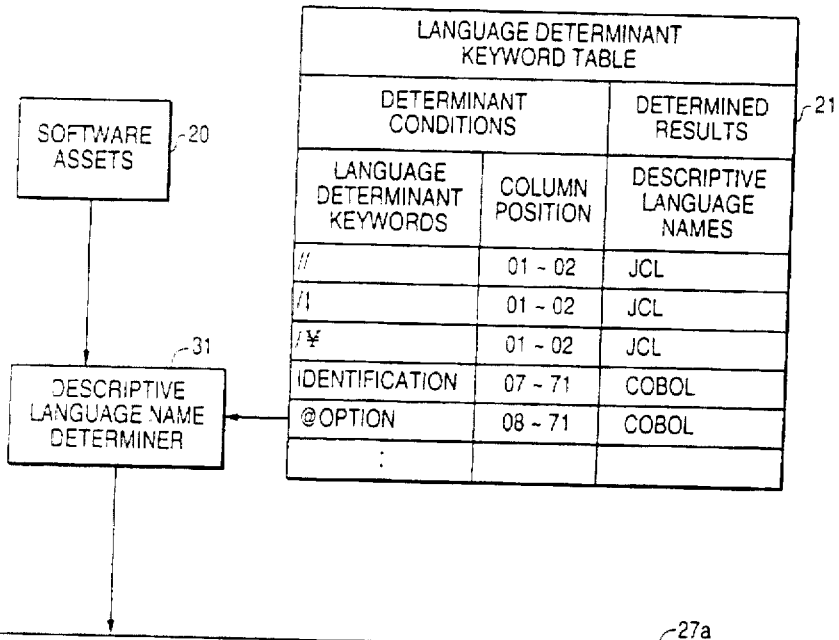

| LANGUAGE DETERMINANT KEYWORD TABLE | | |
|---|---|---|
| DETERMINANT CONDITIONS | | DETERMINED RESULTS |
| LANGUAGE DETERMINANT KEYWORDS | COLUMN POSITION | DESCRIPTIVE LANGUAGE NAMES |
| // | 01 ~ 02 | JCL |
| /! | 01 ~ 02 | JCL |
| /¥ | 01 ~ 02 | JCL |
| IDENTIFICATION | 07 ~ 71 | COBOL |
| @OPTION | 08 ~ 71 | COBOL |
| : | | |

27a

| BASIC ASSET INFORMATION INTERMEDIATE TABLE | | | | | | | | | |
|---|---|---|---|---|---|---|---|---|---|
| LIBRARY NAMES | MEMBER NAMES | DESCRIPTIVE LANGUAGE NAMES | ASSET NAMES | ASSET TYPES | ASSET UNITS | ASSET EXIS-TENCES | USAGE NUM-BERS | ASSET CHARACTER-ISTICS | IDENTICAL ASSET EXISTENCES |
| JCLLIB | MEM1 | JCL | | | | YES | 0 | | |
| JCLLIB | MEM2 | JCL | | | | YES | 0 | | |
| PGMLIB1 | MEM3 | COBOL | | | | YES | 0 | | |
| PGMLIB1 | MEM4 | COBOL | | | | YES | 0 | | |
| CPYLIB | MEM5 | | | | | YES | 0 | | |
| CPYLIB | MEM6 | | | | | YES | 0 | | |
| CPYLIB | MEM7 | | | | | YES | 0 | | |
| PGMLIB2 | MEM8 | COBOL | | | | YES | 0 | | |
| PGMLIB2 | MEM9 | COBOL | | | | YES | 0 | | |

FIG. 12A

BASIC ASSET INFORMATION INTERMEDIATE TABLE

| LIBRARY NAMES | MEM-BER NAMES | DESCRIPTIVE LANGUAGE NAMES | ASSET NAMES | ASSET TYPES | ASSET UNITS | ASSET EXIS-TENCES | USAGE NUM-BERS | ASSET CHAR-ACTER-ISTICS | IDENTICAL ASSET EXISTENCES |
|---|---|---|---|---|---|---|---|---|---|
| JCLLIB | MEM1 | JCL | | | | YES | 0 | | |
| JCLLIB | MEM2 | JCL | | | | YES | 0 | | |
| PGMLIB1 | MEM3 | COBOL | | | | YES | 0 | | |
| PGMLIB1 | MEM4 | COBOL | | | | YES | 0 | | |
| CPYLIB | MEM5 | | | | | YES | 0 | | |
| CPYLIB | MEM6 | | | | | YES | 0 | | |
| CPYLIB | MEM7 | | | | | YES | 0 | | |
| PGMLIB2 | MEM8 | COBOL | | | | YES | 0 | | |
| PGMLIB2 | MEM9 | COBOL | | | | YES | 0 | | |

27a

TO FIG. 12B

FIG. 12C

FROM FIG. 12B

27b

BASIC ASSET INFORMATION INTERMEDIATE TABLE

| LIBRARY NAMES | MEM-BER NAMES | DESCRIPTIVE LANGUAGE NAMES | ASSET NAMES | ASSET TYPES | ASSET UNITS | ASSET EXIS-TENCES | USAGE NUM-BERS | ASSET CHAR-ACTER-ISTICS | IDENTICAL ASSET EXISTENCES |
|---|---|---|---|---|---|---|---|---|---|
| JCLLIB | MEM1 | JCL | JOB1 | JOB | | YES | 0 | | |
| JCLLIB | MEM2 | JCL | MEM2 | JOB | CATALOGED PROCEDURE | YES | 0 | | |
| PGMLIB1 | MEM3 | COBOL | PGM1 | PROGRAM | | YES | 0 | | |
| PGMLIB1 | MEM4 | COBOL | PGM2 | PROGRAM | | YES | 0 | | |
| CPYLIB | MEM5 | | MEM5 | | | YES | 0 | | |
| CPYLIB | MEM6 | | MEM6 | | | YES | 0 | | |
| CPYLIB | MEM7 | | MEM7 | | | YES | 0 | | |
| PGMLIB2 | MEM8 | COBOL | PGM4 | PROGRAM | | YES | 0 | | |
| PGMLIB2 | MEM9 | COBOL | PGM4 | PROGRAM | | YES | 0 | | |

FIG. 13A

BASIC ASSET INFORMATION INTERMEDIATE TABLE

| LIBRARY NAMES | MEM-BER NAMES | DESCRIPTIVE LANGUAGE NAMES | ASSET NAMES | ASSET TYPES | ASSET UNITS | ASSET EXIS-TENCES | USAGE NUM-BERS | ASSET CHAR-ACTER-ISTICS | IDENTICAL ASSET EXISTENCES |
|---|---|---|---|---|---|---|---|---|---|
| JCLLIB | MEM1 | JCL | JOB1 | JOB | | YES | 0 | | |
| JCLLIB | MEM2 | JCL | MEM2 | JOB | CATALOGED PROCEDURE | YES | 0 | | |
| PGMLIB1 | MEM3 | COBOL | PGM1 | PROGRAM | | YES | 0 | | |
| PGMLIB1 | MEM4 | COBOL | PGM2 | PROGRAM | | YES | 0 | | |
| CPYLIB | MEM5 | | MEM5 | | | YES | 0 | | |
| CPYLIB | MEM6 | | MEM6 | | | YES | 0 | | |
| CPYLIB | MEM7 | | MEM7 | | | YES | 0 | | |
| PGMLIB2 | MEM8 | COBOL | PGM4 | PROGRAM | | YES | 0 | | |
| PGMLIB2 | MEM9 | COBOL | PGM4 | PROGRAM | | YES | 0 | | |

27b

TO FIG. 13B

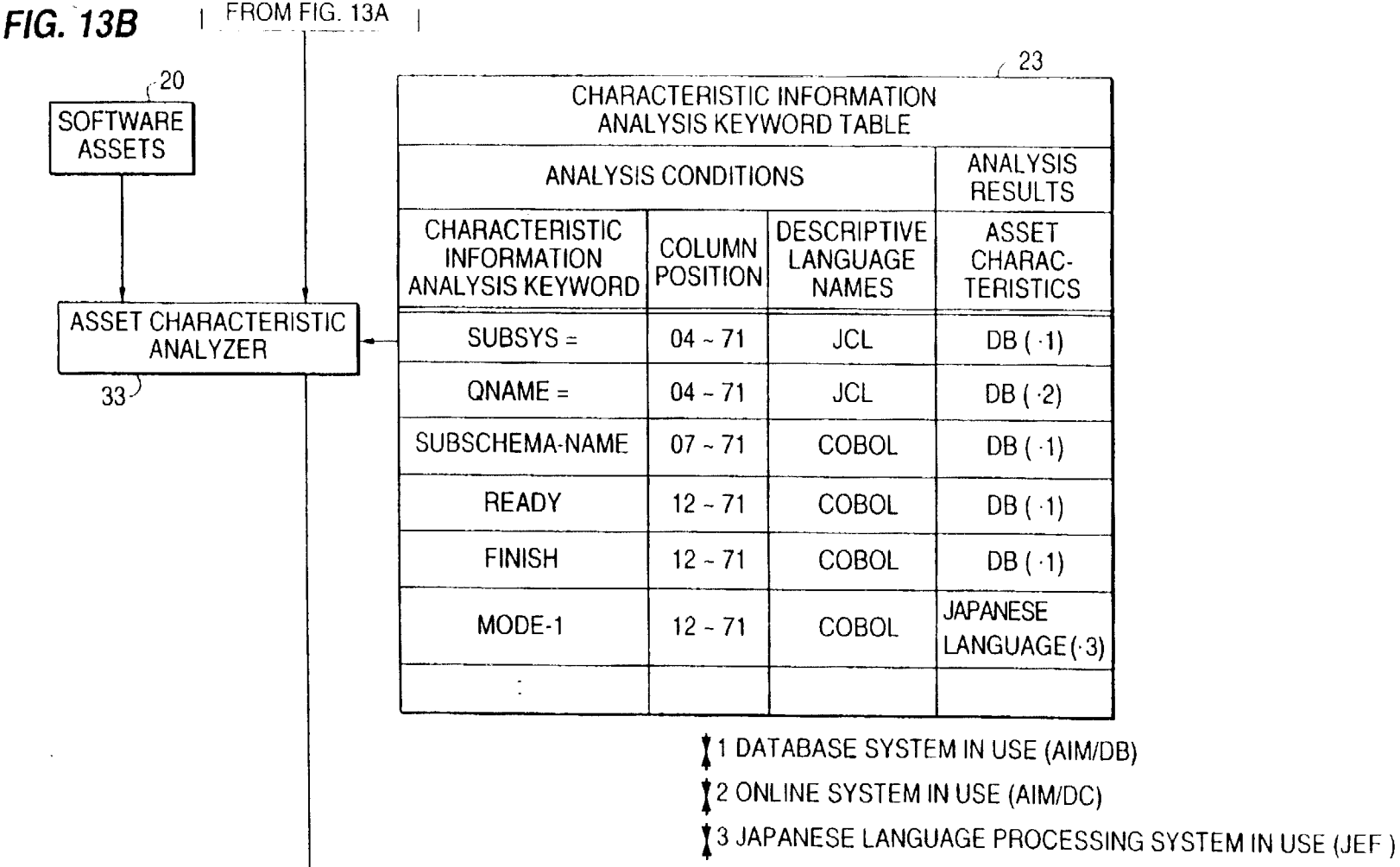
FIG. 13B
FROM FIG. 13A
20
SOFTWARE ASSETS
ASSET CHARACTERISTIC ANALYZER
33
23
CHARACTERISTIC INFORMATION ANALYSIS KEYWORD TABLE
ANALYSIS CONDITIONS
ANALYSIS RESULTS
CHARACTERISTIC INFORMATION ANALYSIS KEYWORD
COLUMN POSITION
DESCRIPTIVE LANGUAGE NAMES
ASSET CHARAC-TERISTICS
SUBSYS =
04 ~ 71
JCL
DB (·1)
QNAME =
04 ~ 71
JCL
DB (·2)
SUBSCHEMA-NAME
07 ~ 71
COBOL
DB (·1)
READY
12 ~ 71
COBOL
DB (·1)
FINISH
12 ~ 71
COBOL
DB (·1)
MODE-1
12 ~ 71
COBOL
JAPANESE LANGUAGE (·3)
1 DATABASE SYSTEM IN USE (AIM/DB)
2 ONLINE SYSTEM IN USE (AIM/DC)
3 JAPANESE LANGUAGE PROCESSING SYSTEM IN USE (JEF)
TO FIG. 13C

FIG. 13C

FROM FIG. 13B

27c

BASIC ASSET INFORMATION INTERMEDIATE TABLE

| LIBRARY NAMES | MEMBER NAMES | DESCRIPTIVE LANGUAGE NAMES | ASSET NAMES | ASSET TYPES | ASSET UNITS | ASSET EXISTENCES | USAGE NUMBERS | ASSET CHARACTERISTICS | IDENTICAL ASSET EXISTENCES |
|---|---|---|---|---|---|---|---|---|---|
| JCLLIB | MEM1 | JCL | JOB1 | JOB | | YES | 0 | DB | |
| JCLLIB | MEM2 | JCL | MEM2 | JOB | CATALOGED PROCEDURE | YES | 0 | | |
| PGMLIB1 | MEM3 | COBOL | PGM1 | PROGRAM | | YES | 0 | DB | |
| PGMLIB1 | MEM4 | COBOL | PGM2 | PROGRAM | | YES | 0 | | |
| CPYLIB | MEM5 | | MEM5 | | | YES | 0 | | |
| CPYLIB | MEM6 | | MEM6 | | | YES | 0 | | |
| CPYLIB | MEM7 | | MEM7 | | | YES | 0 | | |
| PGMLIB2 | MEM8 | COBOL | PGM4 | PROGRAM | | YES | 0 | | |
| PGMLIB2 | MEM9 | COBOL | PGM4 | PROGRAM | | YES | 0 | JAPANESE LANGUAGE | |

FIG. 14A

27c

BASIC ASSET INFORMATION INTERMEDIATE TABLE

| LIBRARY NAMES | MEM-BER NAMES | DESCRIPTIVE LANGUAGE NAMES | ASSET NAMES | ASSET TYPES | ASSET UNITS | ASSET EXIS-TENCE | USAGE NUM-BERS | ASSET CHAR-ACTER-ISTICS | IDENTICAL ASSET EXISTENCES |
|---|---|---|---|---|---|---|---|---|---|
| JCLLIB | MEM1 | JCL | JOB1 | JOB | | YES | 0 | DB | |
| JCLLIB | MEM2 | JCL | MEM2 | JOB | CATALOGED PROCEDURE | YES | 0 | | |
| PGMLIB1 | MEM3 | COBOL | PGM1 | PROGRAM | | YES | 0 | DB | |
| PGMLIB1 | MEM4 | COBOL | PGM2 | PROGRAM | | YES | 0 | | |
| CPYLIB | MEM5 | | MEM5 | | | YES | 0 | | |
| CPYLIB | MEM6 | | MEM6 | | | YES | 0 | | |
| CPYLIB | MEM7 | | MEM7 | | | YES | 0 | | |
| PGMLIB2 | MEM8 | COBOL | PGM4 | PROGRAM | | YES | 0 | | |
| PGMLIB2 | MEM9 | COBOL | PGM4 | PROGRAM | | YES | 0 | JAPANESE LAN-GUAGE | |

TO FIG. 14B

FIG. 14B

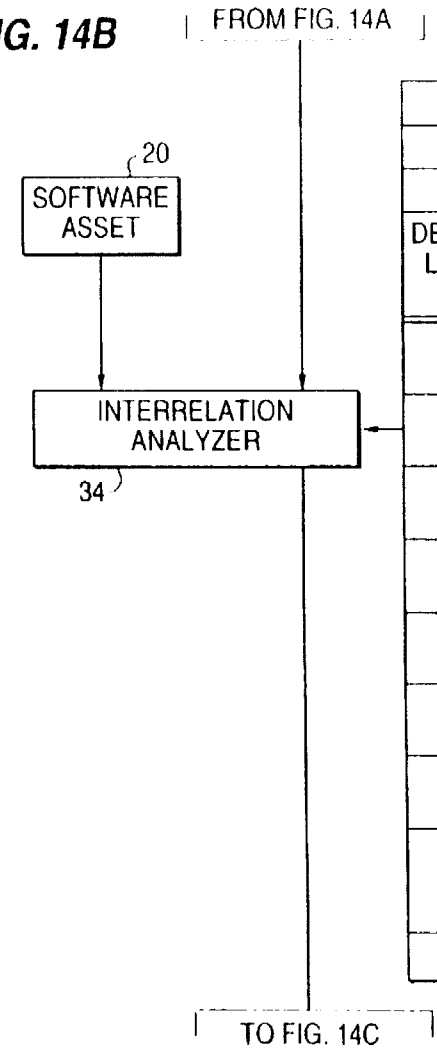

24

| INTERRELATED ASSET ANALYSIS KEYWORD TABLE | | | | | | | |
|---|---|---|---|---|---|---|---|
| ANALYSIS CONDITIONS | | | | | ANALYSIS RESULT | | |
| PARENT ASSETS | | | | | CHILD ASSET | | |
| DESCRIPTIVE LANGUAGE NAME | ASSET TYPES | ASSET UNITS | INTERRELATED ASSET ANALYSIS KEYWORDS | COLUMN POSITIONS | DESCRIPTIVE LANGUAGE NAMES | ASSET TYPES | ASSET UNITS |
| JCL | JOB | | EXEC PROC = | 04 ~ 71 | JCL | JOB | CATALOGED PROCEDURE |
| JCL | JOB | | EXEC PGM = | 04 ~ 71 | | PROGRAM | MAIN PROGRAM |
| JCL | JOB | | EXEC | 04 ~ 71 | JCL | JOB | CATALOGED PROCEDURE |
| JCL | JOB | CATALOGED PROCEDURE | INCLUDE | 04 ~ 71 | JCL | JOB | CATALOGED PROCEDURE |
| JCL | JOB | CATALOGED PROCEDURE | EXEC PGM = | 04 ~ 71 | | PROGRAM | MAIN PROGRAM |
| COBOL | PROGRAM | | CALL | 07 ~ 71 | | PROGRAM | SUB-ROUTINE |
| COBOL | PROGRAM | | COPY | 07 ~ 71 | COBOL | PROGRAM | COPIED PROGRAM |
| COBOL | PROGRAM | | SUBSCHEMA-NAME | 07 ~ 71 | ADL | ENVIRON-MENT DEF-INITION | SUB-SCHEMA |
| ⋮ | | | | | | | |

FIG. 14C

FROM FIG. 14B

28a

INTERRELATED ASSET INFORMATION INTERMEDIATE TABLE

| PARENT ASSETS | | | | | | | CHILD ASSETS | | | | |
|---|---|---|---|---|---|---|---|---|---|---|---|
| LIBRARY NAMES | MEM-BER NAMES | DESCRIPTIVE LANGUAGE NAMES | ASSET NAMES | ASSET TYPES | ASSET UNITS | ASSET EXIS-TENCES | ASSET NAMES | ASSET TYPES | ASSET UNITS | DESCRIPTIVE LANGUAGE NAMES | ASSET EXIS-TENCES |
| JCLLIB | MEM1 | JCL | JOB1 | JOB | | YES | MEM2 | JOB | CATALOGED PROCEDURE | JCL | NO |
| JCLLIB | MEM2 | JCL | MEM2 | JOB | CATALOGED PROCEDURE | YES | PGM1 | PROGRAM | MAIN PROGRAM | | NO |
| PGMLIB1 | MEM3 | COBOL | PGM1 | PROGRAM | | YES | MEM10 | ENVIRON-MENT DEF-INITION | SUB-SCHEMA | ADL | NO |
| PGMLIB1 | MEM3 | COBOL | PGM1 | PROGRAM | | YES | MEM5 | PROGRAM | COPIED PROGRAM | COBOL | NO |
| PGMLIB1 | MEM3 | COBOL | PGM1 | PROGRAM | | YES | PGM2 | PROGRAM | SUB-ROUTINE | | NO |
| PGMLIB1 | MEM3 | COBOL | PGM1 | PROGRAM | | YES | MEM6 | PROGRAM | COPIED PROGRAM | COBOL | NO |
| PGMLIB1 | MEM4 | COBOL | PGM2 | PROGRAM | | YES | MEM5 | PROGRAM | COPIED PROGRAM | COBOL | NO |
| PGMLIB1 | MEM4 | COBOL | PGM2 | PROGRAM | | YES | PGM3 | PROGRAM | SUB-ROUTINE | | NO |

FIG. 15A-1

27c

BASIC ASSET INFORMATION INTERMEDIATE TABLE

| LIBRARY NAMES | MEM-BER NAMES | DESCRIPTIVE LANGUAGE NAMES | ASSET NAMES | ASSET TYPES | ASSET UNITS | ASSET EXIS-TENCE | USAGE NUM-BERS | ASSET CHAR-ACTER-ISTICS | IDENTICAL ASSET EXISTENCES |
|---|---|---|---|---|---|---|---|---|---|
| JCLLIB | MEM1 | JCL | JOB1 | JOB | | YES | 0 | DB | |
| JCLLIB | MEM2 | JCL | MEM2 | JOB | CATALOGED PROCEDURE | YES | 0 | | |
| PGMLIB1 | MEM3 | COBOL | PGM1 | PROGRAM | | YES | 0 | DB | |
| PGMLIB1 | MEM4 | COBOL | PGM2 | PROGRAM | | YES | 0 | | |
| CPYLIB | MEM5 | | MEM5 | | | YES | 0 | | |
| CPYLIB | MEM6 | | MEM6 | | | YES | 0 | | |
| CPYLIB | MEM7 | | MEM7 | | | YES | 0 | | |
| PGMLIB2 | MEM8 | COBOL | PGM4 | PROGRAM | | YES | 0 | | |
| PGMLIB2 | MEM9 | COBOL | PGM4 | PROGRAM | | YES | 0 | JAPANESE LAN-GUAGE | |

TO FIG. 15A-2

FIG. 15A-2

FROM FIG. 15A-1

28a

INTERRELATED ASSET INFORMATION INTERMEDIATE TABLE

| PARENT ASSETS | | | | | | | CHILD ASSETS | | | | |
|---|---|---|---|---|---|---|---|---|---|---|---|
| LIBRARY NAMES | MEM-BER NAMES | DESCRIPTIVE LANGUAGE NAMES | ASSET NAMES | ASSET TYPES | ASSET UNITS | ASSET EXIS-TENCE | ASSET NAMES | ASSET TYPES | ASSET UNITS | DESCRIPTIVE LANGUAGE NAMES | ASSET EXIS-TENCE |
| JCLLIB | MEM1 | JCL | JOB1 | JOB | | YES | MEM2 | JOB | CATALOGED PROCEDURE | JCL | NO |
| JCLLIB | MEM2 | JCL | MEM2 | JOB | CATALOGED PROCEDURE | YES | PGM1 | PROGRAM | MAIN PROGRAM | | NO |
| PGMLIB1 | MEM3 | COBOL | PGM1 | PROGRAM | | YES | MEM10 | ENVIRON-MENT DEF-INITION | SUB-SCHEMA | ADL | NO |
| PGMLIB1 | MEM3 | COBOL | PGM1 | PROGRAM | | YES | MEM5 | PROGRAM | COPIED PROGRAM | COBOL | NO |
| PGMLIB1 | MEM3 | COBOL | PGM1 | PROGRAM | | YES | PGM2 | PROGRAM | SUB-ROUTINE | | NO |
| PGMLIB1 | MEM3 | COBOL | PGM1 | PROGRAM | | YES | MEM6 | PROGRAM | COPIED PROGRAM | COBOL | NO |
| PGMLIB1 | MEM4 | COBOL | PGM2 | PROGRAM | | YES | MEM5 | PROGRAM | COPIED PROGRAM | COBOL | NO |
| PGMLIB1 | MEM4 | COBOL | PGM2 | PROGRAM | | YES | PGM3 | PROGRAM | SUB-ROUTINE | | NO |

35

ASSET TYPE ANALYZER

TO FIG. 15A-3

FIG. 15A-3

FROM FIG. 15A-2

28b

INTERRELATED ASSET INFORMATION INTERMEDIATE TABLE

| PARENT ASSETS | | | | | | | CHILD ASSETS | | | | |
|---|---|---|---|---|---|---|---|---|---|---|---|
| LIBRARY NAMES | MEM-BER NAMES | DESCRIPTIVE LANGUAGE NAMES | ASSET NAMES | ASSET TYPES | ASSET UNITS | ASSET EXIS-TENCE | ASSET NAMES | ASSET TYPES | ASSET UNITS | DESCRIPTIVE LANGUAGE NAMES | ASSET EXIS-TENCE |
| JCLLIB | MEM1 | JCL | JOB1 | JOB | ..... | YES | MEM2 | JOB | CATALOGED PROCEDURE | JCL | NO |
| JCLLIB | MEM2 | JCL | MEM2 | JOB | CATALOGED PROCEDURE | YES | PGM1 | PROGRAM | MAIN PROGRAM | COBOL | NO |
| PGMLIB1 | MEM3 | COBOL | PGM1 | PROGRAM | MAIN PROGRAM | YES | MEM10 | ENVIRON-MENT DEF-INITION | SUB-SCHEMA | ADL | NO |
| PGMLIB1 | MEM3 | COBOL | PGM1 | PROGRAM | MAIN PROGRAM | YES | MEM5 | PROGRAM | COPIED PROGRAM | COBOL | NO |
| PGMLIB1 | MEM3 | COBOL | PGM1 | PROGRAM | MAIN PROGRAM | YES | PGM2 | PROGRAM | SUB-ROUTINE | COBOL | NO |
| PGMLIB1 | MEM3 | COBOL | PGM1 | PROGRAM | MAIN PROGRAM | YES | MEM6 | PROGRAM | COPIED PROGRAM | COBOL | NO |
| PGMLIB1 | MEM4 | COBOL | PGM2 | PROGRAM | SUB-ROUTINE | YES | MEM5 | PROGRAM | COPIED PROGRAM | COBOL | NO |
| PGMLIB1 | MEM4 | COBOL | PGM2 | PROGRAM | SUB-ROUTINE | YES | PGM3 | PROGRAM | SUB-ROUTINE | ..... | NO |

a

FIG. 15B-1

27d a

BASIC ASSET INFORMATION INTERMEDIATE TABLE
(REAL ASSET INFORMATION)

| LIBRARY NAMES | MEMBER NAMES | DESCRIPTIVE LANGUAGE NAMES | ASSET NAMES | ASSET TYPES | ASSET UNITS | ASSET EXISTENCE | USAGE NUMBERS | ASSET CHARACTERISTICS | IDENTICAL ASSET EXISTENCES |
|---|---|---|---|---|---|---|---|---|---|
| JCLLIB | MEM1 | JCL | JOB1 | JOB | ..... | YES | 0 | DB | |
| JCLLIB | MEM2 | JCL | MEM2 | JOB | CATALOGED PROCEDURE | YES | 0 | | |
| PGMLIB1 | MEM3 | COBOL | PGM1 | PROGRAM | MAIN PROGRAM | YES | 0 | DB | |
| PGMLIB1 | MEM4 | COBOL | PGM2 | PROGRAM | SUB-ROUTINE | YES | 0 | | |
| CPYLIB | MEM5 | COBOL | MEM5 | PROGRAM | COPIED PROGRAM | YES | 0 | | |
| CPYLIB | MEM6 | COBOL | MEM6 | PROGRAM | COPIED PROGRAM | YES | 0 | | |
| CPYLIB | MEM7 | | MEM7 | | | YES | 0 | | |
| PGMLIB2 | MEM8 | COBOL | PGM4 | PROGRAM | | YES | 0 | | |
| PGMLIB2 | MEM9 | COBOL | PGM4 | PROGRAM | | YES | 0 | JAPANESE LANGUAGE | |

TO FIG. 15B-2

FIG. 15B-2

FROM FIG. 15B-1

27d

BASIC ASSET INFORMATION INTERMEDIATE TABLE
(CHILD ASSET INFORMATION OF INTERRELATED ASSET INFORMATION)

| LIBRARY NAMES | MEMBER NAMES | DESCRIPTIVE LANGUAGE NAMES | ASSET NAMES | ASSET TYPES | ASSET UNITS | ASSET EXISTENCE | USAGE NUMBERS | ASSET CHARACTERISTICS | IDENTICAL ASSET EXISTENCES |
|---|---|---|---|---|---|---|---|---|---|
| ..... | ..... | JCL | MEM2 | JOB | CATALOGED PROCEDURE | NO | 1 | ..... | |
| ..... | ..... | COBOL | PGM1 | PROGRAM | MAIN PROGRAM | NO | 1 | ..... | |
| ..... | ..... | ADL | MEM10 | ENVIRONMENT DEFINITION | SUB-SCHEMA | NO | 1 | ..... | |
| ..... | ..... | COBOL | MEM5 | PROGRAM | COPIED PROGRAM | NO | 1 | ..... | |
| ..... | ..... | COBOL | PGM2 | PROGRAM | SUB-ROUTINE | NO | 1 | ..... | |
| ..... | ..... | COBOL | MEM6 | PROGRAM | COPIED PROGRAM | NO | 1 | ..... | |
| ..... | ..... | COBOL | MEM5 | PROGRAM | COPIED PROGRAM | NO | 1 | ..... | |
| ..... | ..... | ..... | PGM3 | PROGRAM | SUB-ROUTINE | NO | 1 | ..... | |

FIG. 16A-1

27d

BASIC ASSET INFORMATION INTERMEDIATE TABLE
(REAL ASSET INFORMATION)

| LIBRARY NAMES | MEM-BER NAMES | DESCRIPTIVE LANGUAGE NAMES | ASSET NAMES | ASSET TYPES | ASSET UNITS | ASSET EXIS-TENCES | USAGE NUM-BERS | ASSET CHAR-ACTER-ISTICS | IDENTICAL ASSET EXISTENCES |
|---|---|---|---|---|---|---|---|---|---|
| JCLLIB | MEM1 | JCL | JOB1 | JOB | ..... | YES | 0 | DB | |
| JCLLIB | MEM2 | JCL | MEM2 | JOB | CATALOGED PROCEDURE | YES | 0 | | |
| PGMLIB1 | MEM3 | COBOL | PGM1 | PROGRAM | MAIN PROGRAM | YES | 0 | DB | |
| PGMLIB1 | MEM4 | COBOL | PGM2 | PROGRAM | SUB-ROUTINE | YES | 0 | | |
| CPYLIB | MEM5 | COBOL | MEM5 | PROGRAM | COPIED PROGRAM | YES | 0 | | |
| CPYLIB | MEM6 | COBOL | MEM6 | PROGRAM | COPIED PROGRAM | YES | 0 | | |
| CPYLIB | MEM7 | | MEM7 | | | YES | 0 | | |
| PGMLIB2 | MEM8 | COBOL | PGM4 | PROGRAM | | YES | 0 | | |
| PGMLIB2 | MEM9 | COBOL | PGM4 | PROGRAM | | YES | 0 | JAPANESE LAN-GUAGE | |

TO FIG. 16A-2

FIG. 16A-3

FROM FIG. 16A-2

29a

BASIC ASSET INFORMATION COMPLETE TABLE

| LIBRARY NAMES | MEMBER NAMES | DESCRIPTIVE LANGUAGE NAMES | ASSET NAMES | ASSET TYPES | ASSET UNITS | ASSET EXISTENCES | USAGE NUMBERS | ASSET CHARACTERISTICS | IDENTICAL ASSET EXISTENCES |
|---|---|---|---|---|---|---|---|---|---|
| JCLLIB | MEM1 | JCL | JOB1 | JOB | ..... | YES | 0 | DB | NO |
| JCLLIB | MEM2 | JCL | MEM2 | JOB | CATALOGED PROCEDURE | YES | 1 | ..... | NO |
| PGMLIB1 | MEM3 | COBOL | PGM1 | PROGRAM | MAIN PROGRAM | YES | 1 | DB | NO |
| PGMLIB1 | MEM4 | COBOL | PGM2 | PROGRAM | SUB-ROUTINE | YES | 1 | DB | NO |
| CPYLIB | MEM5 | COBOL | MEM5 | PROGRAM | COPIED PROGRAM | YES | 2 | ..... | NO |
| CPYLIB | MEM6 | COBOL | MEM6 | PROGRAM | COPIED PROGRAM | YES | 1 | ..... | NO |
| CPYLIB | MEM7 | ..... | MEM7 | ..... | ..... | YES | 0 | ..... | NO |
| PGMLIB2 | MEM8 | COBOL | PGM4 | PROGRAM | ..... | YES | 0 | ..... | YES(3) |
| PGMLIB2 | MEM9 | COBOL | PGM4 | PROGRAM | ..... | YES | 0 | JAPANESE LANGUAGE DB | YES(3) |
| ..... | ..... | ADL | MEM10 | ENVIRONMENT DEFINITION | SUB-SCHEMA | NO | 1 | ..... | NO |
| ..... | ..... | ..... | PGM3 | PROGRAM | SUB-ROUTINE | NO | 1 | ..... | NO |

b

FIG. 16B b

29b

| INTERRELATED ASSET INFORMATION | | | | | | | | | |
|---|---|---|---|---|---|---|---|---|---|
| PARENT ASSETS | | | | | | CHILD ASSET | | | |
| LIBRARY NAMES | MEM-BER NAMES | DESCRIPTIVE LANGUAGE NAMES | ASSET NAMES | ASSET TYPES | ASSET UNITS | ASSET NAMES | ASSET TYPES | ASSET UNITS | DESCRIPTIVE LANGUAGE NAMES |
| JCLLIB | MEM1 | JCL | JOB1 | JOB | ..... | MEM2 | JOB | CATALOGED PROCEDURE | JCL |
| JCLLIB | MEM2 | JCL | MEM2 | JOB | CATALOGED PROCEDURE | PGM1 | PROGRAM | MAIN PROGRAM | COBOL |
| PGMLIB1 | MEM3 | COBOL | PGM1 | PROGRAM | MAIN PROGRAM | MEM10 | ENVIRON-MENT DEF-INITION | SUB-SCHEMA | ADL |
| PGMLIB1 | MEM3 | COBOL | PGM1 | PROGRAM | MAIN PROGRAM | MEM5 | PROGRAM | COPIED PROGRAM | COBOL |
| PGMLIB1 | MEM3 | COBOL | PGM1 | PROGRAM | MAIN PROGRAM | PGM2 | PROGRAM | SUB-ROUTINE | COBOL |
| PGMLIB1 | MEM3 | COBOL | PGM1 | PROGRAM | MAIN PROGRAM | MEM6 | PROGRAM | COPIED PROGRAM | COBOL |
| PGMLIB1 | MEM4 | COBOL | PGM2 | PROGRAM | SUB-ROUTINE | MEM5 | PROGRAM | COPIED PROGRAM | COBOL |
| PGMLIB1 | MEM4 | COBOL | PGM2 | PROGRAM | SUB-ROUTINE | PGM3 | PROGRAM | SUB-ROUTINE | ..... |

FIG. 22A

| | CONCENTRATION KEYS | | ASSET EXISTENCES | USAGE NUMBERS |
|---|---|---|---|---|
| | ASSET TYPES | ASSET NAMES | | |
| RECORD ( i ) | CPY | C1 | 0 | 1 |
| RECORD ( ii ) | CPY | C1 | 1 | 0 |
| RECORD (iii ) | JOB | J1 | 1 | 0 |
| RECORD (iv ) | PGM | P1 | 0 | 1 |
| RECORD ( v ) | PGM | P1 | 1 | 0 |
| RECORD (vi ) | PGM | P4 | 0 | 1 |

FIG. 22B

RECORD ( ii ) CONCENTRATION INFORMATION RECORD

| CPY | C1 | 1 | 1 |
|---|---|---|---|

USAGE NUMBER TALLYING AREA 1

OUTPUT CONCENTRATION INFORMATION RECORD
TURN SAVE FLAG OFF
CLEAR VALUE IN USAGE NUMBER TALLYING AREA

FIG. 22C

RECORD ( iii ) CONCENTRATION INFORMATION RECORD

| JOB | J1 | 1 | 0 |
|---|---|---|---|

USAGE NUMBER TALLYING AREA 0

OUTPUT CONCENTRATION INFORMATION RECORD
TURN SAVE FLAG OFF

FIG. 22D

CONTENTS OF CONCENTRATION INFORMATION FILE

| | | | |
|---|---|---|---|
| CPY | C1 | 1 | 1 |
| JOB | J1 | 1 | 0 |
| PGM | P1 | 1 | 1 |
| PGM | P4 | 0 | 1 |

FIG. 23A

| | | | | |
|---|---|---|---|---|
| RECORD (a) | CPY | C1 | 0 | 1 |
| RECORD (b) | CPY | C1 | 0 | 1 |
| RECORD (c) | PGM | C1 | 0 | 1 |
| RECORD (d) | PGM | C2 | 1 | 0 |

FIG. 23B

| | | | | |
|---|---|---|---|---|
| | CPY | C1 | 0 | 2 |

OUTPUT COPY C1 0 2

CLEAR VALUE IN USAGE NUMBER TALLYING AREA

| | | | | |
|---|---|---|---|---|
| SAVE AREA | PGM | C1 | 0 | |

INCREMENT USAGE FROM ZERO TO ONE

FIG. 23C

| | | | |
|---|---|---|---|
| PGM | C1 | 0 | 1 |

OUTPUT PGM C1 0 1

CLEAR USAGE NUMBER TALLYING AREA

FIG. 23D

| | | | |
|---|---|---|---|
| PGM | C2 | 1 | 0 |

OUTPUT PGM C2 0 1

TURN SAVE FLAG OFF
CLEAR USAGE NUMBER TALLYING AREA

FIG. 23E

| | | | |
|---|---|---|---|
| CPY | C1 | 0 | 2 |
| PGM | C1 | 0 | 1 |
| PGM | C2 | 1 | 0 |

CONTENTS OF CONCENTRATION INFORMATION FILE

FIG. 24A

| BASIC ASSET INFORMATION | | | | | | | | | |
|---|---|---|---|---|---|---|---|---|---|
| LIBRARY NAMES | MEM-BER NAMES | DESCRIPTIVE LANGUAGE NAMES | ASSET NAMES | ASSET TYPES | ASSET UNITS | ASSET EXIS-TENCES | USAGE NUM-BERS | ASSET CHAR-ACTER-ISTICS | IDENTICAL ASSET EXISTENCES |
| JCLLIB | MEM1 | JCL | JOB1 | JOB | ..... | YES | 0 | DB | NO |
| JCLLIB | MEM2 | JCL | MEM2 | JOB | CATALOGED PROCEDURE | YES | 1 | ..... | NO |
| PGMLIB1 | MEM3 | COBOL | PGM1 | PROGRAM | MAIN PROGRAM | YES | 1 | DB | NO |
| PGMLIB1 | MEM4 | COBOL | PGM2 | PROGRAM | SUB-ROUTINE | YES | 1 | ..... | NO |
| CPYLIB | MEM5 | COBOL | MEM5 | PROGRAM | COPIED PROGRAM | YES | 2 | ..... | NO |
| CPYLIB | MEM6 | COBOL | MEM6 | PROGRAM | COPIED PROGRAM | YES | 1 | ..... | NO |
| CPYLIB | MEM7 | ..... | MEM7 | ..... | ..... | YES | 0 | ..... | NO |
| PGMLIB2 | MEM8 | COBOL | PGM4 | PROGRAM | ..... | YES | 0 | ..... | YES(3) |
| PGMLIB2 | MEM9 | COBOL | PGM4 | PROGRAM | ..... | YES | 0 | JAPANESE LAN-GUAGE | YES(3) |
| ..... | ..... | ADL | MEM10 | ENVIRON-MENT DEF-INITION | SUB-SCHEMA | NO | 1 | ..... | NO |
| ..... | ..... | ..... | PGM3 | PROGRAM | SUB-ROUTINE | NO | 1 | ..... | NO |

29a

TO FIG. 24B

FIG. 24B

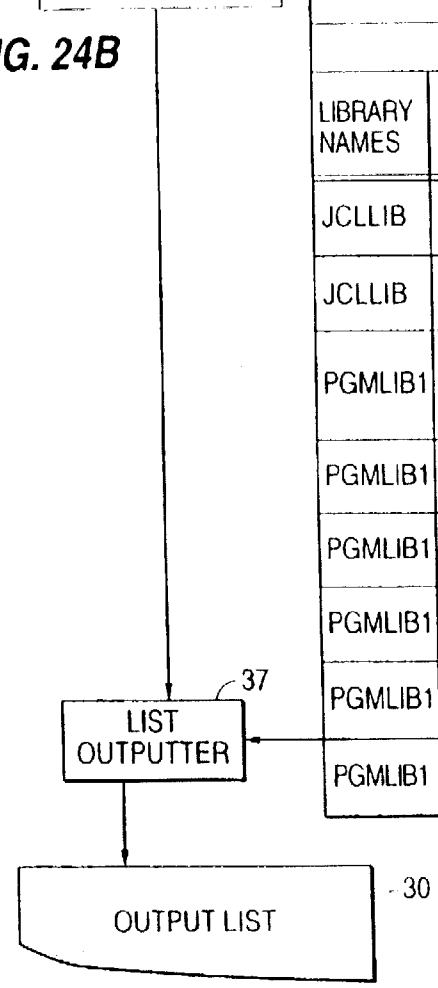

29b

| INTERRELATED ASSET INFORMATION | | | | | | | | | |
|---|---|---|---|---|---|---|---|---|---|
| PARENT ASSETS | | | | | | CHILD ASSETS | | | |
| LIBRARY NAMES | MEM-BER NAMES | DESCRIPTIVE LANGUAGE NAMES | ASSET NAMES | ASSET TYPES | ASSET UNITS | ASSET NAMES | ASSET TYPES | ASSET UNITS | DESCRIPTIVE LANGUAGE NAMES |
| JCLLIB | MEM1 | JCL | JOB1 | JOB | ..... | MEM2 | JOB | CATALOGED PROCEDURE | JCL |
| JCLLIB | MEM2 | JCL | MEM2 | JOB | CATALOGED PROCEDURE | PGM1 | PROGRAM | MAIN PROGRAM | COBOL |
| PGMLIB1 | MEM3 | COBOL | PGM1 | PROGRAM | MAIN PROGRAM | MEM10 | ENVIRON-MENT DEF-INITION | SUB-SCHEMA | ADL |
| PGMLIB1 | MEM3 | COBOL | PGM1 | PROGRAM | MAIN PROGRAM | MEM5 | PROGRAM | COPIED PROGRAM | COBOL |
| PGMLIB1 | MEM3 | COBOL | PGM1 | PROGRAM | MAIN PROGRAM | PGM2 | PROGRAM | SUB-ROUTINE | COBOL |
| PGMLIB1 | MEM3 | COBOL | PGM1 | PROGRAM | MAIN PROGRAM | MEM6 | PROGRAM | COPIED PROGRAM | COBOL |
| PGMLIB1 | MEM4 | COBOL | PGM2 | PROGRAM | SUB-ROUTINE | MEM5 | PROGRAM | COPIED PROGRAM | COBOL |
| PGMLIB1 | MEM4 | COBOL | PGM2 | PROGRAM | SUB-ROUTINE | PGM3 | PROGRAM | SUB-ROUTINE | ..... |

ASSET TYPE CLASSIFIED INFORMATION LIST

| NO. | ASSET NAME | ASSET TYPE | SEQUENCE NOS. | MEMBER/MODULE NAME | VOLUME SEQUENCE NUMBERS | RECORD LENGTHS | CONSISTS | FORMATS | NOTES |
|---|---|---|---|---|---|---|---|---|---|
| 1 | C1 | COBOL-COPY | 1 | C1 | VOL001 | 80 | F | P0 | |
| 2 | JOB1 | JOB | 2 | J1 | VOL001 | 80 | F | P0 | |
| 3 | P1 | COBOL | 3 | P1 | VOL001 | 80 | F | P0 | |
| 4 | P2 | COBOL | 4 | P2 | VOL001 | 80 | F | P0 | |
| 5 | S1 | COBOL | 5 | S1 | VOL001 | 80 | F | P0 | |
| 6 | S3 | COBOL | 6 | S3 | VOL001 | 80 | F | P0 | |

IDENTICAL ASSET CHECK LIST

TRIAL TYPE : PROGRAM

| NO. | ASSET NAME | IDENTICAL ASSET SEQUENCE NOS. | MEMBER/ MODULE NAME | LIBRARY NAME | VOLUME SEQUENCE NUMBERS |
|---|---|---|---|---|---|
| 1 | S1 | 1 | S1 | GYOMU. POLIB | VOL001 |
| | | 2 | S3 | GYOMU. POLIB | VOL001 |

DEFICIENT ASSET LIST

| NO. | DEFICIENT ASSETS | (ASSET TYPES) | DIRECTLY USED ASSETS | | NOS. OF USED ASSETS |
|---|---|---|---|---|---|
| 1 | S2 | (PROGRAM) | P1 (PROGRAM) | P2 (PROGRAM) | 2 |
| | | | | | |
| | | | | | |

UNUSED ASSET LIST

| NO. | UNUSED ASSETS | (ASSET TYPES) | DIRECTLY CONTROLLED ASSETS (SEE REMARKS BELOW) | NOS. OF CONT. ASSETS |
|---|---|---|---|---|
| 1 | P2 | (PROGRAM) | S2 ! (PROGRAM) S3 ↑ (PROGRAM)<br>C1 (COPY) | 3 |
| | | | | |
| | | | | |

(REMARKS: ! IS FOR DEFICIENT ASSET,
↑ IS FOR PRIVATE ASSET,
AND NO MARK IS FOR PUBLIC ASSET.)

FIG. 32

SIMPLIA-MF-SOFTRADAR V30L20 MSP 91.10.25 TIME 17.13.49 PAGE 1

ASSET GLANCE LIST

OUTPUTTING ASSET LIST IN GLANCE FORMAT CLASSIFIED BY ASSET TYPES CHECKING ASSET EXISTENCE IN SOURCE ASSET LIBRARY AND ASSET CHARACTERISTIC

LIBRARY GROUP: G1
ASSET TYPE : PROGRAM

| NO. | ASSET TYPES | MEMBER NAMES | LIBRARY NAMES | CONSISTS | CHARACTERISTICS INFORMATION | | | | STEP NOS |
|---|---|---|---|---|---|---|---|---|---|
| 1 | BNY100 INVENTORY ACCEPTANCE | BNY100 | GYOMU.SOC.GEMLIB | GEM | BATCH COPY/INCLUDE | COBOL SORT/MERGE | MAIN TRANSACTION | CALL AIM.DB | 2,313 |
| 2 | BNY10010 PREPARATION FOR INVENTORY ACCEPTANCE | BNY10010 | GYOMU.SOC.GEMLIB | GEM | BATCH | COBOL | SUB | COPY/ INCLUDE | 1,009 |
| 3 | BNY1002X REMAINING AFTER INVENTORY ACCEPTANCE | BNY10020 | GYOMU.KADO.JCL | GEM | COBOL | ALIAS | | | |
| 4 | BNY10020 CONSUMMATION OF INVENTORY ACCEPTANCE | BNY10020 | GYOMU.KADO.JCL | GEM | BATCH CALL | COBOL COPY/ INCLUDE | SUB | ENTRY | 1,236 |
| 5 | BNY200 INVENTORY RECONCILIATION | BNY200 | GYOMU.SOC.GEMLIB | GEM | BATCH COPY/INCLUDE | COBOL SORT/MERGE | MAIN | CALL | 1,508 |
| 6 | OZAIKOAC INVENTORY RELEASE ACCESS | OZAIKOAC | GYOMU.SOC.GEMLIB | GEM | BATCH | ASM | | | 956 |
| 7 | OZA100 INVENTORY RELEASE TRANSACTION | OZA100 | GYOMU.SOC.GEMLIB | GEM | AIM/DC COPY/INCLUDE | COBOL | MAIN | CALL | 3,200 |
| 8 | PGM00001 | MEN00001 | GYOMU.SOC.GEMLIB | GEM | BATCH CALL VSAM | COBOL COPY/INCLUDE TRANSACTION | MAIN SORT/MERGE AIM/DB | ENTRY JEF | 2,010 |
| | | | | | | | | SUM TOTAL | 12,232 |

FIG. 33A

SIMPLIA/MF-SOFTRADAR V30L20 MSP

LIBRARY GROUP : G1 CONSIST: GEM LIBRARY NAME: GYOMU.SOC.GEMLIB

| NOS. | MEMBER NAME | ASSET TYPES | | |
|---|---|---|---|---|
| 1 | BNY100 | PROGRAM | ASSET NAME | BNY100 |
| | | | CHARACTERISTICS INFORMATION | BATCH |
| | | | SUPPLEMENTARY INFORMATION | JEF<br>STEP NUMBER:<br>ENTRY NAME: |
| | | | INTERRELATION INFORMATION | PROGRAM |
| | | | INTERRELATION INFORMATION | SUBSCHEMA |
| | | | INTERRELATION INFORMATION | COBOL-COPY |
| | | | INTERRELATION INFORMATION | DO NAME<br>COBOL-COPY |
| | | | INTERRELATION INFORMATION | DO NAME<br>COBOL-COPY |
| | | | INTERRELATION INFORMATION | DO NAME<br>REC-TYPE |
| | | | INTERRELATION INFORMATION | DML INSTRUCTION<br>FILE |
| | | | INTERRELATION INFORMATION | DO NAME<br>FILE |
| | | | | DO NAME |
| 2 | MEM00001 | PROGRAM | ASSET NAME | PGM0001 |
| | | | CHARACTERISTICS INFORMATION | BATCH |
| | | | SUPPLEMENTARY INFORMATION | STEP NUMBER: |
| | | | INTERRELATION INFORMATION | COBOL-COPY<br>DO NAME |
| | | | INTERRELATION INFORMATION | COBOL-COPY<br>DO NAME |
| ≈ | ≈ | ≈ | ≈ | |

TO FIG. 33B

TO FIG. 33B

FIG. 33B

ANALYSIS INFORMATION LIST 91.11.11 TIME 16.48.06 PAGE 1

OUTPUTTING LIST OBTAINED BY ANALYSIS ASSETS. ANALYSIS INFORMATION COMPRISING ASSET CHARACTERISTIC INFORMATION, SUPPLEMENTARY INFORMATION UNIQUE TO ASSET TYPE, INTERRELATION INFORMATION WITH OTHER ASSETS, PRESENTING ASSET FEATURES.

FROM FIG. 33A

ANALYSIS INFORMATION

```
INVENTORY ACCEPTANCE          JOB NAME: INVENTORY CONTROL JOB          USAGE NUMBER:  30
  COBOL                       MAIN    ENTRY                    CALL    COPY/INCLUDE  SORT/MERGE
  VSAM                        AIM/DB  AIM/DS
      2,313  COMMENT NUMBER: 529   CONTROLLED PROGRAM NAME:
      BNY100XX  BNY100YY  BNY100ZZ
          :BNYDBACS                                                    ASSET EXISTENCE: YES
           DB ACCESS
           :SSHBNY10                                                   ASSET EXISTENCE: NO
           INVENTORY ACCEPTANCE SUBSCHEMA
           :CBNY1001                                                   ASSET EXISTENCE: YES
           INVENTORY ACCEPTANCE INPUT DATA
           :BNYUIN     SUBROUTINE NAME:        PURPOSE: FOR DATA       INCLUDE: UNUSED
           :CBNY1000                                                   ASSET EXISTENCE: YES
           INVENTORY ACCEPTANCE OUTPUT DATA
           :BNYUOUT     SUBROUTINE NAME:       PURPOSE: FOR DATA       INCLUDE: UNUSED
           :CBNY100P                                                   ASSET EXISTENCE: YES
           INVENTORY ACCEPTANCE UPDATION INTERCHANGE PARAMETER
           :            SUBROUTINE NAME :BNYDBACS   PURPOSE: FOR PARAMETERS  INCLUDE: UNUSED
           :RCTBNY10
           :MODIFY
           :INYUREC
           INVENTORY ACCEPTANCE INPUT FILE
           :BNYUIN      OPEN MODE : INPUT
           :ONYUREC
           INVENTORY ACCEPTANCE OUTPUT FILE
           :BNYUOOUT    OPEN MODE : OUTPUT
```

```
                              JOB NAME : INVENTORY CONTROL JOB          USAGE NUMBER:  30
  COBOL                       MAIN
      1,234 COMMENT NUMBER: 456   CONTROLLED PROGRAM NAME:
           :COPY0001                                                   ASSET EXISTENCE: YES
           :            SUBROUTINE NAME:        PURPOSE: FOR DATA       INCLUDE: UNUSED
           :COPY0001                                                   ASSET EXISTENCE: YES
           :            SUBROUTINE NAME:        PURPOSE: FOR DATA       INCLUDE: UNUSED
```

FROM FIG. 33A

FIG. 34A

SIMPLIA/MF-SOFTRADAR V30L20 MSP

JOB OUTLINE LIST

JOB NAME: INVENTORY ACCEPTANCE CONCENTRATION JOB
CONSIST: GEM
LIBRARY NAME: GYOMU.KADO.JCL

TO FIG. 34B

| NOS. | JOB NAME | PROCEDURE NAME | STEP | PROGRAM NAME |
|---|---|---|---|---|
| 1 | A1122002<br>INVENTORY ACCEPTANCE DAILY SUMMARY REPORT<br>MEMBER NAME:<br>(A1122002<br><br>(BATCH<br>(CATLG-PROC<br>(EXEC-PARM<br>(SYSPRINT<br>(OVERLAY<br>(FCB<br>(AIM/DB | CBNY1101<br><br>CBNY1102<br>CBNY1103 | 0001 | SORT<br>CHARACTERISTIC:<br><br>(UTILITY<br>(MAIN |
| | | | 0002 | BNY2000<br>INVENTORY ACCEPTANCE CONCENTRATION<br>CHARACTERISTIC:<br>(BATCH<br>(COBOL<br>(MAIN<br>(CALL<br>(COPY/INCLUDE<br>(JEF<br>(AIM/DB<br>(AIM/DS |
| | | | 0003 | BNY210<br>INVENTORY ACCEPTANCE LIST OUTPUT<br><br>CHARACTERISTIC:<br>(BATCH<br>(COBOL<br>(MAIN<br>(COPY/INCLUDE |

TO FIG. 34B

FIG. 34B 91.10.23 TIME 16.22.48 PAGE 1

OUTPUTTING JOB ASSET INFORMATION.
PRESENTING INFORMATION ON JOB PROGRAM EXECUTION AND PROGRAM UTILIZATION OF AIM ENVIRONMENT.

FROM FIG. 34A

| | DETAILED INFORMATION | 1 | 2 |
|---|---|---|---|
| AIMPED | PED-NAME: PEDBNY20 APG-NAME: APG00001 ACP-NAME:<br>AP-NAME: BNY200 SUBSCHEMA: SSHBNY20(MODIFY)<br>INVENTORY ACCEPTANCE CONCENTRATION TRN-POINT: PROGRAM<br>DB SCHEMA: SCHBNY21(READ-OLY) !SCHBNY22(MODIFY)<br>DS SCHEMA: !SCHBNY31(UPDATE) SCHBNY41(READ-OLY) | 2 | |
| SUBSCHEMA | ?SSHBNY2X<br>RECORD RCTBNY21 (GET ) RCTBNY22 (MODIFY )<br>RCTBNY23 (FIND ) !RCTBNY24 (STOREY )<br>RCTBNY25 (ERASE ) | 1 | 1 |
| COPY<br><br>SUBROUTINE | CBNY2001<br>!INVENTORY ACCEPTANCE<br>PRECONCENTRATED DATA<br>BNY21010<br>INVENTORY ACCEPTANCE CON-<br>CENTRATION SUBSIDIARY<br>ASSET 1<br><br>CBNY2000 !CBNY2001<br>INVENTORY ACCEPTANCE<br>POSTCONCENTRATED DATA<br>BNY21020<br>INVENTORY ACCEPTANCE CONCEN-<br>TRATION SUBSIDIARY ASSET 2 | 1 | |
| PARAMETER DO NAME | PARM=LINECOUNT=60, LIST=ALL, CHECK<br>001 BNYUIN OPEN=INPUT<br>FILE=INYUREC<br>002 BNYUOUT OPEN=OUTPUT<br>FILE=ONYUREC | | |
| COPY | CBNY2000<br>!INVENTORY ACCEPTANCE<br>POSTCONCENTRATED DATA<br><br>CBNY2200<br>INVENTORY ACCEPTANCE<br>LIST | | |

FROM FIG. 34A

FIG. 35

ASSET STATISTICAL LIST

PROGRAM ASSET CHARACTERISTIC TALLYING TABLE

| NO. | CHARACTERISTICS | USED PROGRAM NUMBERS | RATIOS |
|---|---|---|---|
| 1 | COBOL PROGRAM | 144 | 95% |
| 2 | ASM PROGRAM | 8 | 5% |
| 3 | ONLINE PROCESSES | 12 | 8% |
| 4 | BATCH PROCESSES | 140 | 92% |
| 5 | AIM/DC IN USE | 12 | 8% |
| 6 | AIM/DB IN USE | 12 | 8% |
| 7 | AIM/RDB IN USE | 13 | 9% |
| 8 | AIM/RDB 2 IN USE | 1 | 1% |
| 9 | ACS IN USE | 5 | 3% |
| 10 | WITH TRANSACTION CONTROL | 15 | 10% |
| 11 | VSAM IN USE | 11 | 7% |
| 12 | ENTRY COMMAND IN USE | 8 | 5% |
| 13 | DIFFERENT NAME ASSETS | 18 | 12% |
| 14 | SUBROUTINE IN USE | 140 | 92% |
| 15 | COPIED PHRASE IN USE | 129 | 85% |
| 16 | SORT/MERGE IN USE | 23 | 15% |
| 17 | JAPANESE LANGUAGE IN USE | 144 | 95% |
| 18 | COBOL SD IN USE | 33 | 22% |
| 19 | REPORT WRT IN USE | 10 | 7% |
| 20 | NESTS | 12 | 8% |
| 21 | BASIS | 1 | 1% |
| 22 | MAIN PROGRAM | 129 | 85% |
| 23 | SUB PROGRAM | 23 | 15% |
| | | | |
| | | | |

OUTPUTTING RESULT OF TALLYING PROGRAM ASSET CHARACTERISTICS, CHECKING USAGE OF MAIN PROGRAMS, SUB-PROGRAMS, COPIES PHRASES

| NO. | CHARACTERISTICS | USED PROGRAM NUMBERS | RATIOS |
|---|---|---|---|
| | | | |

SOFTWARE ASSET SYSTEMIZER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to an apparatus for analyzing and systemizing current software assets, such as programs and job control data, for a computer system. More particularly, it relates to an apparatus for providing discriminant criteria of software assets and for providing data showing the asset characteristics and their interrelation as a reference for efficiently systemizing the assets.

2. Description of the Related Art

Recently, computer systems form critical backbones in executing corporate strategies, and the corporate software for its business application ever increases in volume and play vital roles. However, the current larger-scale and more complicated software assets are not well maintained under current management method, and the affairs related to controlling the software assets need to be managed more efficiently and properly. It is an urgent requirement to provide an integrated maintenance environment, which is easy and comfortable to use, by grasping the status of current software assets on a up to date basis and systemizing them in a well maintained manner.

Software inventories of computer systems include job assets such as JCL (job control language), program assets such as those written in COBOL (common business oriented language), DB/DC environment definers such as ADL (a language for defining the operating environment information for AIM as an integrated online database) and ACS (a software tool for assisting the development of AIM application programs), and screen/form definers such as PSAM (an asset for defining/creating the screen and form formats).

When a system analyst and/or application designer systemizes various software assets such as programs and job control data, he has to acquire enough information on the exact languages in which those assets are written and their interrelations, duplication or deficient of assets so that he can appropriately perform his task without any delay. Therefore, it is imperative to know exactly which asset types are there in the first place.

In so doing, by reading the contents of the software assets to be systemized through a printout or a display, the programming language is determined by a unique character string. Also, by decoding the output according to specifications of the programming languages, the asset names and the asset types need to be identified.

Also, by detecting e.g. caller of subroutines, procedures, copies and schemers, the asset interrelations (parent/child relations) amongst the software inventories are determined. The data thus obtained are sorted in a table format to be used at a glance as software asset systemizing information.

FIG. 1 is a flowchart for explaining the prior art method of confirming the existence or nonexistence of a software asset.

[START] When the process starts, step S1 is invoked.

Step S1: The content of a designated software asset is analyzed. Then, step S2 is invoked.

Step S2: An interrelated asset is detected. Then, step S3 is invoked.

Step S3: The existence or nonexistence of the interrelated asset is examined by searching a library and its information is outputted. Then, the process ends. [END]

FIG. 2 shows a prior art example of confirming the existence or nonexistence of a software asset.

A software group 4 comprises program assets 5, 6 and 7. By applying the method illustrated in FIG. 1 to program asset 5 (having an asset name A), it is confirmed that program asset 6 is interrelated.

By applying the method illustrated in FIG. 1 to program asset 6 (having an asset name B), it is detected that interrelated asset C exists and that interrelated asset D does not exist. By applying the method illustrated in FIG. 1 to program asset 7 (having an asset name C), it is detected that interrelated asset D is deficient.

However, the prior art method illustrated in FIG. 1 has a disadvantage of taking too much time for systemizing assets. This is because the interrelated software assets are searched only as necessary and not in a systematic form. This in turn invites the possibility of searching for the same asset a number of times. For instance, FIG. 2 shows that the process for software asset 6 is for searching interrelated asset D and that the process for program asset 7 also is for searching interrelated asset D.

Creation of systemizing information relies heavily on human interactions which takes many steps as described above. Therefore, as the system becomes larger and more complicated, it not only takes much time and money but also tends to produce omissions of and misjudgments in those analyzing process.

However, attempts to automate the systemization have invariably failed, because there has been no suitable automating technique for precisely analyzing various asset types, descriptive language types, asset characteristics, deficient assets, duplicated assets, and identical assets, or for organizing the information obtained by analyzing interrelated assets. This has in turn hindered analyses and systemization of software assets.

SUMMARY OF THE INVENTION

This invention aims at realizing a software asset type determining processor, which automatically analyzes the contents of software assets, extracts the necessary information as systemizing information, and outputs it in a table.

A software asset systemizer made available by this invention enables larger scale more complicated software assets to be systemized efficiently and can be universally used by corporations in all industries having large software assets A feature of this invention resides in a software asset systemizing apparatus for systemizing existing software assets comprising a language determinant keyword storer, an asset name analysis keyword storer for storing keywords, a characteristic information analysis keyword storer, an interrelated asset analysis keyword storer, a software asset analyzer, an asset name analysis key word storer, an intermediate asset information storer, an asset information storer, and an asset systemizing information outputter.

The language determinant keyword storer stores keywords for judging the descriptive language names of software assets. The asset name analysis keyword storer stores keywords for analyzing the asset names of said software assets; a characteristic information analysis keyword storer analyzes characteristics of said software assets. The interrelated asset analysis keyword storer stores key words for analyzing interrelations among said software assets. The software asset analyzer executes analyses for software assets by using contents stored in said language determinant keyword storer, asset name analysis key word storer, characteristic information analysis keyword storer and interrelation asset analysis key word storer. An intermediate asset information storer stores works-in-process of said analyses by said software asset analyzer. The asset information storer stores, as asset information for said software assets, finalized results of said analyses by software asset analyzer. The asset systemizing information outputter outputs a systemized result obtained by systemizing asset information stored in said asset information storer.

BRIEF DESCRIPTION OF THE DRAWINGS

Those skilled in the arts can easily understand additional features and objects of this invention from the description of the preferred embodiments and attached drawings. In the drawings:

FIG. 5A shows a record format of the language determinant keyword table 21 shown in FIG. 4;

FIG. 5B shows a record format of the asset name analysis keyword table 22 shown in FIG. 4;

FIG. 5C shows a record format of the characteristic information analysis keyword table 23 shown in FIG. 4;

FIG. 5D shows a record format of the interrelated asset analysis keyword table 24 shown in FIG. 4;

FIG. 6A shows a record format of the basic asset information intermediate table 27 shown in FIG. 4;

FIG. 6B shows a record format of the interrelated asset information intermediate table 28 shown in FIG. 4;

FIG. 7A shows a record format of the basic asset information complete table 29a shown in FIG. 4;

FIG. 7B shows a record format of the interrelated asset information complete table 29b shown in FIG. 4;

FIG. 10A shows a fixed length coding format of COBOL;

FIG. 10B shows a variable length coding format of COBOL;

FIG. 10C shows a generic syntax of JCL;

FIG. 11 shows in detail the operations of the descriptive language name determiner 31 shown in FIG. 8;

FIGS. 12A, 12B and 12C show in detail the operations of the asset name analyzer 32 shown in FIG. 8;

FIGS. 13A, 13B and 13C show in detail the operations of the asset characteristic analyzer 33 shown in FIG. 8;

FIGS. 14A, 14B and 14C show in detail the operations of the interrelation analyzer 34 shown in FIG. 8;

FIGS. 15A-1, 15A-2 and 15A-3, and 15B-1 and 15B-2 show in detail the operations of the asset type determiner 35 shown in FIG. 8;

FIGS. 16A-1, 16A-2, and 16A-3 show in detail the operations of the asset existence analyzer 36 shown in FIG. 8;

FIGS. 22A through 22D show a concrete example of the concentration processes explained in FIGS. 21A and 21B;

FIGS. 23A through 23E show another concrete example of the concentration processes explained in FIGS. 21A and 21B;

FIGS. 24A and 24B are an explanatory chart of the list outputter 37 shown in FIG. 8;

FIG. 32 shows an asset over view list outputted in an easy-to-glance format classified by asset types;

FIGS. 33A and 33B show an analysis information list for outputting information obtained by analyzing software assets;

FIGS. 3A and 34B show an example of job outline list for outputting information on an executed program among job assets, DB/DC environment under which the program executed and so forth;

FIG. 35 shows an asset statistical list e.g. for outputting a result of tallying program asset characteristics;

DETAILED DESCRIPTION OF THE PREFERRED EMBODIMENTS

Description of the Principle

Before going into the detailed description of the preferred embodiments of this invention, the underlying principle is explained first.

Figure 3:
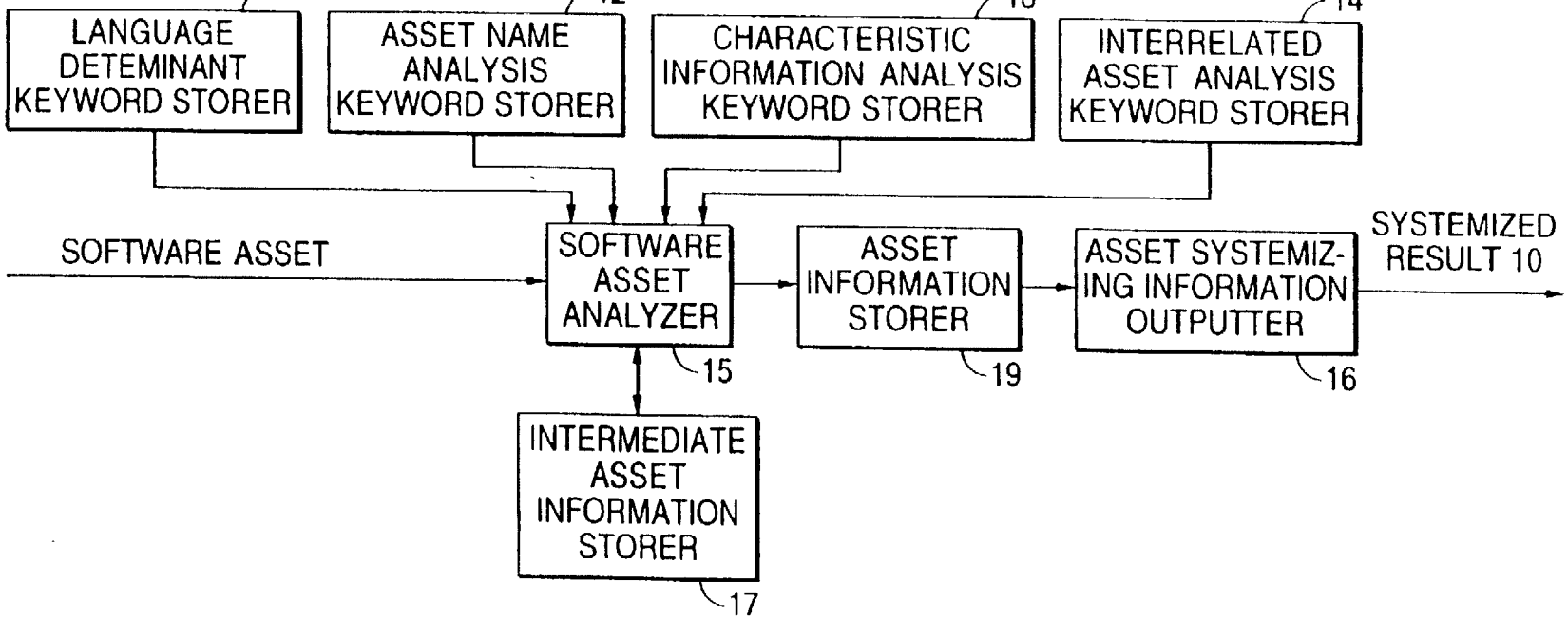
FIG. 3 is a block diagram of this invention.

FIG. 3 is a block diagram of this invention.

A language determinant keyword storer 11 comprises e.g. a language determinant keyword table, and stores keywords used for determining the descriptive languages of software assets together with the information on the descriptive formats such as columns in which the keywords are described in records of software assets An asset name analysis keyword storer 12 comprises e.g. an asset name analysis keyword table, and stores keywords used for analyzing the asset names of software assets together with the information on the descriptive formats such as columns in which the keywords are described in records of software assets.

A characteristic information analysis keyword storer 13 comprises e.g. a characteristic information analysis keyword table, and stores keywords used for analyzing the software asset characteristics, e.g. operational or definitive distinctions among computer systems such as a batch processing or an online processing, together with the descriptive formats such as columns in which the keywords are described in records of software assets.

An interrelated asset analysis keyword storer 14 comprises e.g. an interrelated asset analysis keyword table, and stores keywords used for analyzing the interrelations obtained as the parent/child relations among various assets such as main programs versus subprograms (e.g. subroutines), together with the descriptive formats such as column positions in which the keywords are described in records of software assets.

A software asset analyzer 15 comprises e.g. an asset information analyzer, and analyzes the software asset by using contents stored in the language determinant keyword storer 11, asset name analysis keyword storer 12, characteristics information analysis keyword storer 13 and interrelated asset analysis keyword storer 14.

An asset systemizing information outputter 16 comprises e.g. a systemizing information outputter, utilizes the asset information, comprising e.g. basic asset information and interrelated asset information, and stored in an asset information storer 19, organizes the asset information e.g. on a deficient asset, an unused asset, an identical asset, an asset type, an asset characteristic, a shared (common) asset, and an exclusive asset, and outputs the result in a list form.

An intermediate asset information storer 17 comprises a basic asset information intermediate table and interrelated asset information intermediate table, for example, in which the asset information on the way to being analyzed by the software asset analyzer 15 is stored.

An asset information storer 19 stores final results of an analysis performed by the software asset analyzer 15 such as the basic asset information relating to the software asset exiting in a library and the interrelated asset information relating to the parent/child relatings among the software assets.

A first process of this invention shown in FIG. 3 is to determine a descriptive language for software assets by utilizing the memory content of the language determinant keyword storer 11.

A second process of this invention shown in FIG. 3 is to read a software asset and the content of the basic asset information intermediate table provided in the asset information storer 17 and for storing descriptive languages for respective software asset, and to analyze the asset name by utilizing the memory content of the asset name analysis keyword storer 12. Based on an asset name obtaining condition, an asset name is obtained for a software asset from which an asset name analysis keyword is detected. The result is stored in the basic asset information intermediate table.

A third process of this invention shown in FIG. 3 is to analyze an asset characteristic, to read the content of the basic asset information intermediate table obtained as the result of consummating asset name analysis and the software asset, and to reflect in the basic asset information intermediate table the result of analyzing the asset characteristics, e.g. characteristics such as the usage of a database and the usage of a Japanese language processing, by using the memory content of the characteristic information analysis keyword storer 13.

A fourth process of this invention shown in FIG. 3 is to analyze the interrelations, to read the contents of the basic asset information intermediate table obtained as a result of consummating the asset characteristic analysis, the content of the interrelated asset keyword storer 14, and the software asset, and to create a content to be stored in an interrelated asset information intermediate table provided in the intermediate asset information storer 17. The interrelated asset information intermediate table stores parent/child relations among software assets as interrelated asset information.

The software asset analyzer 15 may have the asset information analyzer execute all of these processes, for instance.

The software asset analyzer 15 has its asset information analyzer determine the asset type by using the contents in the basic asset information intermediate table and the interrelated asset information intermediate table upon consummating an interrelation analysis, so that the basic asset information intermediate table and the interrelated asset information intermediate table mutually supplement deficient information in their respective contents. The software asset analyzer 15 also has its asset information analyzer sort by asset names and asset types the contents of the interrelated asset information intermediate table and the basic asset information intermediate table after the asset type is determined The software asset analyzer 15 then has its asset information analyzer analyze the asset existence in which the asset existence and the usage numbers of child assets are analyzed The software asset analyzer 15 ultimately has its asset information analyzer output to an asset information storer 19 the basic asset information and the interrelated asset information as the final asset information.

The asset information storer 19 stores as its contents basic asset information and interrelated asset information, which are fin.

At last, by using the contents stored in the final asset information storer 19, an asset systemizing information outputter 16 has its systemizing information outputter output in a list form a systemized result 10 e.g. comprising information on a deficient asset and an unused asset.

Description of the Actual Embodiments

Actual embodiments of this invention are explained below in further detail.

Figure 4:
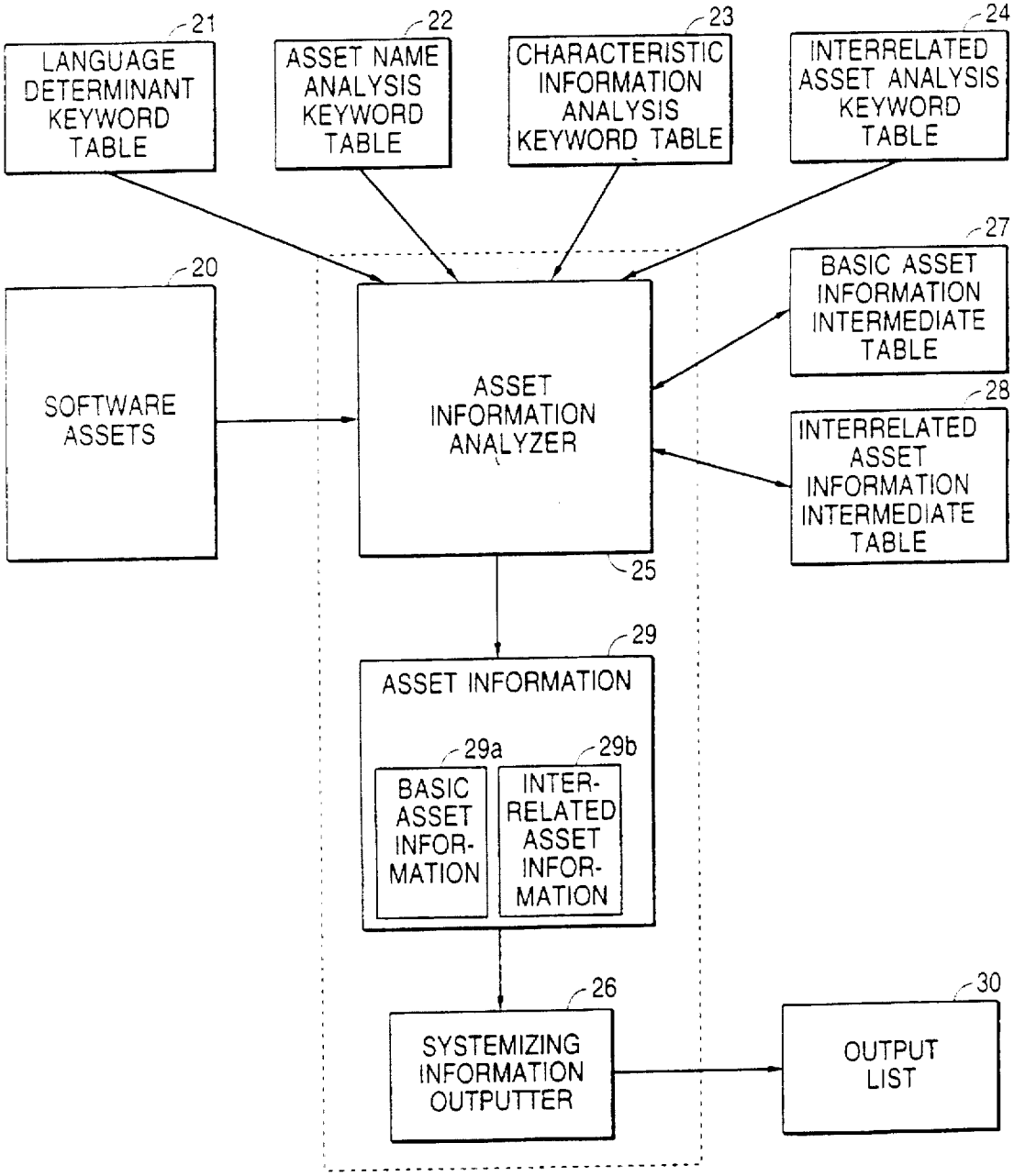
FIG. 4 is a skeleton block diagram of a software asset systemizer pursuant to this invention.

FIG. 4 is a skeleton block diagram of a software asset systemizer pursuant to this invention.

A language determinant keyword table 21, an asset name analysis keyword table 22, a characteristic information analysis keyword table 23, an interrelated asset analysis keyword table 24, an asset information analyzer 25, a systemizing information outputter 26, a basic asset information intermediate table 27, an interrelated asset information intermediate table 28, and an asset information complete table 29 shown in FIG. 4 correspond respectively to the language determinant keyword storer 11, the asset name analysis keyword storer 12, the characteristic information analysis keyword storer 13, the interrelated asset analysis keyword storer 14, the software asset analyzer 15 and the asset systemizing information outputter 16, the basic asset information intermediate storers 17 and the interrelated asset information intermediate storer 18 and the final asset information storer 19 shown in FIG. 3. The asset information analyzer 25 in a processor receives the contents of the language determinant keyword table 21, the asset name analysis keyword table 22, the characteristic information analysis keyword table 23, and the interrelated asset analysis keyword table 24.

The asset information analyzer 25 in the end outputs asset information complete table 29 comprising basic asset information complete table 29a and interrelated asset information complete table 29b from the software assets 20 as well as the received contents of the language determinant keyword table 21, the asset name analysis keyword table 22, the characteristic information analysis keyword table 23, and the interrelated asset analysis keyword table 24. During the process of its analyses, the asset information analyzer 25 uses a basic asset information intermediate table 27 and an interrelated asset information intermediate table 28. The basic asset information complete table 29a refers to information on the software assets 20 existing in a source library. The interrelated asset information 29b refers to information on the parent/child relations among the software assets 20. Interrelated assets informations comprise a parent asset and a child asset.

By using the asset information complete table 29 outputted from the asset information analyzer 25, the systemizing information outputter 26 outputs an output list 30 showing the result of systemizing the software assets 20. The output list 30 presents information on a deficient asset, an unused asset, an identical asset, an asset type, an asset characteristic, a common asset and a private asset.

FIGS. 5A through 5D exemplify formats of records stored respectively in the language determinant keyword table 21, the asset name analysis keyword table 22, the characteristic information analysis keyword table 23, and the interrelated asset analysis keyword table 24 shown in FIG. 4.

FIG. 5A shows a record format of the language determinant keyword table 21 shown in FIG. 4.

A record of the language determinant keyword table 21 has two [2] determinant conditions and one [1] determined result. The two [2] determinant conditions comprise a language determinant keyword and a column position. The language determinant keyword determines the programing language such as JCL and COBOL. The column position shows in which program record, i.e. in which column within a line, the keyword exists. The determined result stores the descriptive language name of the software asset when the determinant conditions are satisfied.

FIG. 5B shows a record format of the asset name analysis keyword table 22 shown in FIG. 4.

A record of the asset name analysis keyword table 22 has four [4] analysis conditions and two [2] analysis results. The four [4] analysis conditions comprise an asset name analysis keyword, a column position, a descriptive language name and an asset name obtaining condition. The two [2] analysis results comprise an asset type and an asset unit.

FIG. 5C shows a record format of the characteristic information analysis keyword table 23 shown in FIG. 4.

A record of the characteristic information analysis keyword table 23 has three [3] analysis conditions and one [1] analysis result. The three [3] analysis conditions comprise a characteristic information analysis keyword, a column position and a descriptive language name. The analysis result comprises an asset characteristic. The asset characteristic provides an operational or definitive distinction of a computer system. For instance, when the asset characteristic of a job is to be obtained, the characteristic information analysis keyword, the column position and the descriptive language name present data for making distinctions among a batch job, an online job, a database job and a processing job in the Japanese language.

FIG. 5D shows a record format of the interrelated asset analysis keyword table 24 shown in FIG. 4.

A record of the interrelated asset analysis keyword table 24 has five [5] analysis conditions for a parent asset and three [3] analysis results for a child asset. The five [5] analysis conditions for a parent asset comprise a descriptive language name, an asset type, an asset unit, an interrelated asset analysis keyword, and a column position. The three [3] analysis results for a child asset comprises a descriptive language name, an asset type and an asset unit FIGS. 6A and 6B exemplify formats of records stored respectively in the basic asset information intermediate table 27 and the interrelated asset information intermediate table 28 shown in FIG. 4. These are used during the course of processing before the asset information analyzer 25 outputs finalized asset information (comprising basic asset information and interrelated asset information) to the asset information 29 (comprising the basic asset information 29a and the interrelated asset information 29b), as shown in FIG. 4.

FIG. 6A shows a record format of the basic asset information intermediate table 27 shown in FIG. 4.

The asset information analyzer 25 uses the basic asset information intermediate table 27 temporarily before outputting finalized basic asset information to the basic asset information 29a. A record of the basic asset information intermediate table 27 has ten [10] storage contents comprising a library name, a member name, a descriptive language name, an asset name, an asset type, an asset unit, an asset existence, a usage number, an asset characteristic and an identical asset existence. Those storage contents are explained later in detail.

FIG. 6B shows a record format of the interrelated asset information intermediate table 28 shown in FIG. 4.

The asset information analyzer 25 uses the interrelated asset information intermediate table 28 temporarily before finally outputting the interrelated asset information 29b. A record of the interrelated asset information intermediate table 28 has seven [7] storage contents for a parent asset and five [5] storage contents for a child asset. The seven [7] storage contents for a parent asset comprise a library name, a member name, a descriptive language name, an asset name, and asset type, an asset unit, and an asset existence. The five [5] storage contents for a child asset comprises an asset name, an asset type, an asset unit, a descriptive language name and an asset existence. Those storage contents are explained later in detail.

FIGS. 7A and 7B exemplify formats of records stored respectively in the basic asset information 29a and the interrelated asset information 29b. The asset information analyzer 25 outputs finalized asset information (comprising the basic asset information and the interrelated asset information) to the asset information 29 (comprising the basic asset information 29a and the interrelated asset information 29b), as shown in FIG. 4.

FIG. 7A shows a record format of the basic asset information 29a shown in FIG. 4.

The asset information analyzer 25 finally outputs to the basic asset information 29a the finalized basic asset information whose following record format is identical to that of the basic asset information intermediate table 27. Thus, a record of the basic asset information 29a has ten [10] storage contents comprising a library name, a member name, a descriptive language name, an asset name, an asset type, an asset unit, an asset existence, a usage number, an asset characteristic and an identical asset existence.

FIG. 7B shows a record format of the interrelated asset information 29b shown in FIG. 4.

The asset information analyzer 25 finally outputs to the interrelated asset information 29b the finalized interrelated asset information whose following record format is similar to that of the interrelated asset information intermediate table 28. The only differences in those record formats are that, unlike the interrelated asset information intermediate table 28, the interrelated asset information 29b carries, as a storage content, neither an asset existence for a parent asset nor an asset existence for a child asset. Thus, a record of the interrelated asset information 29b has six [6] storage contents for a parent asset and four [4] storage contents for a child asset. The six [6] storage contents for a parent asset comprise a library name, a member name, a descriptive language name, an asset name, and asset type and an asset unit. The four [4] storage contents for a child asset comprise an asset name, an asset type, an asset unit and a descriptive language name.

Figure 8:
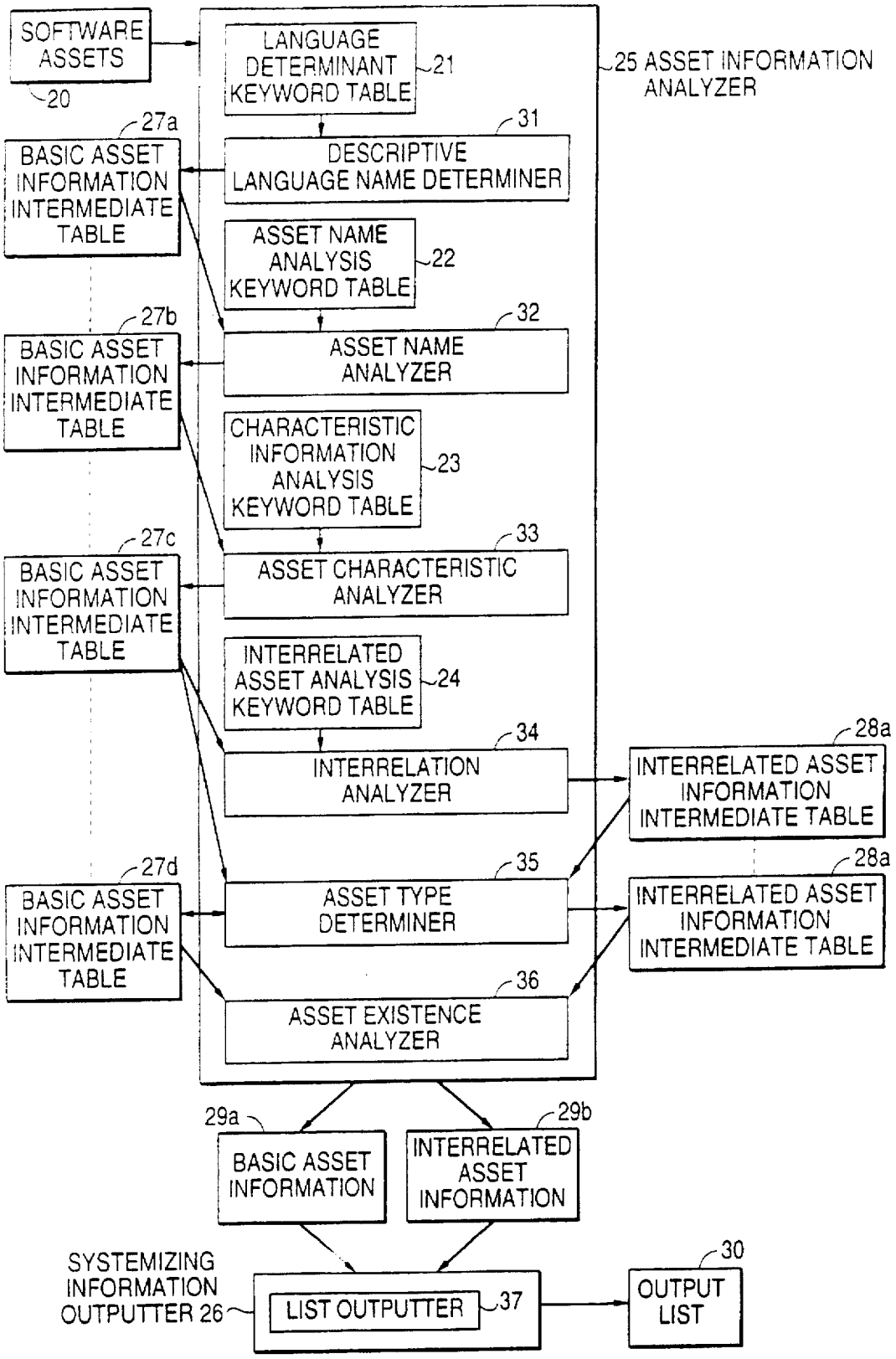
FIG. 8 is a derivative block diagram of the software asset systemizer shown in FIG. 4.

FIG. 8 is a derivative block diagram of the software asset systemizer shown in FIG. 4.

Parts shown in FIG. 8 which are the same as those shown in FIG. 4 have the same numbers.

The asset information analyzer 25 shown in FIG. 8 further comprises a descriptive language name determiner 31, an asset name analyzer 32, an asset characteristic analyzer 33, an interrelation analyzer 34, an asset type determiner 35, an asset existence analyzer 36 and a list outputter 37, in addition to the elements configuring the asset information analyzer 25 shown in FIG. 4. Also, the configuration shown in FIG. 8 assumes basic asset information intermediate tables 27a, 27b, 27c and 27d and interrelated asset information intermediate tables 28a and 28b each provided plurally, although the configuration shown in FIG. 4 assumes the basic asset information intermediate table 27 and interrelated asset information intermediate table 28, each provided singularly.

First, the asset information analyzer 25 instructs the descriptive language name determiner 31, the asset name analyzer 32, the asset characteristic analyzer 33 and the interrelation analyzer 34 to perform the following processes.

The descriptive language name determiner 31 determines the descriptive language of a record by using the software assets 20 and the language determinant keyword table 21, and then stores the result in basic asset information intermediate table 27a.

The asset name analyzer 32 analyzes the asset name of the record by using the asset name analysis keyword table 22 and the content stored in basic asset information intermediate table 27a, and then stores the result in basic asset information intermediate table 27b.

The asset characteristic analyzer 33 analyzes the asset characteristic of the record by using the characteristic information analysis keyword table 23 and the content stored in basic asset information intermediate table 27b, and then stores the result in basic asset information intermediate table 27c.

The interrelation analyzer 34 analyzes interrelations among records by using the interrelated asset analysis keyword table 24 and the content stored in basic asset information intermediate table 27c, and then stores the result in interrelated asset information intermediate table 28a.

Thus, the asset information analyzer 25 consummates all analyses using the language determinant keyword table 21, the asset name analysis keyword table 22, the characteristic information analysis keyword table 23 and the interrelated asset analysis keyword table 24.

Second, the asset information analyzer 25 instructs the asset type determiner 35 and the asset existence analyzer 36 to perform the following processes.

The asset type determiner 35 supplements the deficient information mutually between basic asset information intermediate table 27c and interrelated asset information intermediate table 28a, and reflects the result in basic asset information intermediate table 27d and interrelated asset information intermediate table 28b.

The asset existence analyzer 36 outputs to the systemizing information outputter 26 the finalized asset information (comprising basic asset information and interrelated asset information) stored in the asset information 29 (comprising the basic asset information 29a and the interrelated asset information 29b) as the final results. The asset existence analyzer 36 sorts and reorganizes the contents of basic asset information intermediate table 27d and interrelated asset information intermediate table 28b e.g. by asset names, such that the information on the same asset is sorted and systemized.

The processes performed by the asset type determiner 35 and the asset existence analyzer 36 will be described later in further detail.

Thus, the asset information analyzer 25 completes its internal processes.

Third and finally, the systemizing information outputter 26 (comprising the list outputter 37) creates as the output list 30 systemizing information from the contents of the basic asset information 29a and the interrelated asset information 29b, which receive their respective contents from the asset existence analyzer 36 in the asset information analyzer 25. The systemizing information outputter 26 has the list outputter 37 output the output list 30 presenting information e.g. on a deficient asset.

Figure 9:
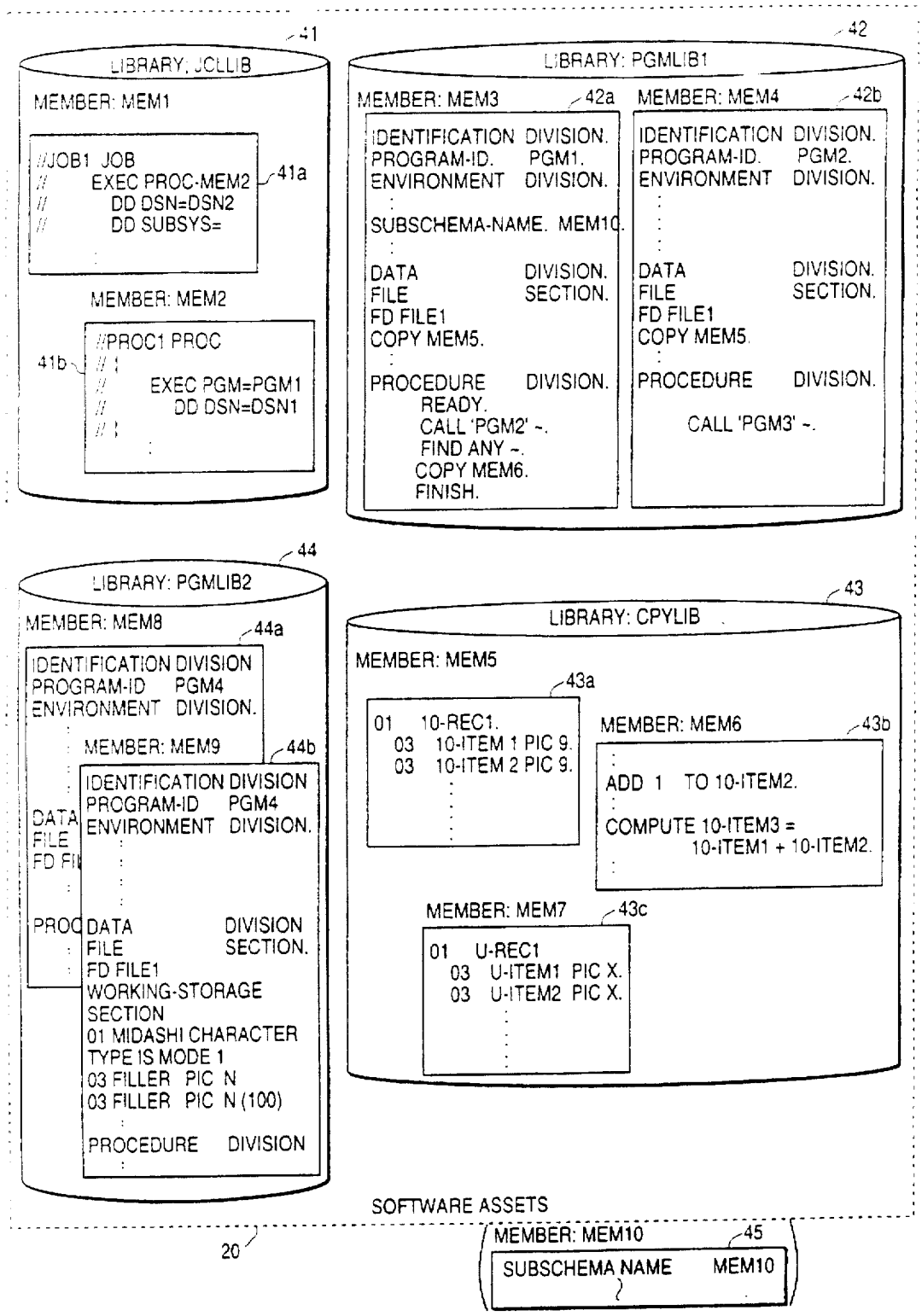
FIG. 9 shows exemplary contents of libraries and members associated with the software assets 20.

FIG. 9 shows exemplary contents of libraries and members associated with the software assets 20.

In FIG. 9, the software assets 20 comprise four [4] libraries 41 through 44, whose respective library names are JCLLIB, PGMLIB1, CPYLIB and PGMLIB2, each comprising a plurality of members. Library 41 (JCLLIB) comprises two [2] members 41a and 41b, whose member names are MEM1 and MEM2. Library 42 (PGMLIB1) comprises two [2] members 42a and 42b, whose member names are MEM3 and MEM4. Library 43 (CPYLIB) comprises three [3] members 43a, 43b, and 43c, whose member names are MEM5, MEM6, and MEM7. Library 44 (PGMLIB2) comprises two [2] members 44a and 44b, whose member names are MEM8 and MEM9. A member 45, whose member name is MEM10, illustrated outside the software assets 20 represents a deficient asset.

Also in FIG. 9, the library names represent the areas for storing a software asset in a source format as a data set in a computer system, and the member names represent the areas for storing member contents of software assets.

Because FIG. 9 merely shows a part of a record, i.e. a line, the formats of writing records, i.e. the syntaxes of descriptive languages are explained below by referring to FIGS. 10A, 10B and 10C.

FIG. 10A shows a fixed length coding format of COBOL.

FIG. 10B shows a variable length coding format of COBOL.

FIG. 10C shows a generic syntax of JCL.

It must be kept in mind that each record, e.g. of COBOL, shown in FIG. 9 merely represents regions A and B shown in FIG. 10A or 10B, whereas the column position (one [1] of the two [2] determinant conditions in the language determinant keyword table 21) shown in FIG. 11 corresponds to a column shown in FIGS. 10A, 10B and 10C.

FIGS. 11 through 16B illustrate in further detail the processes performed by the respective elements (i.e. the descriptive language name determiner 31, the asset name analyzer 32, the asset characteristic analyzer 33, the interrelation analyzer 34, the asset type determiner 35 and the asset existence analyzer 36) of the asset information analyzer 25 shown in FIG. 8, by taking the software assets 20 shown in FIG. 9 as an example.

FIG. 11 shows in detail the operations of the descriptive language name determiner 31 shown in FIG. 8.

As explained in the description of FIG. 8, the descriptive language name determiner 31 determines the descriptive language names of the software assets 20 by using the language determinant keyword table 21, and then reflects the result in basic asset information intermediate table 27a. The descriptive language name determiner 31 fills in applicable spaces of the shadowed columns of basic asset information intermediate table 27a as shown in FIG. 10.

To determine the descriptive language names, the asset information analyzer 25 has the descriptive language name determiner 31 search the columns specified by the column position (shown in FIG. 5A as one [1] of two [2] determinant conditions in the language determinant keyword table 21) for the language determinant keyword (also shown in FIG. 5A as the other one [1] of the two [2] determinant conditions in the language determinant keyword table 21).

As shown in FIG. 8, the asset information analyzer 25 has the descriptive language name determiner 31 sequentially determine descriptive language names of members 41a through 45 (whose member names are MEM1 through MEM10).

As shown in FIG. 10, the descriptive language name determiner 31 reflects in basic asset information intermediate table 27a the library name (e.g. JCLLIB) and the member name (e.g. MEM1) of each member (e.g. member 41a), and determines the descriptive language name of each member by detecting a language determinant keyword (also shown in FIG. 5A as one [1] of the two [2] determinant conditions in the language determinant keyword table 21).

Columns 01 and 02 in the first line of the records of members 41a and 41b respectively show "//", which matches the language determinant keyword in the first row of the language determinant keyword table 21. Hence, the descriptive language name determiner 31 determines the descriptive language names of members 41a and 41b (whose member names are MEM1 and MEM2) to be both JCL. Thus, the descriptive language name determiner 31 fills "JCL" in the corresponding spaces (at the intersections of the rows for member names MEM1 and MEM2 and the column for the descriptive language names) in basic asset information intermediate table 27a.

Columns 07 through 71 in the first line of the records of members 42a, 42b, 44a and 44b respectively show "IDENTIFICATION", which matches the language determinant keyword in the fourth row of the language determinant keyword table 21. Therefore, the descriptive language name determiner 31 determines the descriptive language names of members 42a, 42b, 44a and 44b to be all COBOL. Thus, the descriptive language name determiner 31 fills "COBOL" in the corresponding spaces (at the intersections of the rows for member names MEM1 and MEM2 and the column for the descriptive language names) in the basic asset information intermediate table 27a.

No columns in the first line of the records of members 43a, 43b and 43c match the language determinant keyword in any row of the language determinant keyword table 21. Therefore, the descriptive language name determiner 31 fails to determine the descriptive language names of members 43a, 43b and 43c. Thus, the descriptive language name determiner 31 fills nothing in the corresponding spaces (at the intersections of the rows for member names MEM1 and MEM2 and the column for the descriptive language names) in basic asset information intermediate table 27a, and leaves them empty.

The column for the asset existences in basic asset information intermediate table 27a stores YES, because all of the software assets 20 having member names MEM1 through MEM9 shown in FIG. 9 do exist The descriptive language name determiner 31 unconditionally sets "zero [0]" in all spaces of the column for the usage numbers of respective members of the software assets 20, because the usage numbers for respective members of the software assets 20 are uncertain at this time.

The descriptive language name determiner 31 leaves the spaces for all the columns shown in FIG. 10 all blank except those for the shadowed columns. That is, the descriptive language name determiner 31 leaves all the spaces in the columns for the asset names, asset types, asset units, asset characteristics, and identical asset existences empty.

Figure 12B:
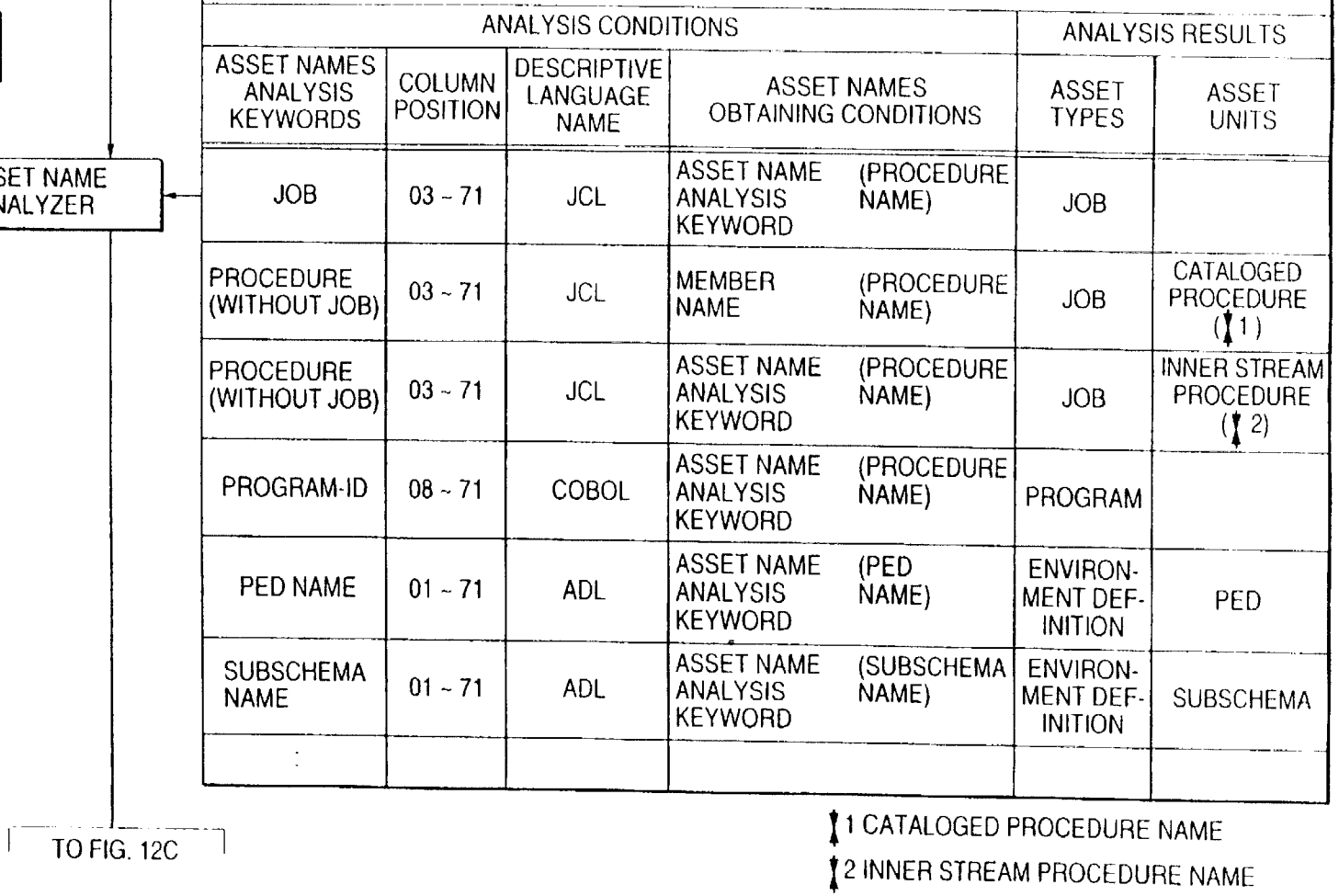

FIG. 12 shows in detail the operations of the asset name analyzer 32 shown in FIG. 8.

As explained in the description of FIG. 8, the asset name analyzer 32 analyzes the asset names of the software assets 20 by using basic asset information intermediate table 27a and the asset name analysis keyword table 22, and then reflects the result in basic asset information intermediate table 27b. The asset characteristic analyzer 33 fills in applicable spaces of the shadowed columns of basic asset information intermediate table 27b as shown in FIG. 12.

To determine the asset names, the asset information analyzer 25 has the asset name analyzer 32 search the columns specified by the column position (shown in FIG. 5B as one [1] of four [4] analysis conditions in the asset name analysis keyword table 22) for the language determinant keyword (also shown in FIG. 5B as another one [1] of the four [4] analysis conditions in the asset name analysis keyword table 22).

As shown in FIG. 8, the asset information analyzer 25 has the asset name analyzer 32 sequentially analyze asset names of members 41a through 45 (whose member names are MEM1 through MEM10) for all the descriptive language names determined by the descriptive language name determiner 31.

As shown in FIG. 10, the asset name analyzer 32 reflects in basic asset information intermediate table 27b the asset name (e.g. JOB1) and the asset type (e.g. job) for each descriptive language name (e.g. JCL) of a member (e.g. member 41a), after searching each record of a member name (e.g. MEM1) by using the appropriate rows (e.g. between the first and third rows for JCL, more specifically from the first row in this particular example) of the analysis conditions in the asset name analysis keyword table 22. "(WITHOUT JOB)", e.g. in the second row of the column for the asset name analysis keywords of the asset name analysis keyword table 22, means "when there is no JOB sentence". The asset name analyzer 32 also fills similarly obtained asset units in the corresponding spaces in the column of asset units.

The asset name analyzer 32 performs these processes for each of the members 41a through 45 (whose member names are MEM1 through MEM10) shown in FIG. 9.

Yet, as explained in the description of FIG. 11, the descriptive language name determiner 31 fails to determine the descriptive language names for members 43a, 43b and 43c (whose member names are MEM5, MEM6 and MEM7) and leaves their spaces in the column for the descriptive language names empty. Because the asset name analyzer 32 uses a descriptive language name (one [1] of the four [4] analysis conditions of the asset name analysis keyword table 22 shown in FIG. 5B) for analyzing an asset name, the asset name analyzer 32 also fails to analyze asset names for members 43a, 43b and 43c whose member names are MEM5, MEM6 and MEM7. Accordingly, the asset name analyzer 32 sets these member names (i.e. MEM5, MEM6 and MEM7) "as is" in the corresponding spaces (at the intersections of the rows for member names MEM5, MEM6 and MEM7 and the column for the asset names) as their asset names, thereby consummating its processing for all the members 41a through 45.

The asset type obtained as the result of an asset name analysis shows a distinction such as among a job, a program and an environment definer. The asset unit shows a program asset distinction e.g. among a main program, a subprogram (e.g. a subroutine) and a copied program, a job asset distinction e.g. among a main body of a job, a cataloged procedure registered by a procedure library and designated in a job control sentence and a inner stream procedure simultaneously defined/used in JCL, or an environment definer distinction e.g. among a schema as a database structural definer, a subschema as a virtual database structural definer, a form/screen definer such as PSAM and a PED definer used for declaring a usage environment when a JCL program is executed in using a database.

FIGS. 13A, 13B and 13C show in detail the operations of the asset characteristic analyzer 33 shown in FIG. 8.

As explained in the description of FIG. 8, the asset characteristic analyzer 33 analyzes the asset characteristics of the software assets 20 by using basic asset information intermediate table 27b and the characteristic information analysis keyword table 23, and then reflects the result in basic asset information intermediate table 27c. The asset characteristic analyzer 33 fills in applicable spaces of the shadowed column of basic asset information intermediate table 27c as shown in FIGS. 13A, 13B and 13C.

For instance, the fourth record of member 41a (whose member name is MEM1) shown in FIG. 9, i.e. "// DD SUBSYS=", satisfies "SUBSYS=" in the first row of the column for the characteristic information analysis keywords of the analysis conditions in the characteristic information analysis keyword table 23. Consequently, the asset characteristic analyzer 33 fills in the corresponding space (at the intersection of the row for member name MEM1 and the column for the asset characteristics) of basic asset information intermediate table 27b an asset characteristic "DB" indicating a database usage as an analysis result.

On the other hand, member 41b (whose member name is MEM2) also shown in FIG. 9 does not have any record satisfying the remaining two [2] analysis conditions (the characteristic information analysis keyword and the column position) for the descriptive language name of "JCL" of the three [3] analysis conditions of the characteristic information analysis keyword table 23 shown in FIG. 5B. Thus, the asset characteristic analyzer 33 fills nothing in the corresponding space (at the intersection of the row for member name MEM2 and the column for the asset characteristics) of basic asset information intermediate table 27b and leaves it empty.

As with the asset name analysis keyword table 22, the characteristic information analysis keyword table 23 stores the analysis conditions respectively for the descriptive language names. Thus, as with the asset name analyzer 32, the asset characteristic analyzer 33 also fails to analyze the asset characteristics of members 43a, 43b and 43c (whose member names are MEM5, MEM6 and MEM7) and leaves the corresponding spaces (at the intersections of the rows for member names MEM5, MEM6 and MEM7 and the column for the asset characteristics) empty.

The asset characteristic obtained as the result of an asset characteristic analysis shows an operational or definitive distinction of a computer system. For instance, it shows a job distinction e.g. among a batch job, an online job, a database job and a Japanese language job.

FIGS. 14A, 14B and 14C show in detail the operations of the interrelation analyzer 34 shown in FIG. 8.

As explained in the description of FIG. 8, the interrelation analyzer 34 analyzes the interrelations among the software assets 20 by using basic asset information intermediate table 27c and the interrelated asset analysis keyword table 24, and then reflects the result in interrelated asset information intermediate table 28a. The interrelation analyzer 34 fills in applicable spaces of the shadowed columns of interrelated asset information intermediate table 28a as shown in FIGS. 14A, 14B and 14C.

The interrelation analyzer 34 uses an asset type, an asset unit, an interrelated asset analysis keyword and a column position (four [4] analysis conditions of the five [5] analysis conditions of the interrelated asset analysis keyword table 24 shown in FIG. 5D) provided in correspondence with a descriptive language name (the remaining one [1] analysis condition of the five [5] analysis conditions of the interrelated asset analysis keyword table 24 shown in FIG. 5D) for analyzing a child asset of a parent asset.

First, the second record of member 41a (whose member name is MEM1) shown in FIG. 9, i.e. "// EXEC PROC= MEM2", satisfies "EXEC PROC=" in the first row of the column for the interrelated asset analysis keywords of the analysis conditions in the interrelated asset analysis keyword table 24.

Consequently, the interrelation analyzer 34 fills in the corresponding space (at the intersection of the row for member name MEM1 and the column for the asset names) of interrelated asset information intermediate table 28a by an asset name "MEM2" as an analysis result.

Also, the interrelation analyzer 34 fills the asset type "JOB", asset unit "CATALOGED PROCEDURE" and descriptive language name "JCL" of child asset "MEM2" (the member name of member 41b) stored as analysis results in the first row of the interrelated asset analysis keyword table 24 to the corresponding spaces (at the intersections of the row for member name "MEM1" and the columns for the asset types, asset units and descriptive language names of child assets) in interrelated asset information intermediate table 28a.

Second, the third record of member 41b (whose member name is MEM2) shown in FIG. 9, i.e. "// EXEC PGM= PGM1", satisfies "EXEC PGM=" in the second row of the column for the interrelated asset analysis keywords of the analysis conditions in the interrelated asset analysis keyword table 24.

Consequently, the interrelation analyzer 34 fills in the corresponding space (at the intersection of the row for member name "MEM2" and the column for the asset names) of interrelated asset information intermediate table 28a by an asset name "PGM1" as an analysis result.

Also, the interrelation analyzer 34 fills the asset type "PROGRAM", asset unit "MAIN PROGRAM" and descriptive language name (nil) of child asset "PGM1" stored as analysis results in the second row of the interrelated asset analysis keyword table 24 to the corresponding spaces (at the intersections of the row for member name "MEM2" and the columns for the asset types, asset units and descriptive language names of child assets) in interrelated asset information intermediate table 28a.

Third, one [1] record of member 42a (whose member name is MEM3) shown in FIG. 9, i.e. "CALL 'PGM2'–", satisfies "CALL" in the sixth row of the column for the interrelated asset analysis keywords of the analysis conditions in the interrelated asset analysis keyword table 24. Another one [1] record of member 42a (whose member name is MEM3) shown in FIG. 9, i.e. "SUBSCHEMA-NAME. MEM10.", satisfies "SUBSCHEMA-NAME" in the eighth row of the column for the interrelated asset analysis keywords of the analysis conditions in the interrelated asset analysis keyword table 24. Two [2] records of member 42a (whose member name is MEM3) shown in FIG. 9, i.e. "COPY MEM5." and "COPY MEM6.", satisfies "COPY" in the seventh row of the column for the interrelated asset analysis keywords of the analysis conditions in the interrelated asset analysis keyword table 24.

Hence, the parent asset whose member name is "MEM3" has four [4] child assets and four [4] rows respectively for them in interrelated asset information intermediate table 28a.

Consequently, the interrelation analyzer 34 fills in the corresponding spaces (at the intersection of the four [4] rows for member name "MEM3" and the column for the asset names) of interrelated asset information intermediate table 28a by assets names "MEM10", "MEM5", "PGM2" and "MEM6" as analysis results.

Also, the interrelation analyzer 34 copies the asset type "PROGRAM", asset unit "SUBROUTINE" and descriptive language name (nil) of child asset "PGM2" stored as analysis results in the sixth row of the interrelated asset analysis keyword table 24 to the corresponding spaces (at the intersections of the third row for member name "MEM3" and the columns for the asset types, asset units and descriptive language names of child assets) in interrelated asset information intermediate table 28a. Then, the interrelation analyzer 34 copies the asset type "ENVIRONMENT DEFINON", asset unit "SUBSCHEMA" and descriptive language name "ADL" of child asset "MEM10" stored as analysis results in the eighth row of the interrelated asset analysis keyword table 24 to the corresponding spaces (at the intersections of the first row for member name "MEM3" and the columns for the asset types, asset units and descriptive language names of child assets) in interrelated asset information intermediate table 28a. Finally, the interrelation analyzer 34 fills twice the asset type "PROGRAM", asset unit "COPIED PROGRAM" and descriptive language name "COBOL" of child assets "MEM5" and "MEM6" stored as analysis results in the seventh row of the interrelated asset analysis keyword table 24 to the corresponding spaces (at the intersections of the second and fourth rows for member name "MEM3" and the columns for the asset types, asset units and descriptive language names of child assets) in interrelated asset information intermediate table 28a.

Fourth, one [1] record of member 42b (whose member name is MEM4) shown in FIG. 9, i.e. "COPY MEM5.", satisfies "COPY" in the seventh row of the column for the interrelated asset analysis keywords of the analysis conditions in the interrelated asset analysis keyword table 24. Another one [1] record of member 42b (whose member name is MEM4) shown in FIG. 9, i.e. "CALL 'PGM3'–", satisfies "CALL" in the sixth row of the column for the interrelated asset analysis keywords of the analysis conditions in the interrelated asset analysis keyword table 24.

Hence, the parent asset whose member name is "MEM3" has two [2] child assets and two [2] rows respectively for them in interrelated asset information intermediate table 28a.

Consequently, the interrelation analyzer 34 fills in the corresponding spaces (at the intersection of the two [2] rows for member name "MEM3" and the column for the asset names) of interrelated asset information intermediate table 28a by assets names "MEM5" and "PGM3" as analysis results.

Also, the interrelation analyzer 34 fills the asset type "PROGRAM", asset unit "SUBROUTINE" and descriptive language name (nil) of child asset "PGM2" stored as analysis results in the sixth row of the interrelated asset analysis keyword table 24 to the corresponding spaces (at the intersections of the second row for member name "MEM4" and the columns for the asset types, asset units and descriptive language names of child assets) in interrelated asset information intermediate table 28a. Thus, the interrelation analyzer 34 fills the asset type "PROGRAM", asset unit "COPIED PROGRAM" and descriptive language name "COBOL" of child asset "MEM5" stored as analysis results in the seventh row of the interrelated asset analysis keyword table 24 to the corresponding spaces (at the intersections of the first row for member name "MEM5" and the columns for the asset types, asset units and descriptive language names of child assets) in interrelated asset information intermediate table 28a.

The interrelation analyzer 34 unconditionally sets "zero [0]" in all spaces of the column for the asset existences of child assets, because the asset existences of child assets are uncertain at this time. Thus, the interrelation analyzer 34 completes filling appropriate results in all the applicable spaces for the child assets in interrelated asset information intermediate table 28a.

The interrelation analyzer 34 fills the analysis results for respective member names, which are stored in the spaces of the columns for the library names, member names, descriptive language names, asset names, asset types, and asset units in basic asset information intermediate table 27c, to the corresponding spaces (at the intersections of the rows for the same member names and the columns for the library names, member names, descriptive language names, asset names, asset types, and asset units) for the parent assets in interrelated asset information intermediate table 28a. Thus, the interrelation analyzer 34 fills a set of the same library names, member names, descriptive language names, asset names, asset types, and asset units in the corresponding spaces for all the four [4] rows of parent asset "MEM3" and another set of the same library names, member names, descriptive language names, asset names, asset types, and asset units in the corresponding spaces for all the two [2] rows of parent asset "MEM4".

Thus, the interrelation analyzer 34 completes filling in applicable spaces of both sides for parent assets and child assets in interrelated asset information intermediate table 28a.

As described above, the asset information analyzer 25 completes having the descriptive language name determiner 31, the asset name analyzer 32, the asset characteristic analyzer 33 and the interrelation analyzer 34 perform their respective processes using the corresponding ones of the four [4] keyword tables, i.e. the language determinant keyword table 21, the asset name analysis keyword table 22, the characteristic information analysis keyword table 23 and the interrelated asset analysis keyword table 24.

As shown in FIG. 8, the asset information analyzer 25 then has the asset type determiner 35 output the finalized asset information to the asset information 29 comprising the basic asset information 29a and the interrelated asset information 29b.

As a first step in this process, the asset information analyzer 25 instructs the asset type determiner 35 to create interrelated asset information intermediate table 28b and basic asset information intermediate table 27d by using the contents of interrelated asset information intermediate table 28a and basic asset information intermediate table 27c.

As a second step, the asset information analyzer 25 instructs the asset existence analyzer 36 to create basic asset information 29a and interrelated asset information 29b respectively by consolidating the two [2] tables (one for real asset information and the other for child asset information of interrelated asset information) of basic asset information intermediate table 27d and by eliminating the column for the asset existences of parent assets and child assets in interrelated asset information intermediate table 28b.

FIGS. 15A-1, 15A-2 and 15A-3, and 15B-1 and 15B-2 show in detail the operations of the asset type determiner 35 shown in FIG. 8.

Figure 1:
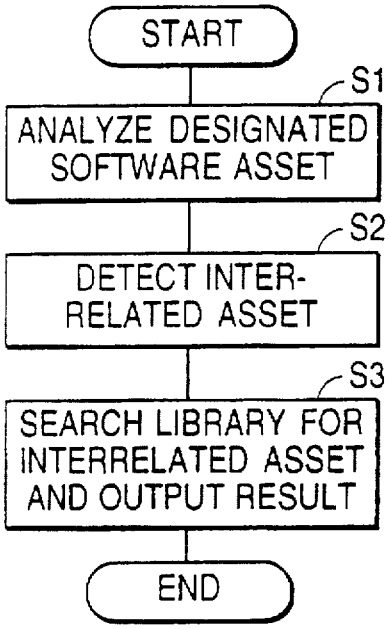
FIG. 1 PRIOR ART
FIG. 1 is a flowchart for explaining the prior art method of confirming the existence or nonexistence of a software asset.
Figure 2:
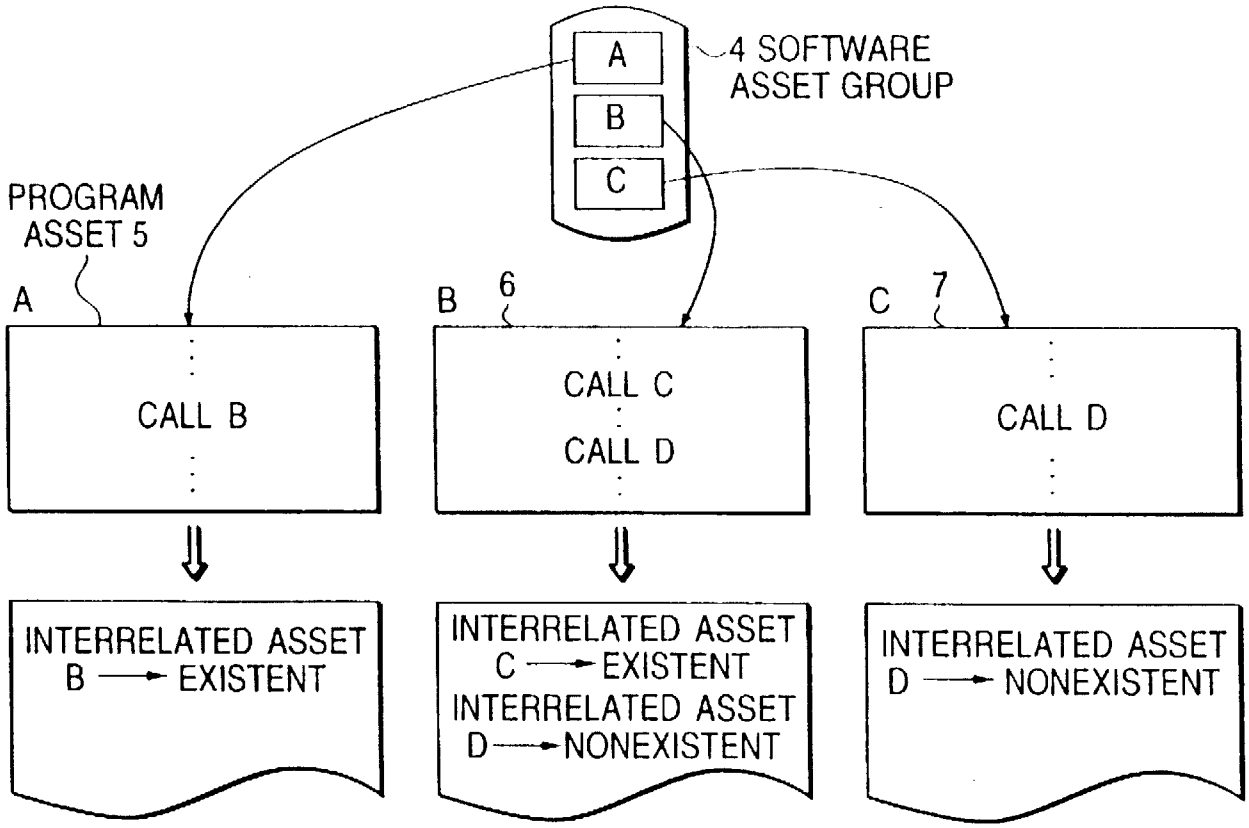
FIG. 2 PRIOR ART
FIG. 2 shows a prior art example of confirming the existence or nonexistence of a software asset.

As explained in the description of FIG. 8, the asset type determiner 35 determines the asset types of the software assets 20 by using basic asset information intermediate table 27c and interrelated asset information intermediate table 28a, and then reflects the result in interrelated asset information intermediate table 28b and basic asset information intermediate table 27d. The asset type determiner 35 fills in applicable spaces of the shadowed column of interrelated asset information intermediate table 28b as shown in FIGS. 15A-1, 15A-2 and 15A-3 and the shadowed columns of basic asset information intermediate table 27d as shown in FIGS. 15B-1 and 15B-2.

More specifically, the asset type determiner 35 creates basic asset information intermediate table 27d as an entirely new table having both real asset information and child asset information of interrelated asset information.

That is, the asset type determiner 35 fills in applicable spaces of the columns for the descriptive language names, asset types and asset units in basic asset information intermediate table 27d for real asset information by filling the analysis results stored in the spaces of the same columns in basic asset information intermediate table 27c. The asset type determiner 35 also supplements some of the empty spaces of the columns with descriptive language names, asset types and asset units in basic asset information intermediate table 27c by filling the analysis results stored in the corresponding spaces (at the intersections of the columns for the asset types, asset units and descriptive language names and the rows for the asset names whose asset types, asset units or descriptive language names in basic asset information intermediate table 27c are missing) of child assets in interrelated asset information intermediate table 28a.

Then, the asset type determiner 35 fills in applicable spaces of all the columns of child asset information in basic asset information intermediate table 27d for child asset information of interrelated asset information by filling the analysis results stored in the spaces of all the columns of child assets in interrelated asset information intermediate table 28a. The asset type determiner 35 also supplements the empty spaces of the column for the descriptive language names of child assets in interrelated asset information intermediate table 28a by copying the analysis results (e.g. "COBOL") stored in the corresponding spaces (at the intersections of the column for the descriptive language names and the rows for the asset names (e.g. "PGM1") whose descriptive language names of child assets in interrelated asset information intermediate table 28a are missing) of parent assets in interrelated asset information intermediate table 28a.

The asset type determiner 35 unconditionally sets "one [1]" in all spaces of the column for the usage numbers in basic asset information intermediate table 27d for child asset information of interrelated asset information, because these child assets have already been used once.

Thus, the interrelation analyzer 34 completes filling appropriate results in all the corresponding column (spaces) for the child assets in interrelated asset information intermediate table 28a.

Finally, the asset type determiner 35 fills in corresponding column for the parent assets in interrelated asset information intermediate table 28b. The asset type determiner 35 supplements deficient asset units by detecting a total match of library names, member names, descriptive language names, asset names and asset types between interrelated asset information intermediate table 28a and basic asset information intermediate table 27d for real asset information.

FIGS. 16A-1, 16A-2 and 16A-3 and 16B show in detail the operations of the asset existence analyzer 36 shown in FIG. 8.

Figures 2, 16A:
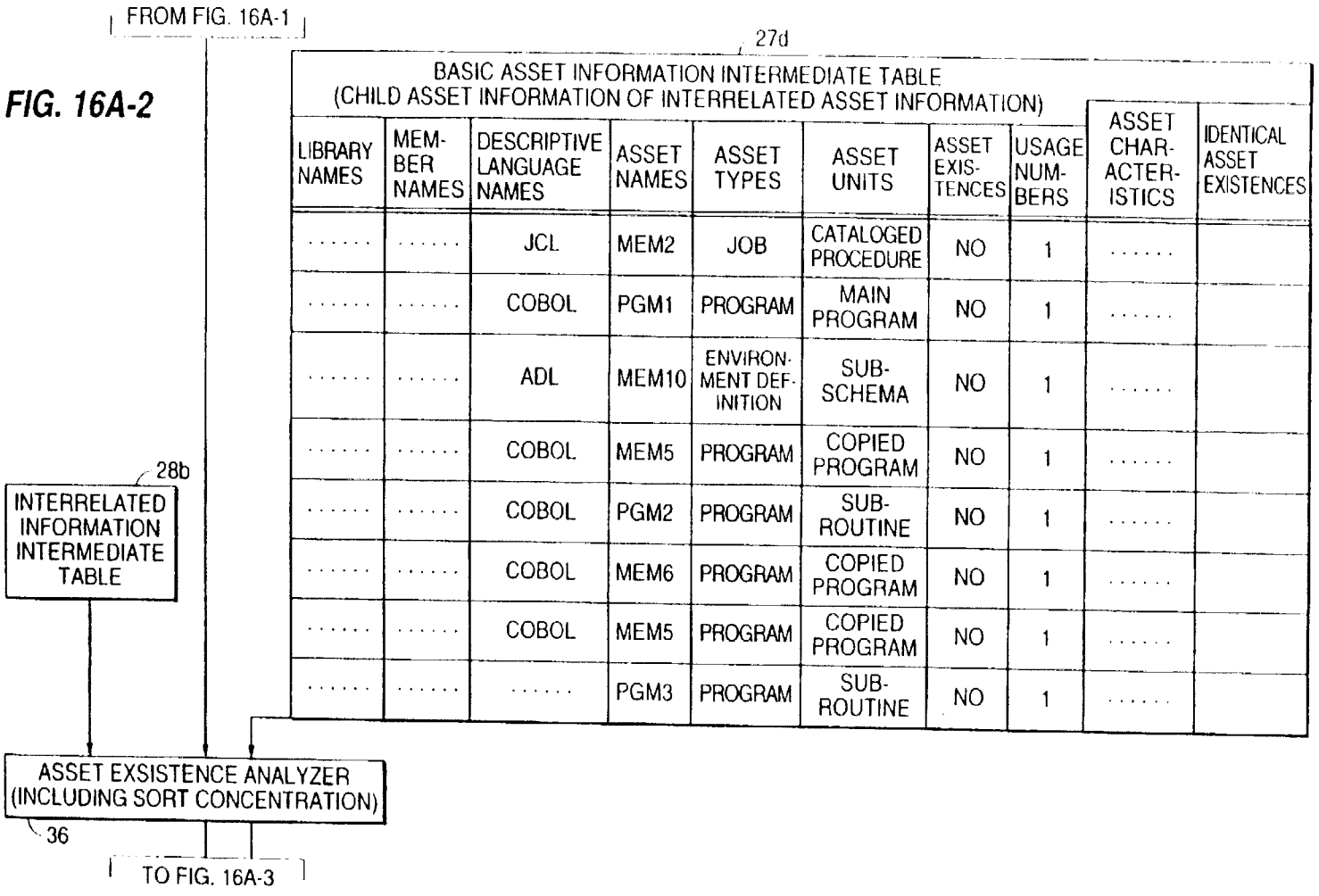

As explained in the description of FIG. 8, the asset existence analyzer 36 analyzes the asset existences of the software assets 20 by using basic asset information intermediate table 27d and interrelated asset information intermediate table 28b, and then reflects the result in the basic asset information 29a and the interrelated asset information 29b. The asset existence analyzer 36 fills in corresponding columns (shadowed) of the basic asset information 29a as shown in FIGS. 16A-1, 16A-2 and 16A-3 and the interrelated asset information 29b as shown in FIG. 16B.

The asset existence analyzer 36 sorts and concentrates the analysis results in the two [2] tables (one for real asset information and the other for child asset information of interrelated asset information) of basic asset information intermediate table 27d by the analysis results stored in the spaces of the columns for the asset names, member names and library names, thereby combining those two [2] tables into basic asset information 29a as a single table. That is, the asset existence analyzer 36 fills in corresponding columns for the asset existences, usage numbers and identical asset existences of basic asset information 29a.

Figure 17:
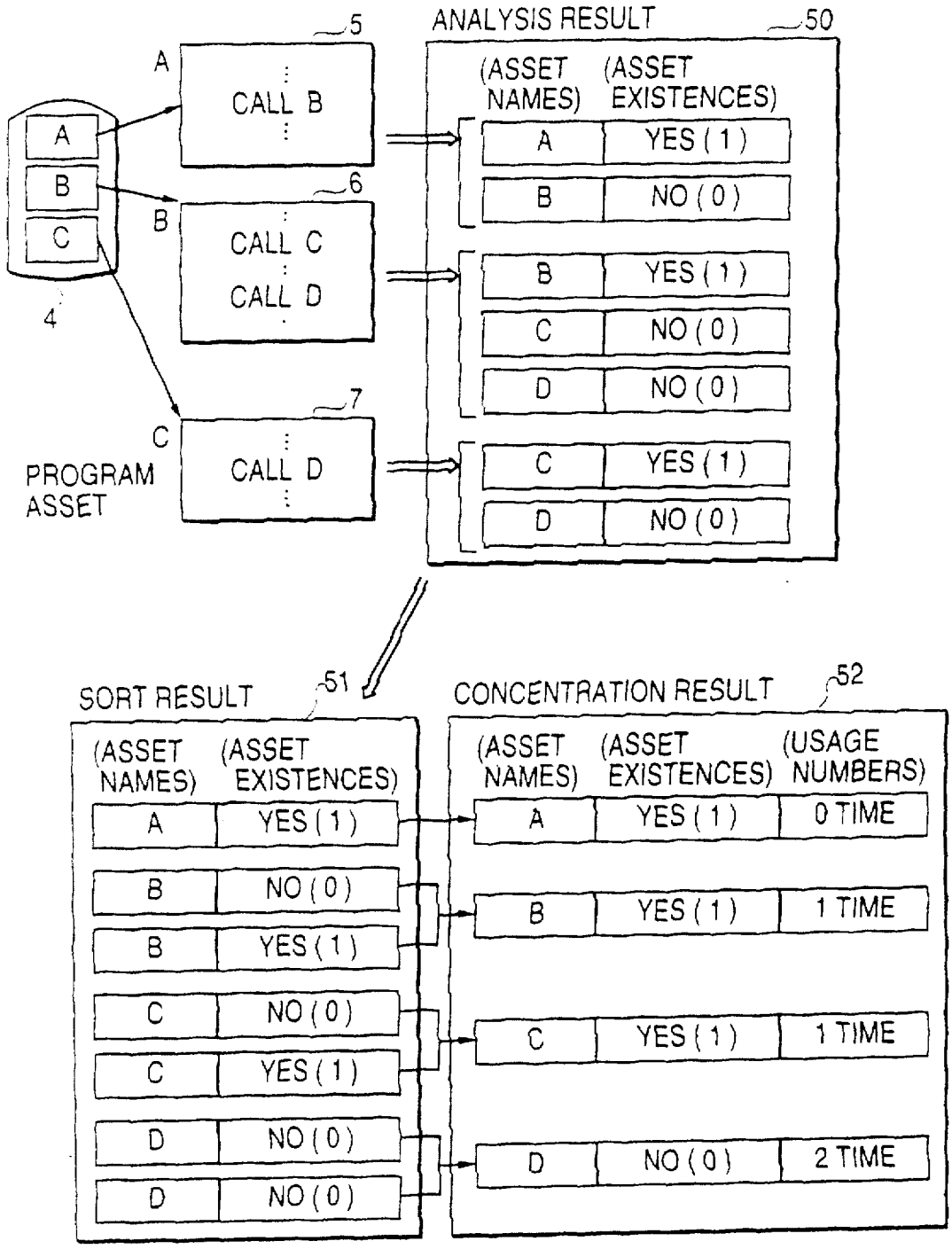
FIG. 17 shows an example of a process for sorting and concentrating the software asset group 4 comprising the program assets 5, 6 and 7 shown in FIG. 2.
Figure 18:
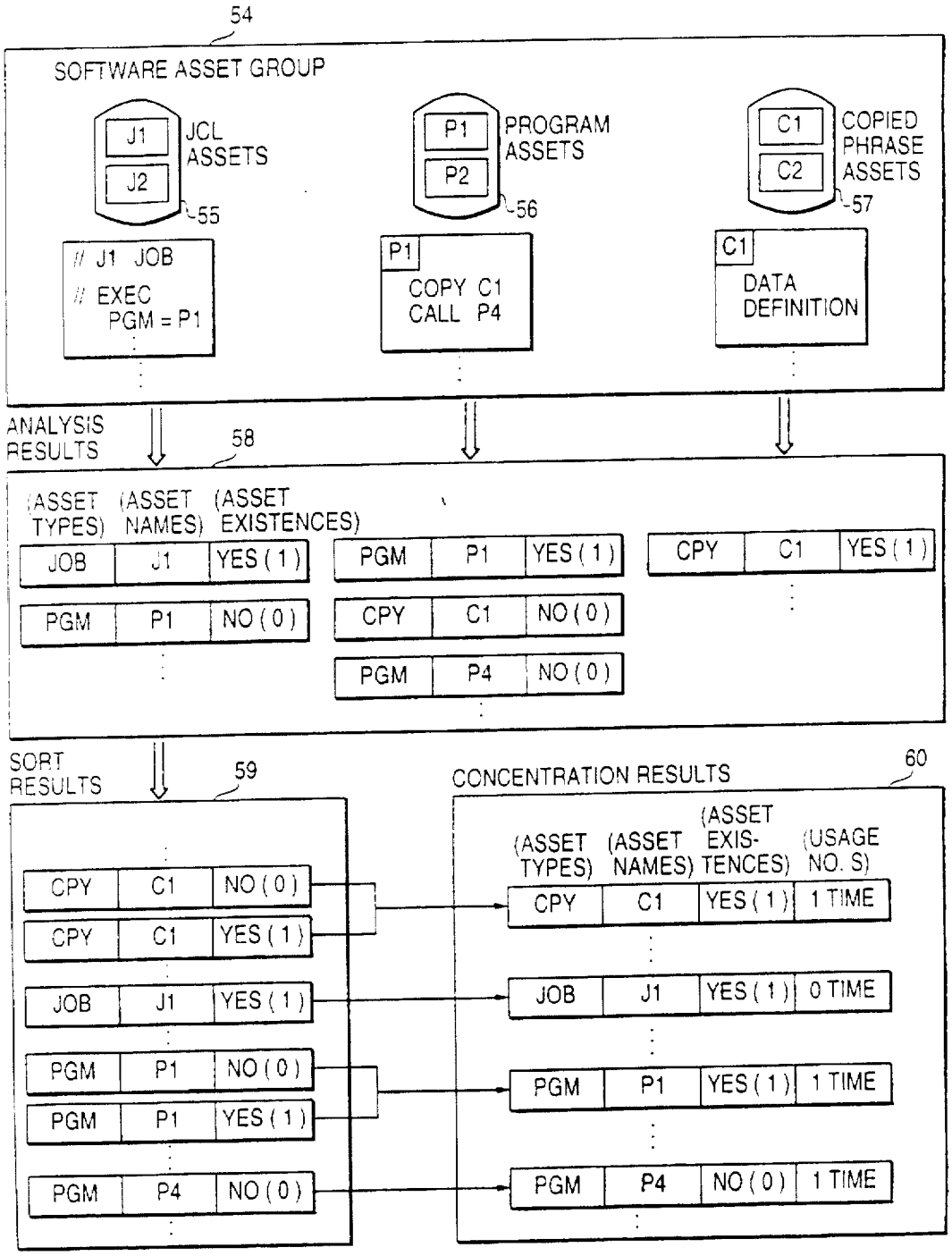
FIG. 18 shows another example of a process for sorting and concentrating a software asset group comprising different asset types.

FIGS. 17 and 18 elaborate sort/concentration processes by using relatively simple examples.

FIG. 17 shows an example of the processes for sorting and concentrating the software asset group 4 comprising the program assets 5, 6 and 7 shown in FIG. 2.

As explained in the prior art example of confirming the existence or nonexistence of a software asset in the description of FIG. 2, the real assets and interrelated assets for the program assets 5, 6 and 7 are examined. Although analysis results 50 must be systemized in the format represented by basic asset information intermediate table 27d, here for simplicity of the explanation, analysis results 50 only show the contents of asset names and asset existences.

For instance, it is known from program asset 5 that asset existence is YES(1) for asset name A and asset existence is NO(0) for asset name B. The figures "one [1]" and "zero [0]" in the parentheses indicate an existence and a nonexistence. That is, the result of analyzing asset name A corresponds to each row of basic asset information intermediate table 27d for real asset information, and the result of analyzing asset name B corresponds to each row of basic asset information intermediate table 27d for child information of interrelated asset information.

Sort results 51 showing one [1] record for asset name A and two [2] records for asset name B represent what are obtained by sorting analysis results 50 through rearranging asset names e.g. in the alphabetical order.

Concentration results 52 showing one [1] record each for asset names A, B, C and D are obtained next. Each record shows the asset existence and usage number. When any of the records for an asset name in sort results 51 shows an asset existence, the asset name shows an asset existence in concentration results 52. The number of records for an asset name whose asset existences are "NO" in sort results 51 becomes the usage number of the record having the asset name. For instance, the asset existence and usage number for asset name A are "YES" and "zero [0]", whereas those for asset name B are "NO" and "two [2]".

FIG. 18 shows another example of the processes for sorting and concentrating a software asset group comprising different asset types.

What is different from the example shown in FIG. 17 is that a software asset group 54 shown in FIG. 18 comprises three [3] assets, i.e. JCL assets 55, program assets 56 and copied phrase assets 57, each having a different asset type. As with the description of FIG. 17, although analysis results 58 shown in FIG. 18 must be systemized in the format represented by basic asset information intermediate table 27d, here again for simplicity of the explanation, analysis results 58 only show the contents of asset types, asset names and asset existences. Also, as with the description of FIG. 17, a record whose asset existence is "YES" corresponds to a record of basic asset information intermediate table 27d for real asset information, and a record whose asset existence is "NO" corresponds to a record of basic asset information intermediate table 27d for child information of interrelated asset information.

Sort results 59 are obtained by sorting analysis results 58 first by asset types, second by asset names and third by asset existences.

Concentration results 60 are obtained by concentrating sort results 59. Unlike concentration results 52 shown in FIG. 17, concentration results 60 shown in FIG. 18 also have the results for asset types, in addition to the results for asset names, asset existences and usage numbers.

Figure 19:
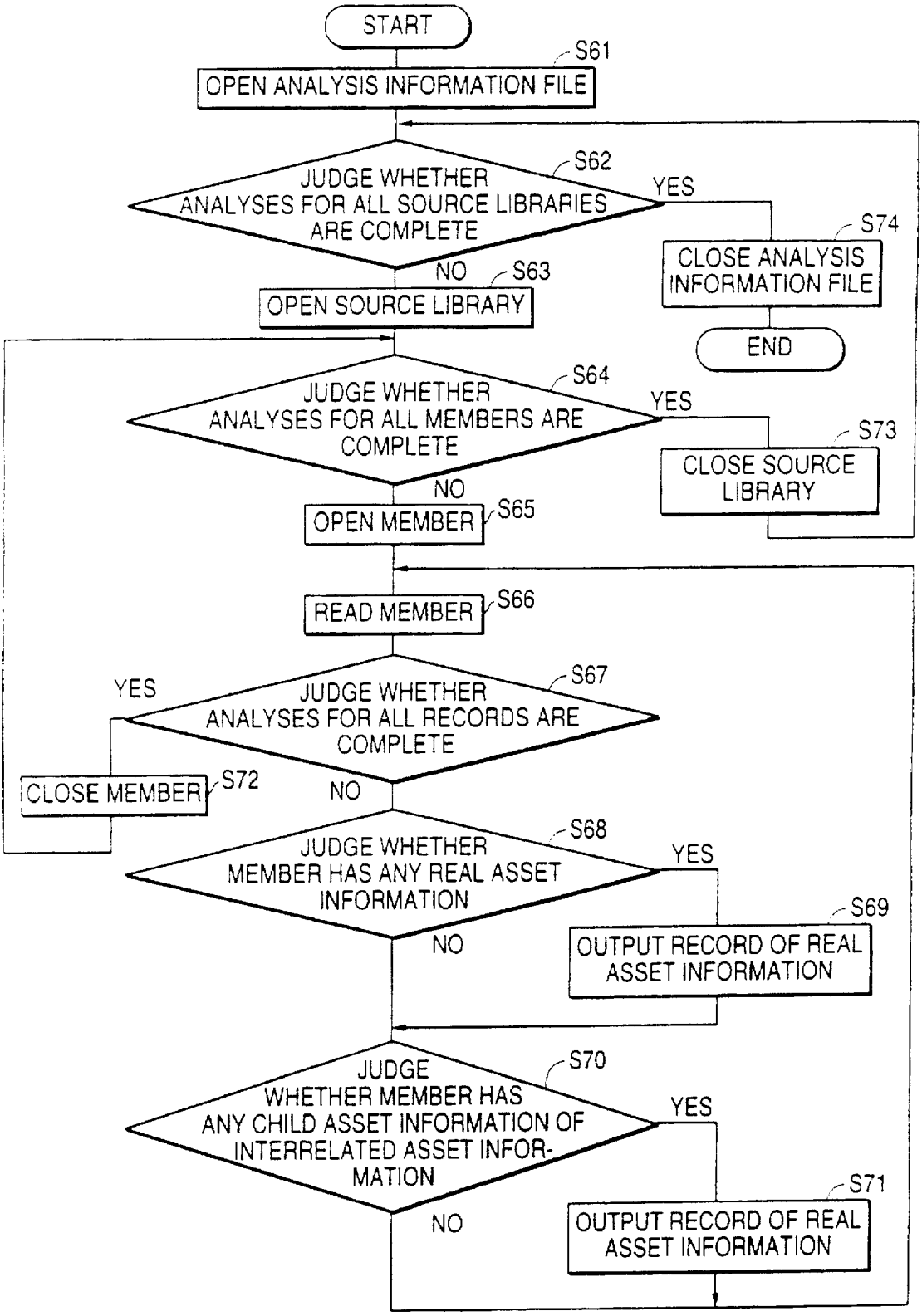
FIG. 19 is a flowchart of the analysis processes for obtaining the analysis results 50 and 58 shown in FIGS. 17 and 18.

FIG. 19 is a flowchart of the analysis processes for obtaining the analysis results 50 and 58 shown in FIGS. 17 and 18.

More specifically, the processes shown in FIG. 19 correspond to the pro shown in FIG. 16A-1, 16A-2 and 16A-3 by the asset existence analyzer 36 for outputting an interrelated asset record as child asset information and a real asset record as real asset information of basic asset information intermediate table 27d.

[START] On starting the process, the asset existence analyzer 36 invokes step S61.

S61: The asset existence analyzer 36 opens one [1] analysis information file storing a real asset record and an interrelated asset record, and continues to perform the process in step S62.

S62: The asset existence analyzer 36 judges whether or not analyses for all source libraries of the analysis information file opened in step S61 are complete. If it judges affirmatively [YES], it skips to perform the process in step S74. If it judges negatively [NO], it continues to perform the process in step S63.

S63: The asset existence analyzer 36 opens one [1] source library, and continues to perform process in step S64.

S64: The asset existence analyzer 36 judges whether or not analyses for all members of the source library opened in step S63 are complete. If it judges affirmatively [YES], it skips to perform the process in step S73. If it judges negatively [NO], it continues to perform the process in step S65.

S65: The asset existence analyzer 36 opens one [1] member, and continues to perform the process in step S66.

S66: The asset existence analyzer 36 reads the member opened in step S65, and continues to perform the process in step S67.

S67: The asset existence analyzer 36 judges whether or not analyses for all records are complete. If it judges affirmatively [YES], it skips to perform the process in step S72. If it judges negatively [NO], it continues to perform the process in step S68.

S68: The asset existence analyzer 36 judges whether or not the member read in step S67 has any real asset information. If it judges affirmatively [YES], it continues to perform the process in step S69. If it judges negatively [NO], it skips to perform the process in step S70.

S69: The asset existence analyzer 36 outputs the record of the real asset information detected in step S68, and continues to perform the process in step S70.

S70: The asset existence analyzer 36 judges whether or not the member read in step S67 has any child asset information of interrelated asset information. If it judges affirmatively [YES], it continues to perform the process in step S71. If it judges negatively [NO], it reverts to perform the process in step S66 in a loop form.

S71: The asset existence analyzer 36 outputs the record of the real asset information detected in step S70, and reverts to perform the process in step S66 in a loop form.

S72: The asset existence analyzer 36 closes the member, analyses for all records of which are judged to be complete in step S67, and reverts to perform the process in step S64 in a loop form.

S73: The asset existence analyzer 36 closes the source library, analyses for all members of which are judged to be complete in step S64, and reverts to perform the process in step S62 in a loop form.

S74: The asset existence analyzer 36 closes the analysis information file, analyses for all source libraries of which are judged to be complete in step S62, thereby ending all processes. [END]

The sort processes for obtaining the sort results 51 and 59 shown in FIGS. 17 and 18 are not explained here, because the sorting method is publicly known.

Figure 20A:
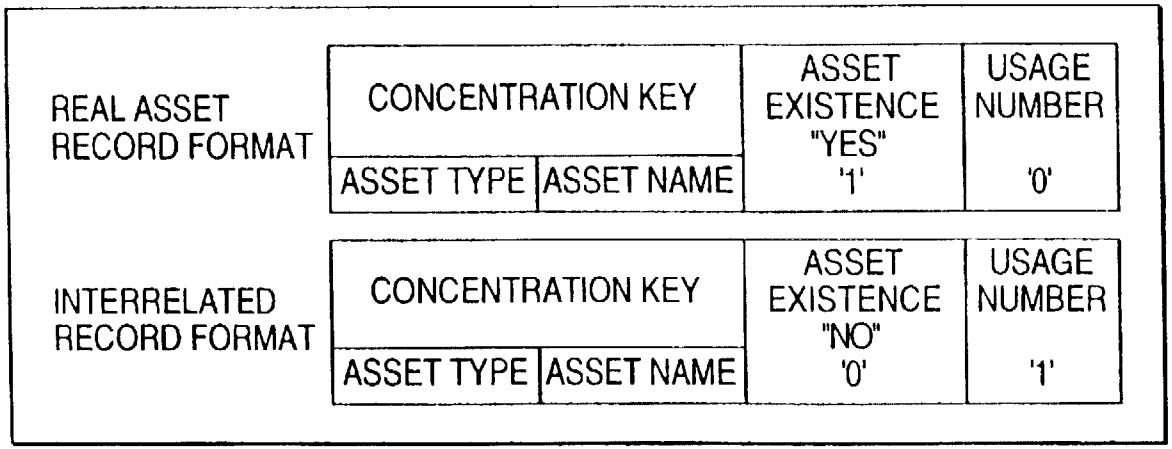
FIG. 20A shows record formats of a real asset and an interrelated asset.

FIG. 20A shows record formats of a real asset and an interrelated asset.

As with the description of concentration results 60 shown in FIG. 18, it is assumed here for simplicity that each record comprises an asset type, an asset name, an asset existence and a usage number.

It is further assumed that an asset type and an asset name are used as keys for concentrations of records. As with the records of basic asset information intermediate table 27d for real asset information shown in FIGS. 16A-1, 16A-2 and 16A-3, it is also assumed here that an asset existence and a usage number are unconditionally "YES" and "zero [0]". As with the records of basic asset information intermediate table 27d for interrelated asset information shown in FIGS. 16A-1, 16A-2 and 16A-3, it is also assumed here that an asset existence and a usage number are unconditionally "NO" and "one [1]".

Figure 20B:
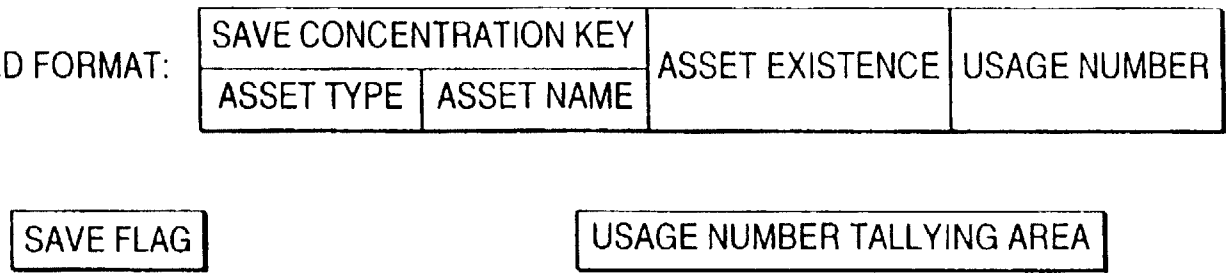
FIG. 20B shows a record format of a save area.

FIG. 20B shows a record format of a save area. (Refer to FIGS. 21A and 21B.)

A save area is for temporarily saving a record whose asset existence shows "NO". The record format of a save area is the same as those of a real asset and an interrelated asset shown in FIG. 21, except that save concentration key is used as a key for concentration of records. In addition to the record of this format, a record save area further comprises a usage number tallying area and a save flag. A save flag turns ON when a record exists in the save area and OFF when a record does not exist. A usage number tallying area is for counting the usage number of an interrelated asset as a child asset in the concentration processes.

Figure 20C:
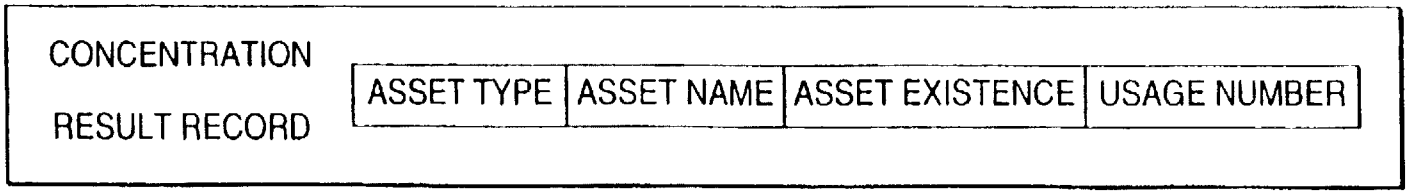
FIG. 20C shows a record format of a concentration information file.

FIG. 20C shows a record format of a concentration information file.

The record of a concentration information file is in a format in which only an asset type, an asset name, an asset existence and a usage number are extracted from a record of basic asset information 29a created by the asset existence analyzer 36.

Figure 21A:
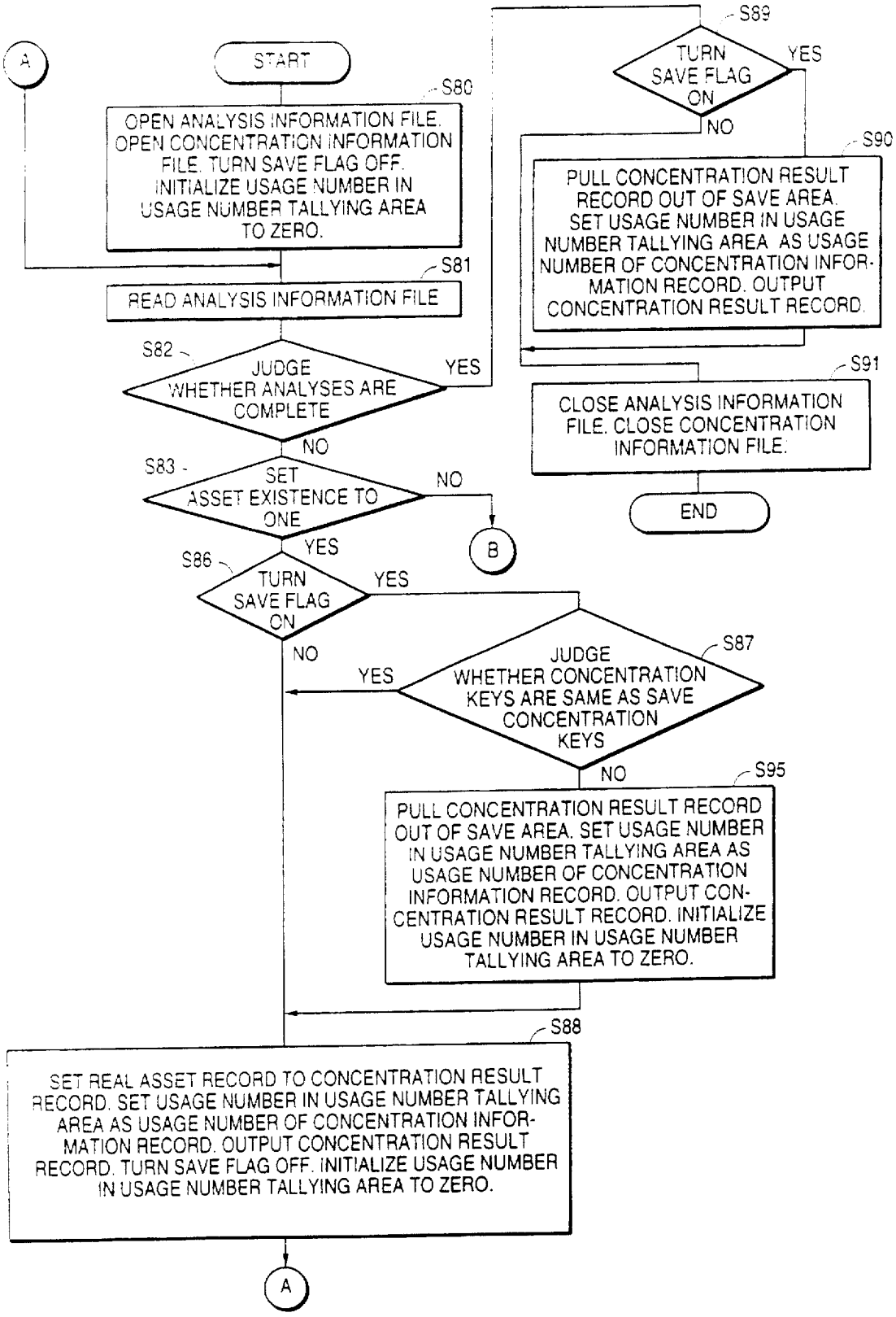
FIGS. 21A and 21B are flowchart of the concentration processes for obtaining the concentration results 52 and 60 shown in FIGS. 17 and 18.
Figure 21B:
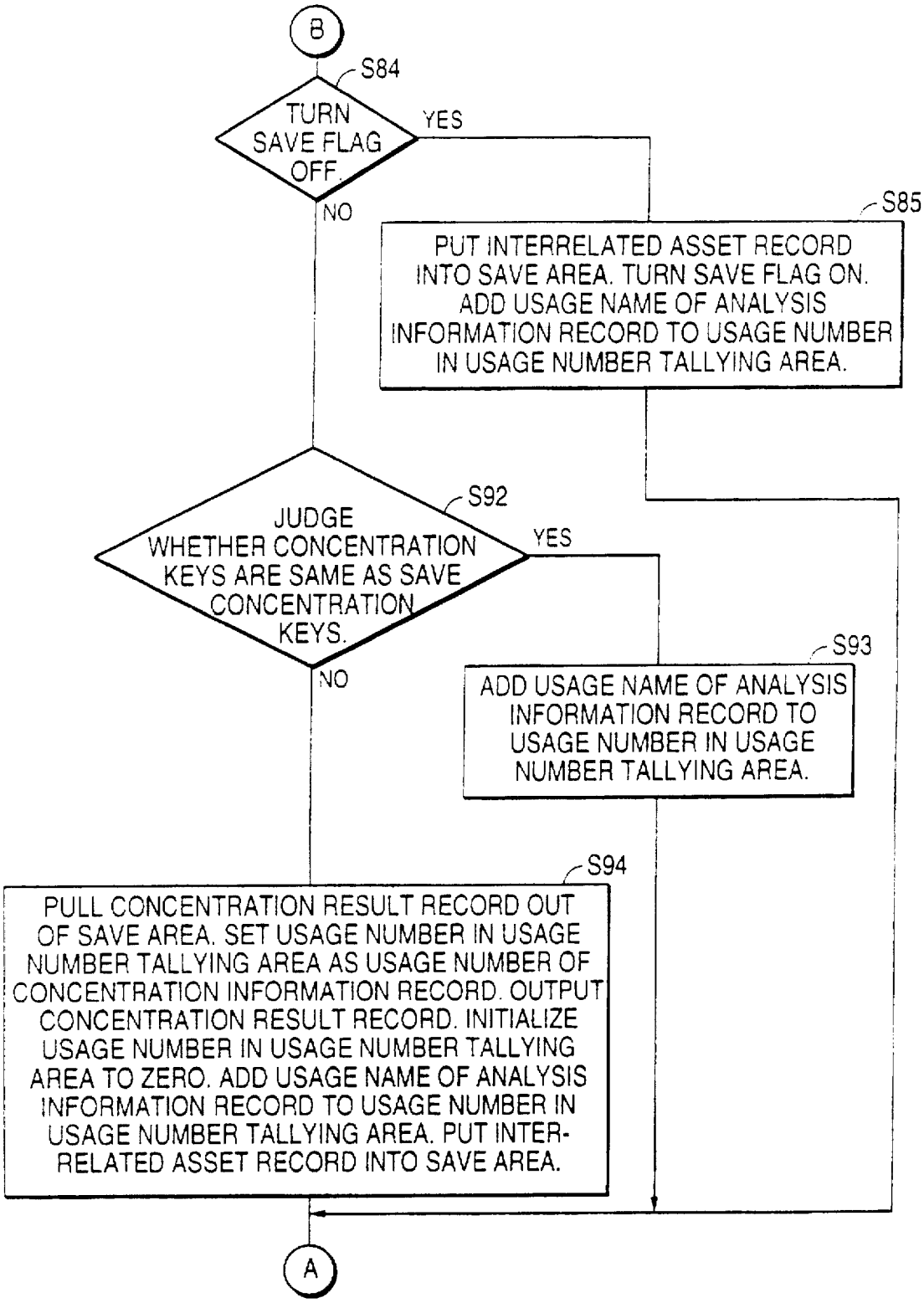

FIGS. 21A and 21B are flowchart of the concentration processes for obtaining the concentration results 52 and 60 shown in FIGS. 17 and 18.

More specifically, the processes shown in FIGS. 21A and 21B correspond to the processes shown in FIGS. 16A-1, 16A-2 and 16A-3 by the asset existence analyzer 36 for outputting an interrelated asset record as child asset information and a real asset record as real asset information of basic asset information intermediate table 27d.

[START] On starting the process, the asset existence analyzer 36 invokes step S80.

S80: The asset existence analyzer 36 opens one [1] analysis information file storing sorted records to be concentrated and one [1] concentration information file in which the records obtained as the concentration results are to be stored, turns save flag OFF, clears the value of the usage number tallying area to "zero [0]", and continues to perform the process in step S81.

S81: The asset existence analyzer 36 reads the analysis information file opened in step S80, and continues to perform process in step S82.

S82: The asset existence analyzer 36 judges whether or not the analysis information file opened in step S81 is complete, i.e. whether or not a record to be concentrated is absent. If it judges affirmatively [YES], i.e. if such a record is absent, it skips to perform the process in step S89. If it judges negatively [NO], i.e. if such a record is not absent, it continues to perform the process in step S83.

S83: The asset existence analyzer 36 judges whether or not asset existence of the record is "YES". If it judges affirmatively [YES], it skips to perform the process in step S86. If it judges negatively [NO], it continues to perform the process in step S84.

S84: The asset existence analyzer 36 judges whether or not the save flag is OFF, because the asset existence of this record is judged to be "NO" in step S83. If it judges affirmatively [YES], i.e. if the save flag is OFF, it continues to perform the process in step S85. If it judges negatively [NO], i.e. if the save flag is not OFF, it skips to perform the process in step S92.

S85: The asset existence analyzer 36 puts the interrelated asset record in the save area, turns the save flag ON, adds the usage number of the analysis result record to the usage numbers stored in the usage number tallying area, and reverts to perform the process in step S81 in a loop manner.

S86: The asset existence analyzer 36 judges whether or not the save flag is ON, because the asset existence of this record is judged to be "YES" in step S83. If it judges affirmatively [YES], i.e. if the save flag is ON, it continues to perform the process in step S87. If it judges negatively [NO], i.e. if the save flag is not ON, it skips to perform the process in step S88.

S87: The asset existence analyzer 36 judges whether or not the concentration keys of the currently processed record are the same as the save concentration keys. If it judges affirmatively [YES], it continues to perform the process in step S88. If it judges negatively [NO], it skips to perform the process in step S95.

S88: The asset existence analyzer 36 sets the real asset record in the concentration information file, because the concentration keys are the same as the save concentration keys. Also, the asset existence analyzer 36 sets the usage number stored in the usage number tallying area as the usage number of the concentration information record, outputs the concentration information record, turns the save flag OFF, clears the value in the usage number tallying area to zero [0], and reverts to the process shown in step S81 in a loop manner.

S89: The asset existence analyzer 36 judges whether or not the save flag is ON. If it judges affirmatively [YES], it continues to perform the process in step S90. If it judges negatively [NO], it skips to perform the process in step S91.

S90: The asset existence analyzer 36 pulls the concentration information record out of the save area, sets the usage number stored in the usage number tallying area as the usage number of the concentration information record, outputs the concentration information record, and continues to perform the process in step S91.

S91: The asset existence analyzer 36 closes the analysis information file and concentration information file opened in step S80, thereby ending all processes. [END]

S92: The asset existence analyzer 36 judges whether or not concentration keys are the same as the save concentration keys. If it judges affirmatively [YES], it continues to perform the process in step S93. If it judges negatively [NO], it skips to perform the process in step S94.

S93: The asset existence analyzer 36 adds the usage number of the concentration information record to the usage numbers stored in the usage number tallying area, and reverts to perform the process in step S81 in a loop form.

S94: The asset existence analyzer 36 pulls the concentration information record out of the save area, sets the usage number stored in the usage number tallying area as the usage number of the concentration information record, outputs the concentration information record, clears the value in the usage number tallying area to zero [0], adds the usage number of the concentration information record to the usage numbers stored in the usage number tallying area, sets the interrelated asset record in the save area, and reverts to perform the process in step S81 in a loop form.

S95: The asset existence analyzer 36 pulls the concentration information record out of the save area, sets the usage number stored in the usage number tallying area as the usage number of the concentration information record, outputs the concentration information record, clears the value in the usage number tallying area to zero [0], and continues to perform the process in step S88.

FIGS. 22A through 22D show a concrete example of the concentration processes explained in FIGS. 21A and 21B.

FIG. 22A shows a record format of a concentration information file.

In the following description, numbers in parentheses expresses the steps shown in FIGS. 21A and 21B.

The asset existence analyzer 36 opens an analysis information file and an concentration information file, turns the save flag OFF and initializes the value in the usage number tallying area to zero [0]. {S80}

The asset existence analyzer 36 reads the concentration information file shown in FIG. 22A. {S81}

The asset existence analyzer 36 reads record (i). [S82]

The asset existence analyzer 36 judges that the asset existence of record (i) is "NO". {S83}

The asset existence analyzer 36 judges that the save flag is OFF. {S84}

The asset existence analyzer 36 puts the interrelated asset, i.e. record (i), to the save area, turns the save flag ON, and adds the usage number stored in the analysis result record, which is one [1] in this case, to the usage number already stored in the usage number tallying area, which is zero [0] in this case and stores the sum, which is one [1] in this case, to the usage number tallying area as its updated value. {S85} At this time, the contents of the save concentration keys shown in FIG. 20B comprise "CPY" indicating the asset type of record (i) and "C1" indicating the asset name.

The asset existence analyzer 36 again reads the concentration information file shown in FIG. 22A. {S81}

Then, the asset existence analyzer 36 continues its processes for the next record by reading record (ii). {S82}

The asset existence analyzer 36 judges that its asset existence is "YES". {S83}

The asset existence analyzer 36 judges that its save flag is ON. {S86}

The asset existence analyzer 36 judges that the concentration keys of record (ii), which are CPY and C1, are the same as the save concentration keys. {S87}

The asset existence analyzer 36 sets the real asset record, which is record (ii) in this case, as the concentration information record of concentration results, sets the value in the usage number tallying area, which is one [1] in this case, as the usage number of the concentration information record. Then, the asset existence analyzer 36 outputs record (ii) as the concentration information record shown in FIG. 22B. Finally, the asset existence analyzer 36 turns the save flag OFF, and clears the value in the usage number tallying area to zero [0]. {S88}

The asset existence analyzer 36 again reads the concentration information file shown in FIG. 22A. {S81}

Then, the asset existence analyzer 36 continues its processes for the next record by reading record (iii). {S82 }

The asset existence analyzer 36 judges that its asset existence is "YES".{S83}

The asset existence analyzer 36 judges that its save flag is OFF. {S86}

The asset existence analyzer 36 sets the real asset record, which is record (iii) in this case, as the concentration information record of concentration results, sets the value in the usage number tallying area, which is one [1] in this case, as the usage number of the concentration information record. Then, the asset existence analyzer 36 outputs record (iii) as the concentration information record shown in FIG. 22C. Finally, the asset existence analyzer 36 turns the save flag OFF, and clears the value in the usage number tallying area to zero [0]. {S88}

The asset existence analyzer 36 again reads the concentration information file shown in FIG. 22A. {S81}

The asset existence analyzer 36 reads record (iv). {S82}

The asset existence analyzer 36 judges that the asset existence of record (iv) is "NO". {S83}

The asset existence analyzer 36 judges that the save flag is OFF. {S84}

The asset existence analyzer 36 puts the interrelated asset, i.e. record (iv), to the save area, turns the save flag ON, and adds the usage number stored in the analysis result record, which is one [1] in this case, to the usage number already stored in the usage number tallying area, which is zero [0] in this case and stores the sum, which is one [1] in this case, to the usage number tallying area as its updated value. {S88} At this time, the contents of the save concentration keys shown in FIG. 20B comprise "PGM" indicating the asset type of record (iv) and "P1" indicating the asset name.

The asset existence analyzer 36 again reads the concentration information file shown in FIG. 22A. {S81}

Then, the asset existence analyzer 36 continues its processes for the next record by reading record (v). {S82}

The asset existence analyzer 36 judges that its asset existence is "YES" {S83}

The asset existence analyzer 36 judges that its save flag is ON. {S86}

The asset existence analyzer 36 judges that the concentration keys of record (v) are the same as the save concentration keys. {S87}

The asset existence analyzer 36 sets the real asset record, which is record (v) in this case, as the concentration information record of concentration results, sets the value in the usage number tallying area, which is one [1] in this case, as the usage number of the concentration information record. Then, the asset existence analyzer 36 outputs record (v) as a concentration information record. Finally, the asset existence analyzer 36 turns the save flag OFF, and clears the value in the usage number tallying area to zero [0]. {S88} The usage number is one [1], because this is the value set for the previous record, i.e. record (iv). {S85}

The asset existence analyzer 36 again reads the concentration information file shown in FIG. 22A. {S81}

The asset existence analyzer 36 reads record (vi). {S82}

The asset existence analyzer 36 judges that the asset existence of record (vi) is "NO". {S83}

The asset existence analyzer 36 judges that the save flag is OFF. {S84}

The asset existence analyzer 36 puts the interrelated asset, i.e. record (vi), to the save area, turns the save flag ON, and adds the usage number stored in the analysis result record, which is one [1] in this case, to the usage number already stored in the usage number tallying area, which is zero [0] in this case and stores the sum, which is one [1] in this case, to the usage number tallying area as its updated value. {S85} At this time, the contents of the save concentration keys shown in FIG. 20B comprise "PGM" indicating the asset type of record (vi) and "P4" indicating the asset name.

The asset existence analyzer 36 again reads the concentration information file shown in FIG. 22A. {S81}

The asset existence analyzer 36 reads no more record. {S82}

The asset existence analyzer 36 judges that the save flag is ON. {S89} This is because the previous record, record (vi) turns the save flag ON. {S85}

The asset existence analyzer 36 pulls record (vi) from the save area as the concentration information record, sets the usage number stored in the usage number tallying area, which is one [1], as the usage number of the concentration information record, which is record (vi) in this case. {S90}

The asset existence analyzer 36 closes the analysis information file and the concentration information file. {S91}

Thus, the asset existence analyzer 36 consummates its concentration processes. [END]

FIG. 22D shows the contents of the concentration information file upon completing the concentration processes.

FIGS. 23A through 23E show another concrete example of the concentration processes explained in FIGS. 21A and 21B.

In the following description, which is mainly for emphasizing the differences from the example shown in FIGS. 22A through 22D, numbers in parentheses expresses the steps shown in FIGS. 21A and 21B.

The asset existence analyzer 36 opens an analysis information file and an concentration information file, turns the save flag OFF and initializes the value in the usage number tallying area to zero [0]. {S80}

The asset existence analyzer 36 reads the concentration information file shown in FIG 23A. {S81 }

The asset existence analyzer 36 reads record (a). {S82}

The asset existence analyzer 36 judges that the asset existence of record (iv) is "NO" {S83}

The asset existence analyzer 36 judges that the save flag is OFF. {S84}

The asset existence analyzer 36 puts the interrelated asset, i.e. record (a), to the save area, turns the save flag ON, and adds the usage number stored in the analysis result record, which is one [1] in this case, to the usage number already stored in the usage number tallying area which is zero [0] in this case and stores the sum, which is one [1] in this case, to the usage number tallying area as its updated value. {S85} At this time, the save flag comprises "CPY" indicating the asset type of record (a) and "C1" indicating the asset name of the same.

The asset existence analyzer 36 again reads the concentration information file shown in FIG. 23A. {S81}

The asset existence analyzer 36 reads record (b). {S82}

The asset existence analyzer 36 judges that the asset existence of record (b) is "NO". {S83}

The asset existence analyzer 36 judges that the save flag is ON. {S84}

The asset existence analyzer 36 judges that concentration keys of record (b) are the same as the save concentration keys. {S92}

The asset existence analyzer 36 adds the usage number of record (b), which is one [1], to the usage number, which is one [1] {S85}, stored in the usage number tallying area, thereby producing the sum whose value is two [2]. {S93}

The asset existence analyzer 36 again reads the concentration information file shown in FIG. 23A. {S81}

The asset existence analyzer 36 reads record (c). {S82}

The asset existence analyzer 36 judges that the asset existence of record (c) is "NO". {S83}

The asset existence analyzer 36 judges that the save flag is ON. {S84}

The asset existence analyzer 36 judges that concentration keys of record (c) are not the same as the save concentration keys. {S92}

The asset existence analyzer 36 pulls the concentration information record out of the save area, sets the usage number stored in the usage number tallying area as the usage number, which is two [2], of the concentration information record, which is record (c), outputs the concentration information record, which is record (a), as shown in FIG. 23B. Then, the asset existence analyzer 36 clears the usage number tallying area to zero [0], adds the usage number of the concentration information record, which is record (c), to the usage numbers stored in the usage number tallying area. Also, the asset existence analyzer 36 sets the interrelated asset record, which is record (c), in the save area. {S94}

The asset existence analyzer 36 again reads the concentration information file shown in FIG. 23A. {S81}

The asset existence analyzer 36 reads record (d). {S82}

The asset existence analyzer 36 judges that the asset existence of record (d) is "NO". {S83}

The asset existence analyzer 36 judges that its save flag of record (d) is ON. {S86}

The asset existence analyzer 36 compares the concentration keys of record (d) with the saved concentration keys. Because the concentration keys of record (d) are PGM and C2 and the saved concentration keys are PGM and C1, the asset existence analyzer 36 judges they are not the same. {S87}

The asset existence analyzer 36 pulls the concentration information record, which is record (c) in this case, out of the save area, sets the usage number stored in the usage number tallying area as the usage number, which is one [1] {S94}, of the concentration information record, which is record (c), as shown in FIG. 28C. The asset existence analyzer 36 outputs the concentration information record, and clears the value in the usage number tallying area to zero [0]. {S95}

The asset existence analyzer 36 sets the real asset record, which is record (d) in this case, as the concentration information record of concentration results, sets the value in the usage number tallying area, which is zero [0] in this case {S95}, as the usage number of the concentration information record. Then, the asset existence analyzer 36 outputs record (d) as a concentration information record. Finally, the asset existence analyzer 36 turns the save flag OFF, and clears the value in the usage number tallying area to zero [0]. {S88}

The asset existence analyzer 36 again reads the concentration information file shown in FIG. 23A. {S81}

The asset existence analyzer 36 reads no more record. {S82}

The asset existence analyzer 36 judges that the save flag is OFF. {S89}

The asset existence analyzer 36 closes the analysis information file and the concentration information file. {S91}

Thus, the asset existence analyzer 36 consummates its concentration processes. [END]

FIG. 23E shows the contents of the concentration information file upon completing the concentration processes.

So far, the sorting and concentration processes by the asset existence analyzer 36 shown in FIGS. 16A-1, 16A-2 and 16A-3 have been explained in detail. Thus, the asset existence analyzer 36 has filled in the spaces of the columns for the asset existences and usage numbers of the basic asset information 29a.

The asset existence analyzer 36 determines the contents stored in the spaces of the final column, i.e. the column for the identical asset existences, of the basic asset information 29a by the results of sorting records for the columns of the asset names, member names and library names in basic asset information intermediate table 27d. More specifically, the asset existence analyzer 36 fills in the corresponding space "YES(1)" when there is an asset whose asset name only is the same, "YES(2)" when there is an asset whose asset name and member name only are the same, "YES(3)" when there is an asset whose asset name and library name only is the same, and "NO" in all other cases. The basic asset information 29a represents the concentration results by using the asset names, member names and library names as the concentration keys.

FIGS. 24A and 24B are an explanatory chart of the list outputter 37 shown in FIG. 8.

More specifically, FIGS. 24A and 24B show the processes of outputting the output list 30 from the basic asset information 29a and the interrelated asset information 29b in the asset information 29 obtained as a finalized result by the asset existence analyzer 36 in the asset information analyzer 25.

Figure 25:
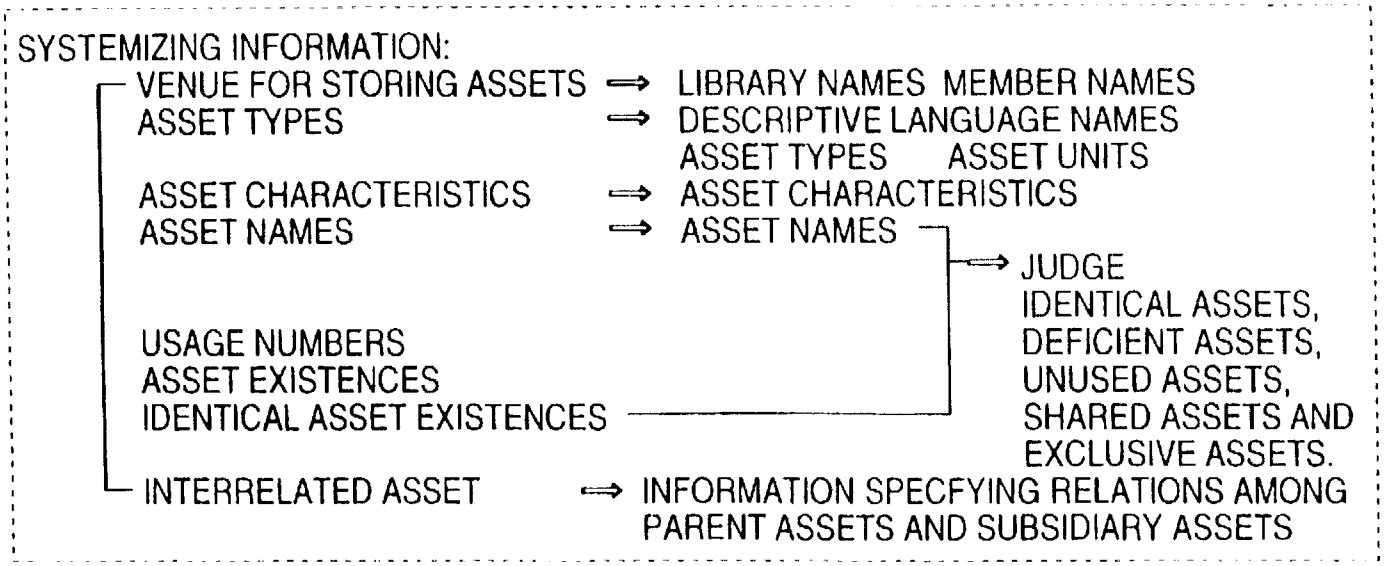
FIG. 25 is an explanatory chart of the systemizing information for the software assets 20.

FIG. 25 is an explanatory chart of the systemizing information for the software assets 20 obtained as a result of systemizing the basic asset information 29a and interrelated asset information 29b.

The list outputter 37 outputs the systemizing information. This information that specifies the library name for storing an asset are from the columns for the library names and member names, that specifies the asset types are from the columns for descriptive language names, asset types and asset units, that specifies the asset characteristics are from the column for asset characteristics, that specifies asset names are from the column for asset names, that specifies the identical assets, deficient assets, unused assets, common assets and private assets are from the columns for asset names, usage numbers, asset existences and identical asset existences. Further, the list outputter 37 obtains the systemizing information for the relations among parent assets and child assets, from the interrelated asset information 29b.

In FIGS. 24A and 24B and 25, the list outputter 37 outputs, as the systemizing information on asset types and asset characteristics, systemizing results for information whose asset existences are "YES" from the basic asset information 29a.

The list outputter 37 outputs the systemizing information for identical assets, deficient assets, unused assets, common (shared) asset and private assets all from the basic asset information 29a.

The list outputter 37 outputs systemizing information on identical assets for a record that has "YES" in the space at the intersection with the column for the asset existences and "YES(1)", "YES(2)" or "YES(3)" in the space at the intersection with the column for the identical asset existences.

The list outputter 37 outputs systemizing information on deficient assets for a record that has "NO" in the space at the intersection with the column for the asset existences and "zero [0]" in the space at the intersection with the column for the usage numbers.

The list outputter 37 outputs systemizing information on unused assets for a record that has "YES" in the space at the intersection with the column for the asset existences and "zero [0]" in the space at the intersection with the column for the usage numbers.

The list outputter 37 outputs systemizing information on common assets for a record that has "YES" in the space at the intersection with the column for the asset existences and "two [2]" or above in the space at the intersection with the column for the usage numbers.

The list outputter 37 outputs systemizing information on private assets for a record that has "YES" in the space at the intersection with the column for the asset existences and "one [1]" in the space at the intersection with the column for the usage numbers.

Finally, the list outputter 37 outputs the systemizing information on an asset interrelation by outputting the contents of the interrelated asset information 29b "as is" or by extracting some of the contents only from the necessary columns.

Figure 26:
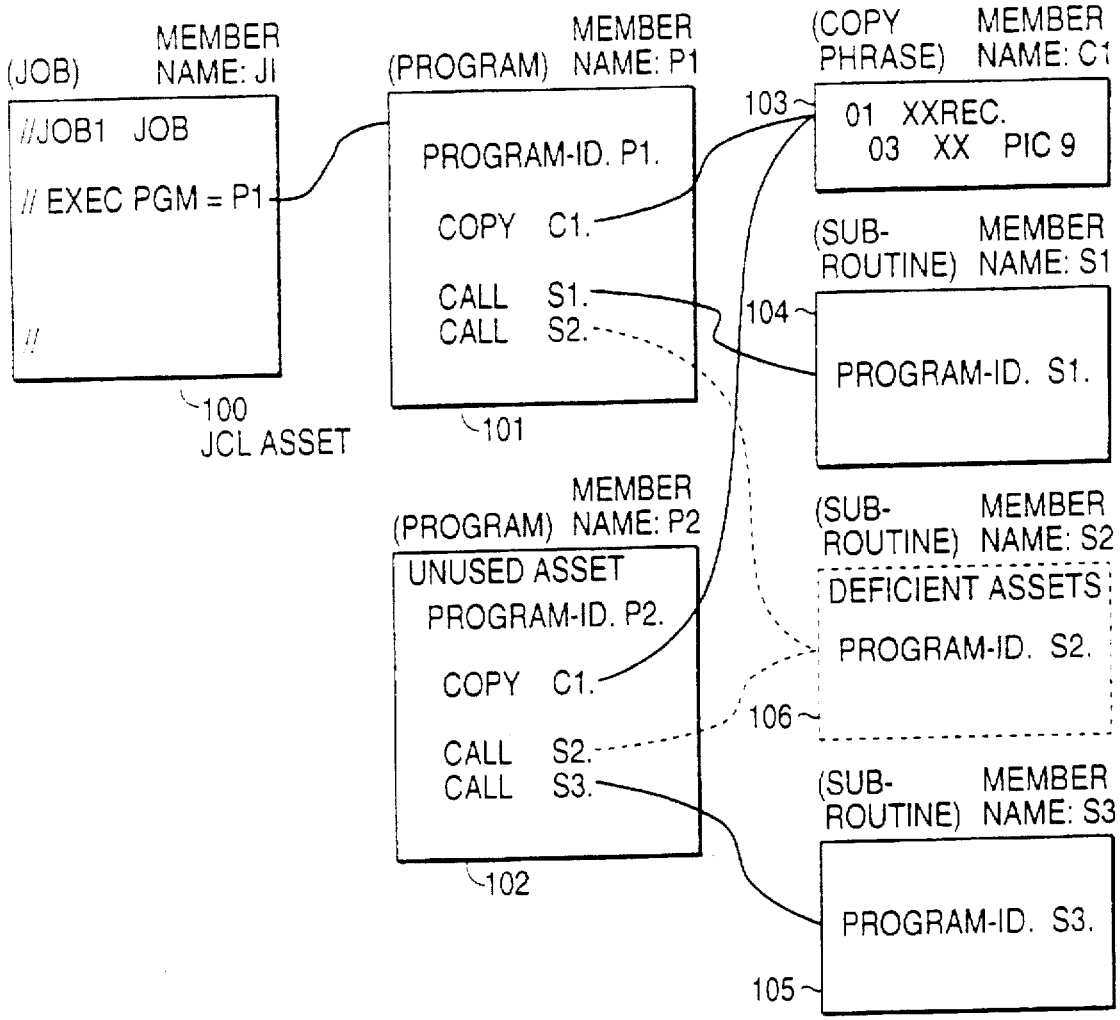
FIG. 26 explains an example of creating the output list 30 from software asset group by the list outputter 37 shown in FIG. 24.

FIG. 26 explains an example of creating the output list 30 from a software asset group by the list outputter 37 shown in FIGS. 24A and 24B.

The software asset group shown in FIG. 26 comprises a JCL asset 100, program assets 101 and 102, a copy phrase 103, and subroutines 104 and 105. It is assumed that a subroutine 106 does not initially.

Figure 27:
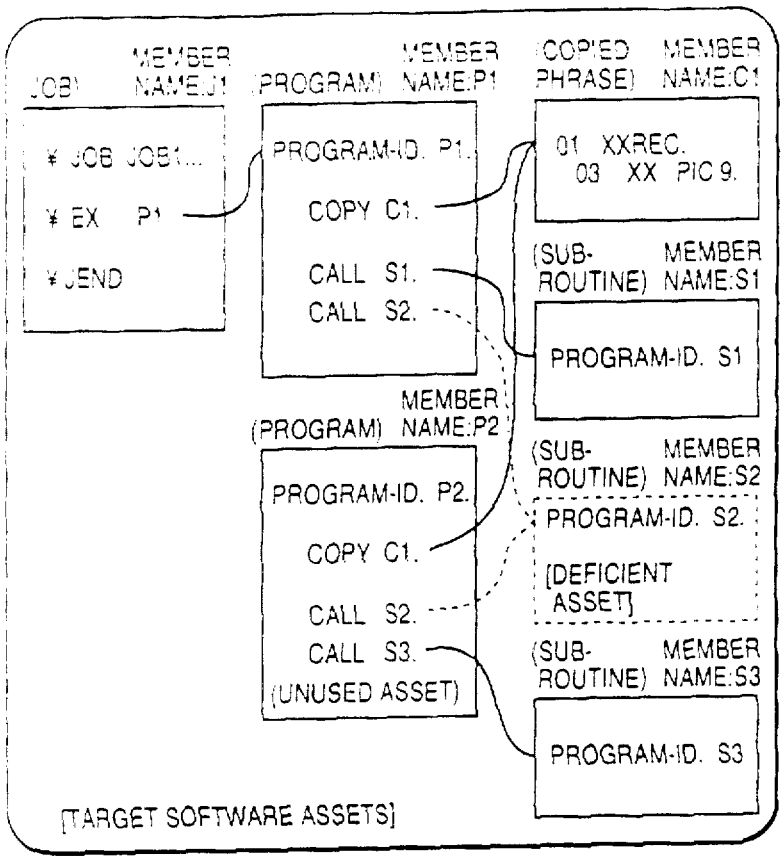
FIG. 27 shows an example of asset type information list outputted for the software asset group shown in FIG. 26.

FIG. 27 shows an example of asset type information list outputted for the software asset group shown in FIG. 26.

The software assets shown in the left hand side of FIG. 27 are arranged in a form being sorted by asset types. Even though the asset type classified information list shown in the right hand side of FIG. 27, contains the columns for the volume sequence numbers, record lengths, file organization and recording formats, those columns are usually inputted by external information, which does not directly related to this invention, their explanations are omitted here.

Figure 28:
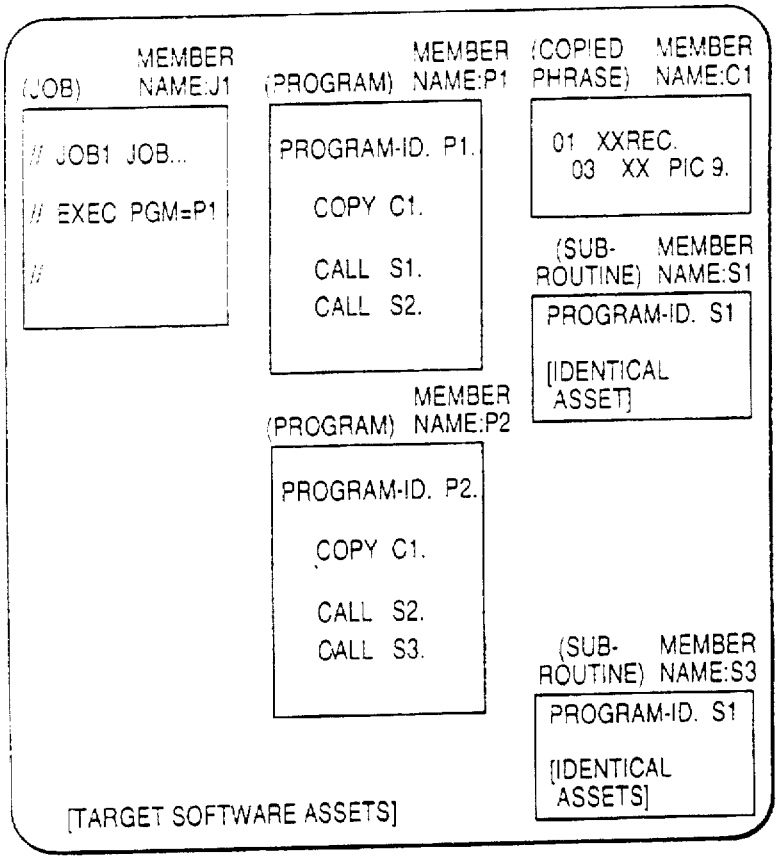
FIG. 28 shows an exemplary output of an identical asset checklist.

FIG. 28 shows an exemplary output of an identical asset checklist.

More specifically, FIG. 28 shows a checklist output example where subroutine 105 of the software asset group shown in FIG. 26 has S1 as the program identification name.

Figure 29:
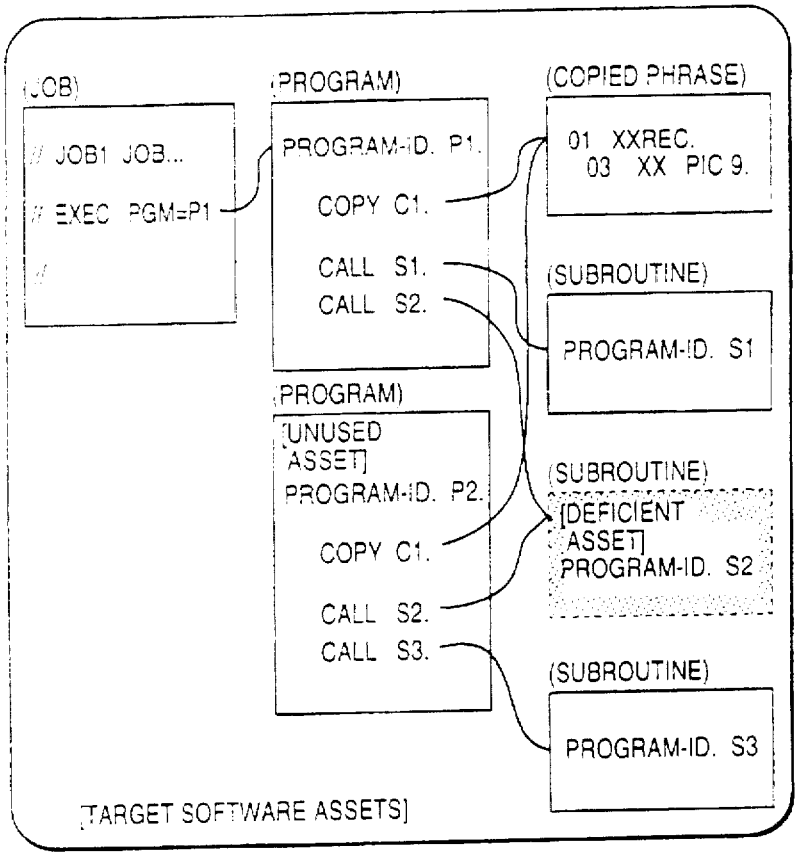
FIG. 29 shows an exemplary output of a deficient asset list.

FIG. 29 shows an exemplary output of a deficient asset list.

More specifically, FIG. 29 shows a deficient asset list for software asset group shown in FIG. 26. FIG. 28 illustrates a case, where program S2 is a deficient asset, and two [2] program P1 and P2 exist as parent assets of interrelated asset information directly using the deficient assets.

Figure 30:
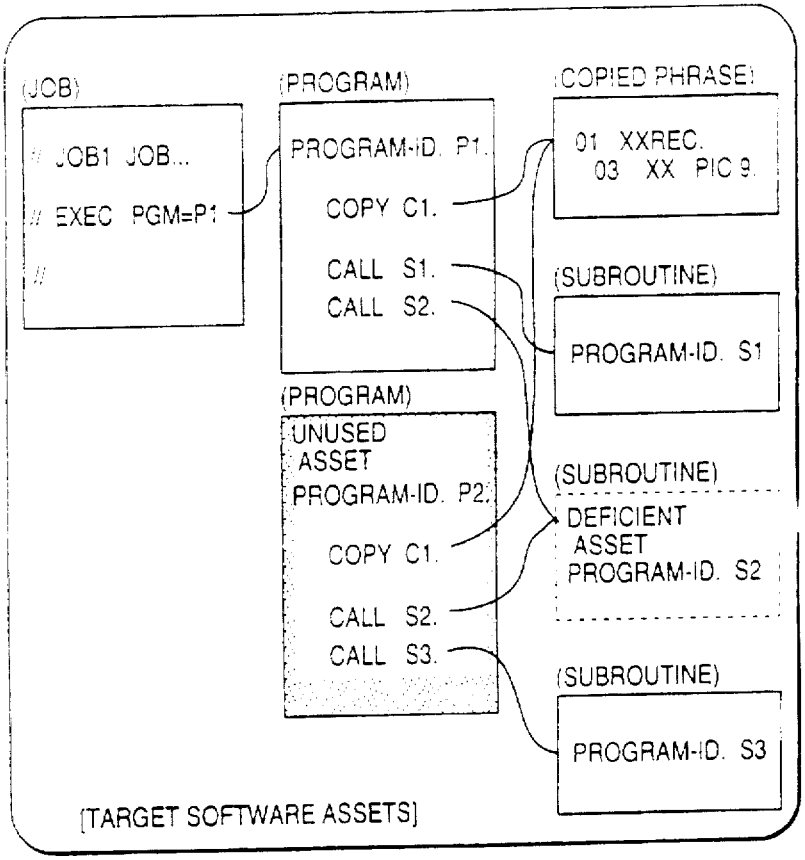
FIG. 30 shows an exemplary output of an unused asset list for the software asset group shown in FIG. 26.

FIG. 30 shows an exemplary output of an unused asset list for the software asset group shown in FIG. 26.

More specifically, FIG. 30 shows that program 102, i.e. P2, is an unused asset, and that programs S2 and S3, as well as copied phrase asset C1 exist as assets directly controlled by this unused asset, e.g. as child assets specified by interrelated asset information, where program S2 is a deficient asset.

Figure 31:
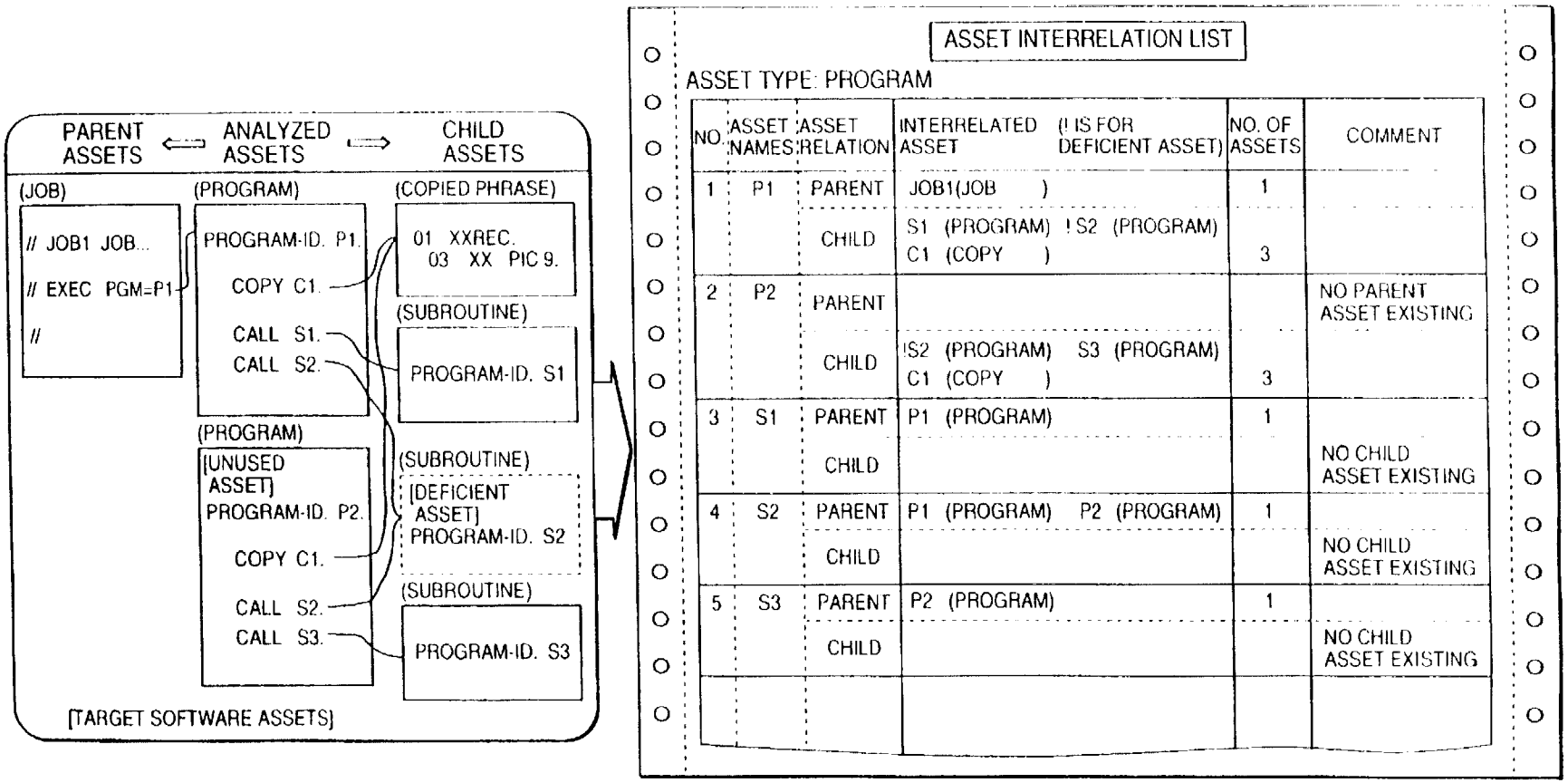
FIG. 31 shows an exemplary output of an asset interrelation list for the software asset group shown in FIG. 26.

FIG. 31 shows an exemplary output of an asset interrelation list for the software asset group shown in FIG. 26.

More specifically, FIG. 31 shows interrelated assets outputted in a list form for the assets, which are either asset types or programs. In this example, in which one [1] parent asset JOB1 exists as interrelated asset for program asset P1, and three [3] child assets, i.e. programs S1 and S2, as well as copy members C1, exist as child assets, where program S2 is a deficient asset.

FIGS. 32 through 35 show other exemplary output lists for unspecified target software asset groups.

FIG. 32 shows an asset glance list outputted in an easy-to-glance format classified by asset types.

The asset glance list shown in FIG. 32 allows a source library where concerned assets exist and characteristics of the concerned assets to be checked easily.

FIGS. 33A and 33B show an analysis information list for outputting information obtained by analyzing software assets.

Analysis information shown in FIGS. 33A and 33B comprises asset characteristics, supplementary information unique to each asset type, and interrelation information with other assets.

FIGS. 34A and 34B shows a job outline list for outputting information on an executed program among job assets, an AIM environment using the program, and so forth.

FIG. 35 shows an asset statistical list e.g. for outputting a result of tallying program asset characteristics.

The program asset characteristics shown in FIG. 35 allows the existences of main programs and subprograms, as well as the usages of copied phrases to be checked.

The methods of using those outputted lists are explained below.

Figure 36:
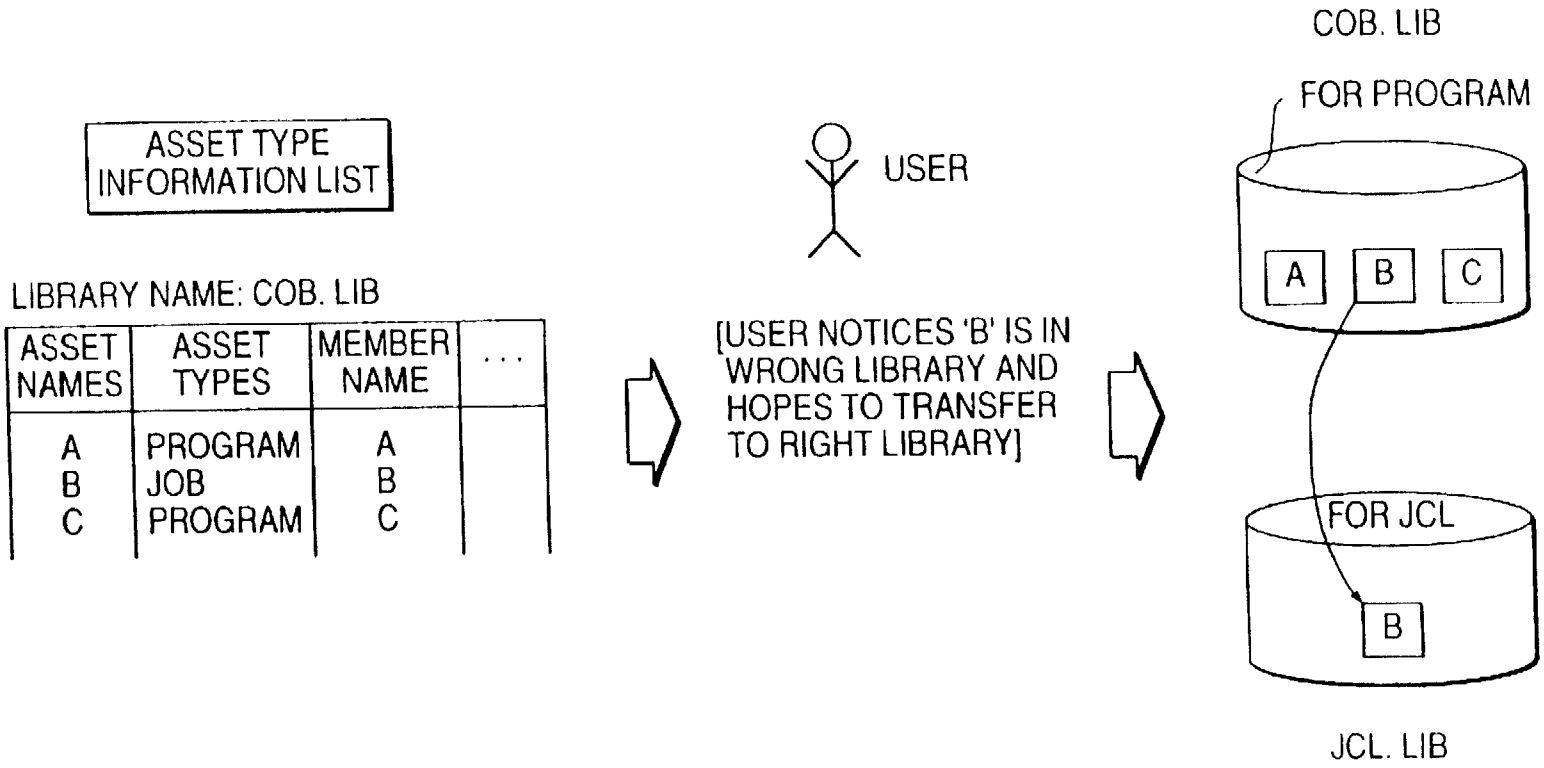
FIG. 36 shows an example of using asset type information list.

FIG. 36 shows an example of using asset type information list.

The asset type information list shown in FIG. 36 is used for systemizing venues for storing software assets by transferring assets stored in wrong libraries to correct libraries.

Figure 37:
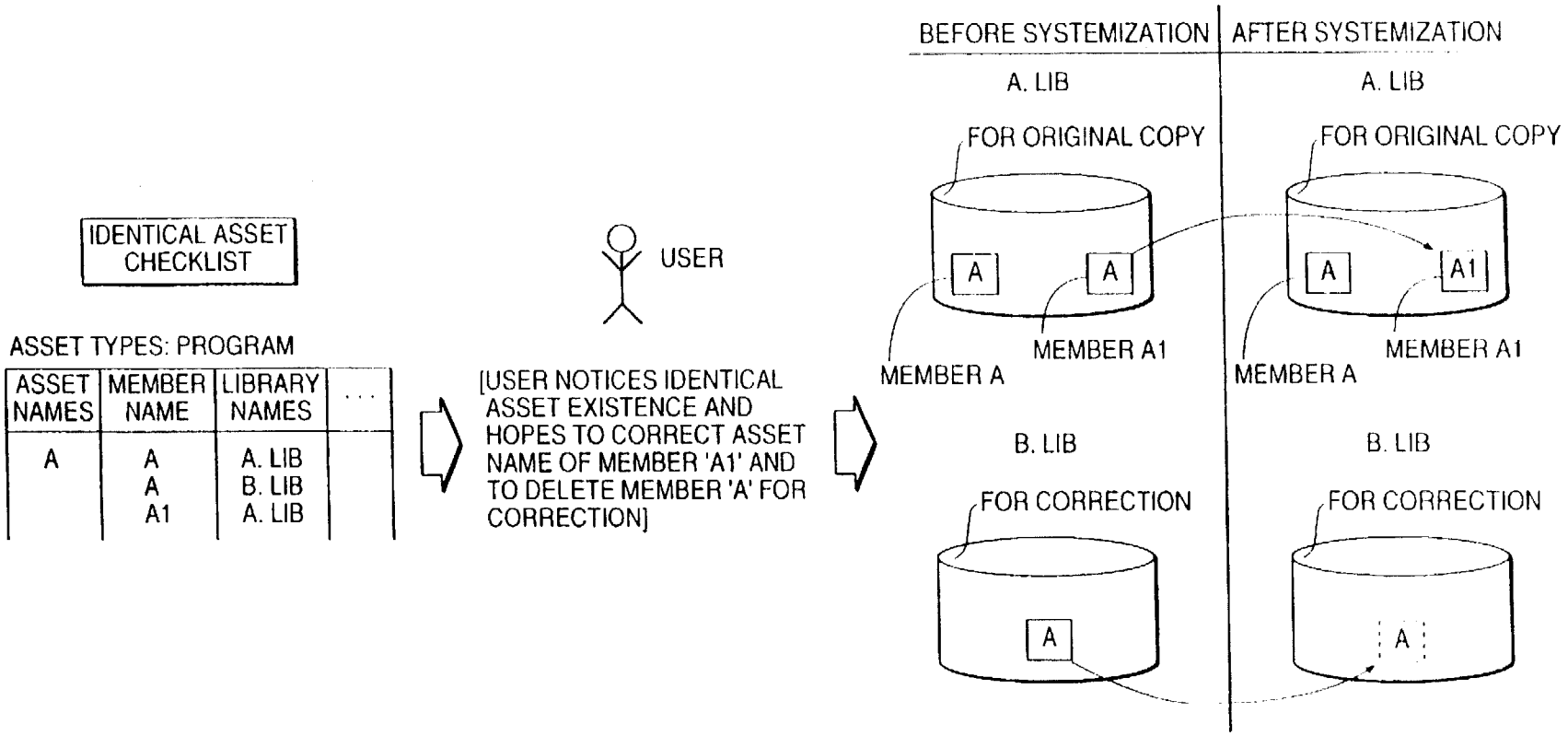
FIG. 37 shows an example of using an identical-asset checklist.

FIG. 37 shows an example of using an identical-asset checklist.

The identical-asset checklist shown in FIG. 37 is used for systemizing identical assets by deleting assets having identical names and by renaming them.

Figure 38:
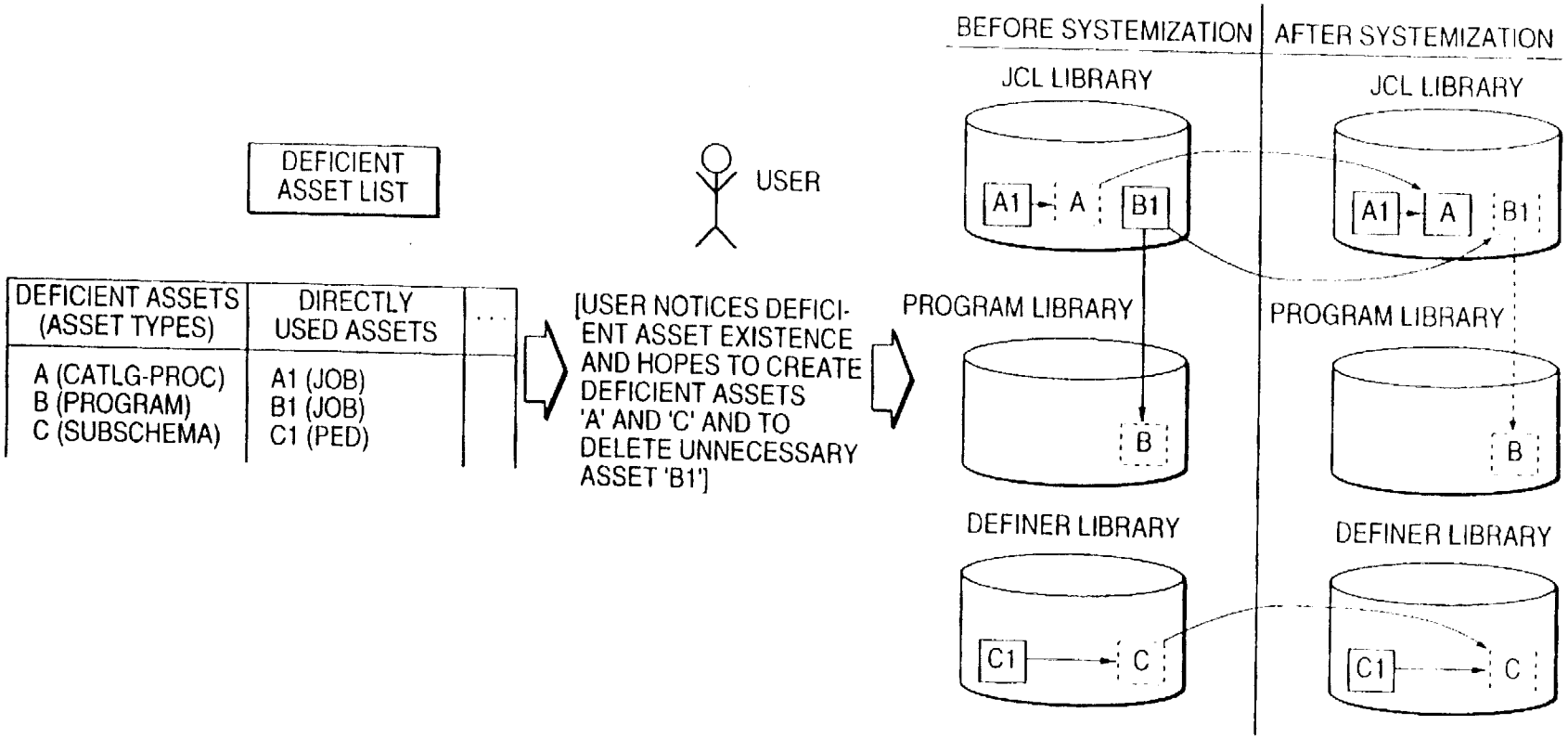
FIG. 38 shows an example of using a deficient-asset list.

FIG. 38 shows an example of using a deficient-asset list.

The deficient-asset list shown in FIG. 38 is used for systemizing deficient assets by adding deficient assets and by deleting unnecessary assets.

Figure 39:
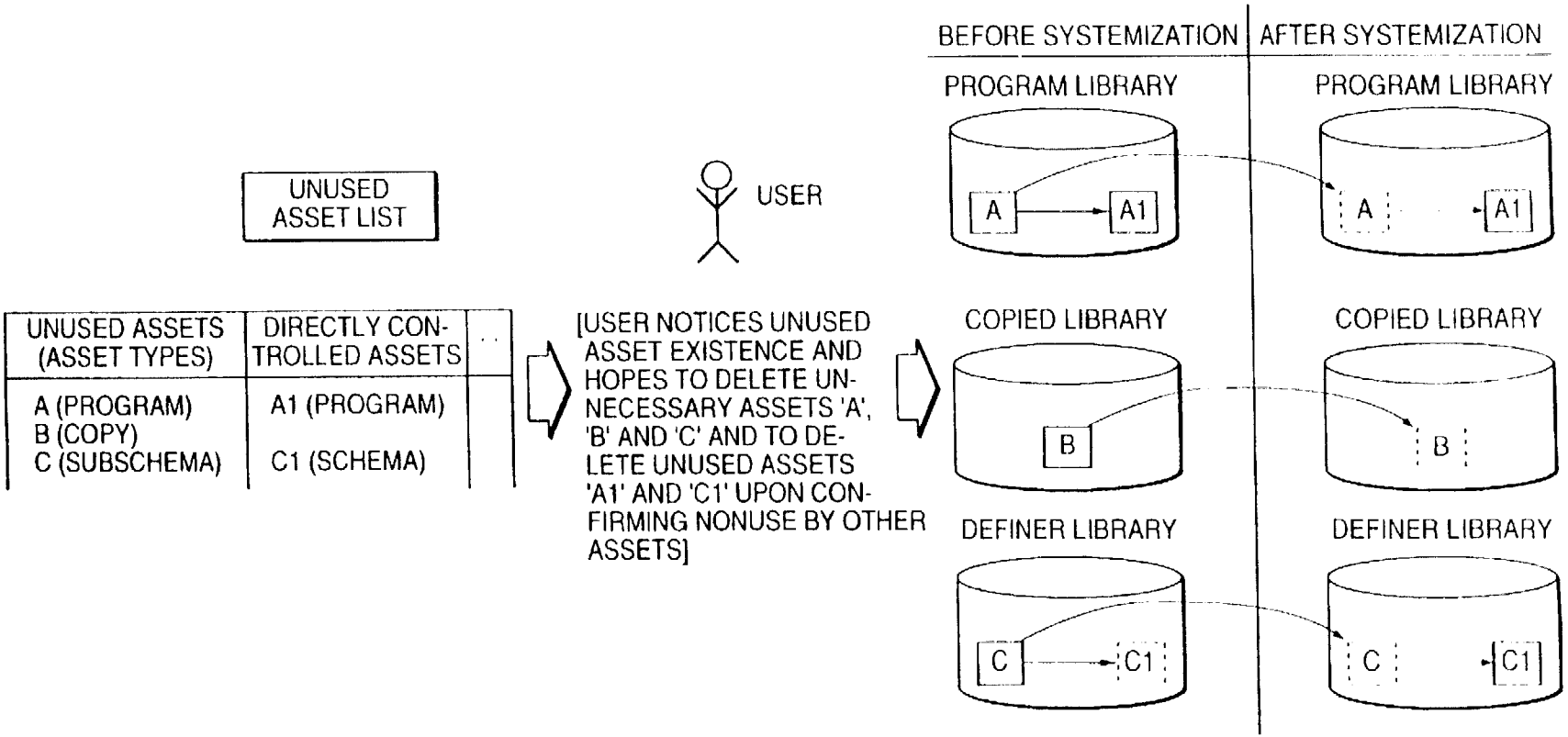
FIG. 39 shows an example of using an unused-asset list.

FIG. 39 shows an example of using an unused-asset list.

The unused-asset list shown in FIG. 39 is used for systemizing unused assets by deleting unused assets and by adding necessary assets.

Figure 40:
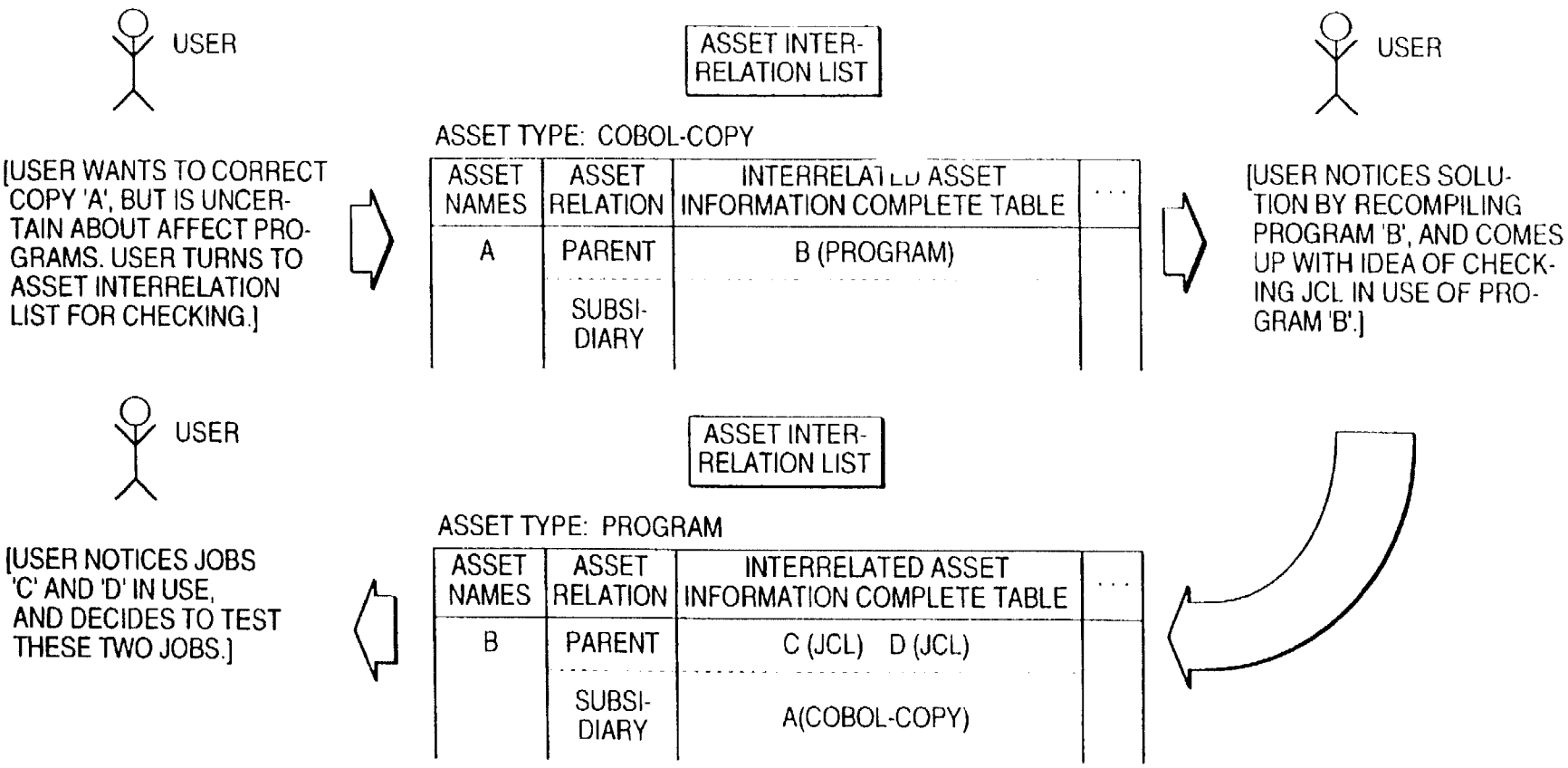
FIG. 40 shows an example of using an asset interrelation list.

FIG. 40 shows an example of using an asset interrelation list.

The asset interrelation list shown in FIG. 40 is used for finding the range affected by an asset change.

Figure 41:
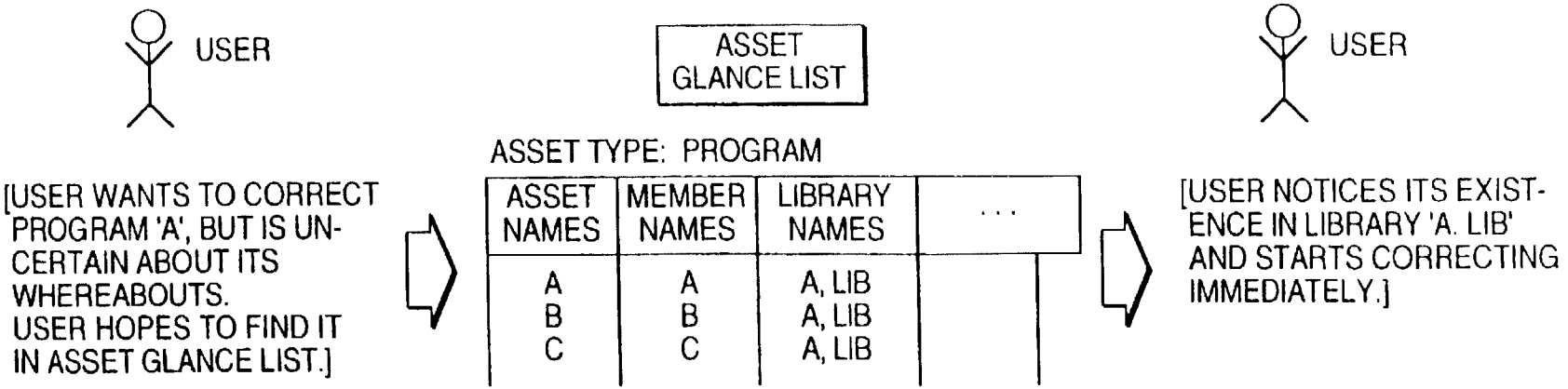
FIG. 41 shows an example of using an asset over view list.

FIG. 41 shows an example of using an asset glance list.

The asset glance list shown in FIG. 41 is used for finding which library stores a particular asset, i.e. for finding the venue for storing software assets.

Figure 42:
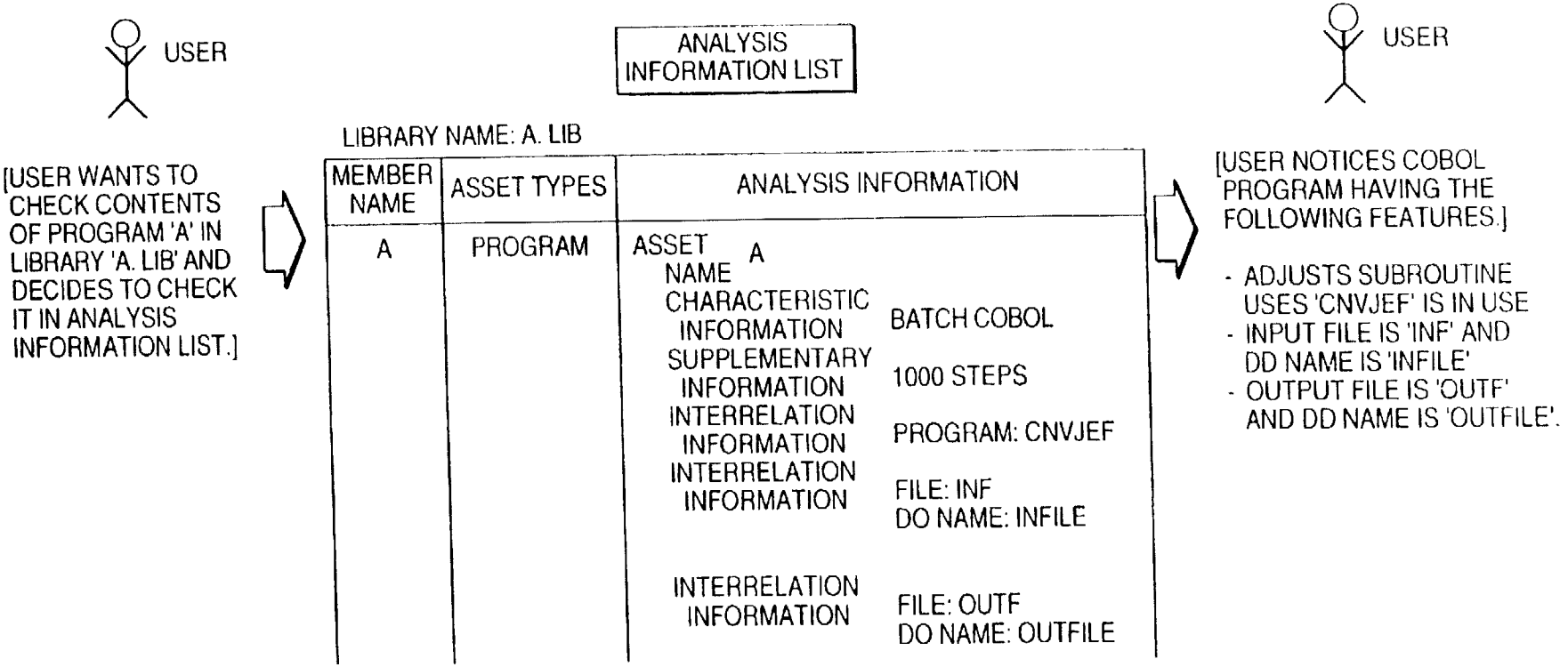
FIG. 42 shows an example of using an analysis information list.

FIG. 42 shows an example of using an analysis information list.

The analysis information list shown in FIG. 42 is used for checking the features of a particular asset. The ADJUST subroutine is for creating, updating and referencing a Japanese language dictionary in Japanese language software, such as JEF.

Figure 43:
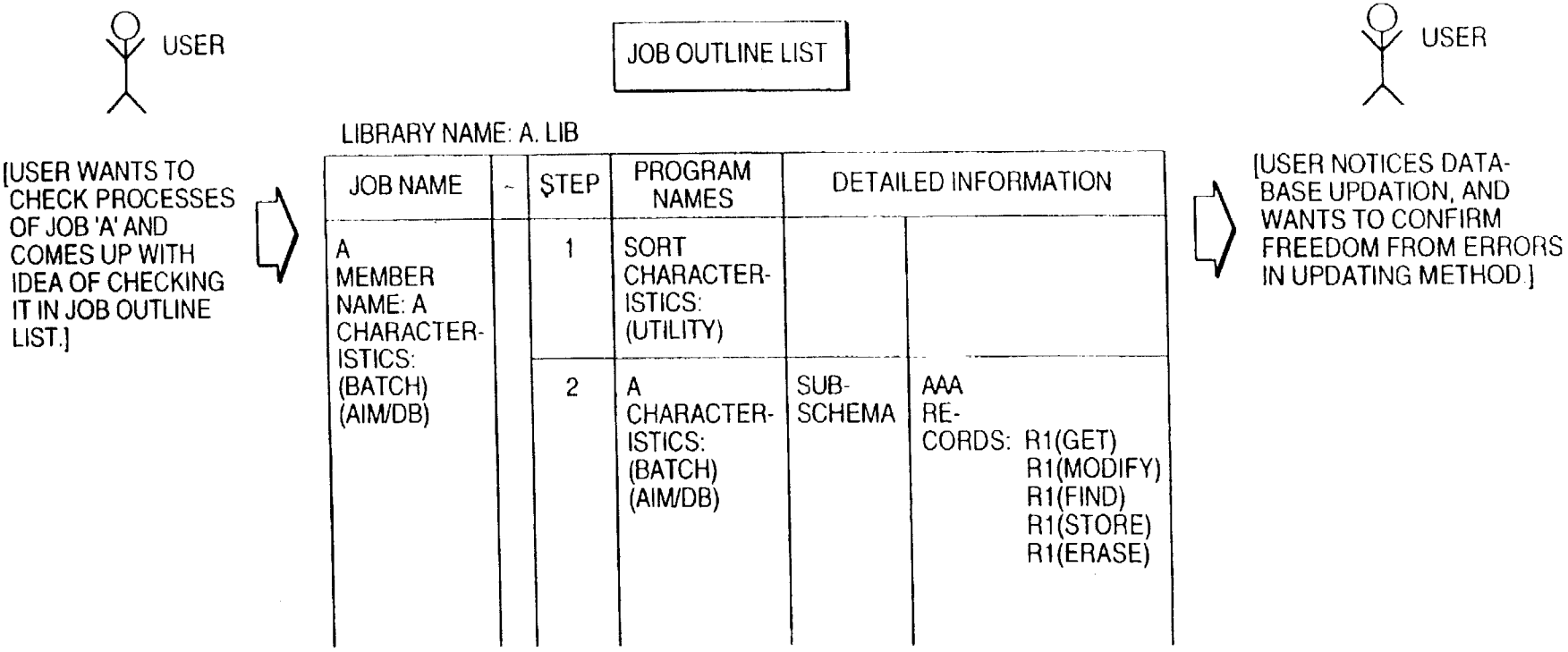
FIG. 43 shows an example of using a job outline list.

FIG. 43 shows an example of using a job outline list.

The job outline list shown in FIG. 43 is used for checking which process a particular job performs.

Figure 44:
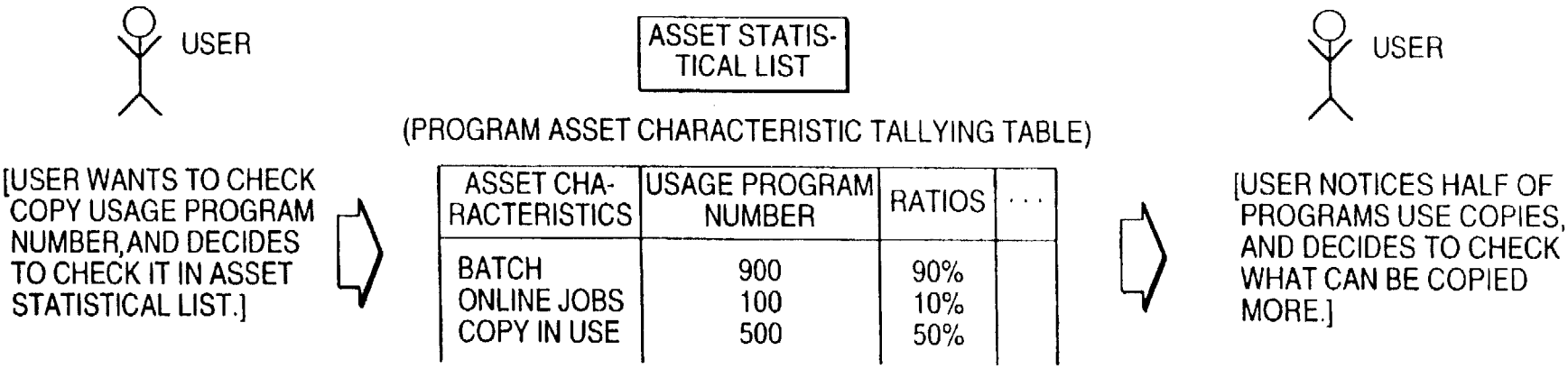
FIG. 44 shows an example of using an asset statistical list.

FIG. 44 shows an example of using an asset statistical list.

The asset statistical list shown in FIG. 44 is used for checking the overall features of software assets, e.g. ratios of programs for batch processing as asset characteristics.

Figure 45:
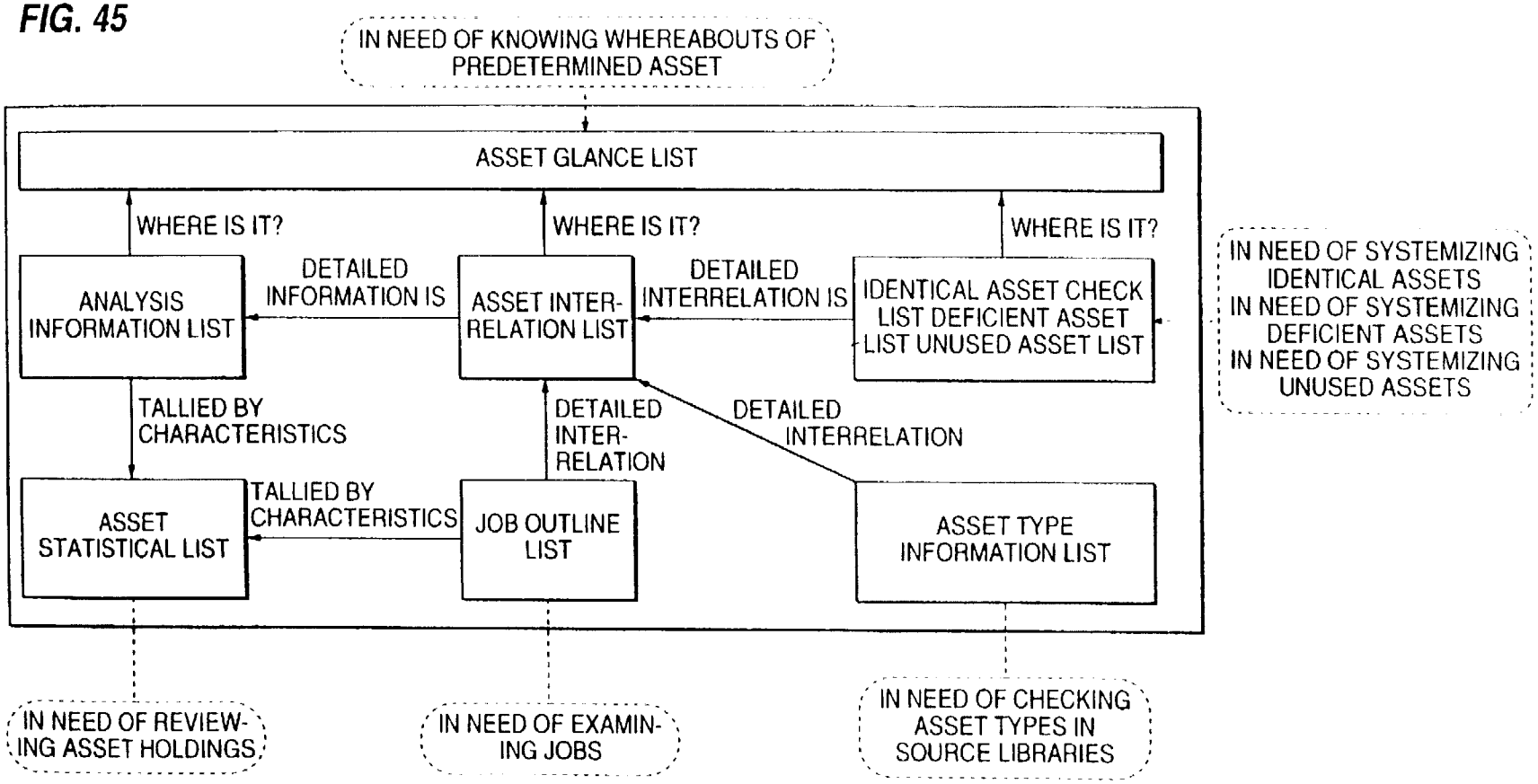
FIG. 45 shows relations among output lists.

FIG. 45 shows relations among output lists.

More specifically, FIG. 45 shows how more effective and detailed information can be obtained by using output lists of a software asset systemizer along the arrows.

As explained above in detail, this invention realizes a computer-based software asset systemizer capable of automatically analyzing the contents of software assets (asset information) and outputting in a table form systemizing information extracted as information necessary for systemizing information.

Thus, this invention offers a significant industrial advantage of efficiently producing precise information for systemizing software assets.

First, this invention enables software assets to be precisely identified and rated. This is because the criteria for judging various pieces of systemizing information, such as asset types, asset characteristics and asset existences, are uniform.

Second, this invention enables management supports for maintenances and software developments, such as systemization of scattered software assets and library management, to be made more efficiently. This is because this invention allows various pieces of systemizing information, such as asset types, asset characteristics and asset existences, of software assets to be identified and rated in a batch. Also, this invention can be applied to examinations and confirmations of various pieces of systemizing information, such as asset types, asset characteristics and asset existences, for splitting or merging software assets in case of a software conversion (transplant).

Third, this invention enables an environment to be realized, where the side-effects on other software assets are smoothly searched when software assets undergo maintenances, emergency corrections or debuggings. For instance, because this invention eliminates unused software assets, i.e. unnecessary assets, before registering or storing software assets in a dictionary, this invention allows effects to be searched only on effective asset information, thereby enabling maintenance side-effects to be efficiently analyzed. This is an advantage talking effect in an environment realized after software assets are systemized.

What is claimed is:

1. A software asset systemizing apparatus for systemizing existing software assets, comprising:

language determinant keyword storing means for storing keywords used to determine descriptive language names of software assets;

asset name analysis keyword storing means for storing keywords used to analyze asset names of said software assets;

characteristic information analysis keyword storing means for storing keywords used to analyze characteristics of said software assets;

interrelated asset analysis keyword storing means for storing keywords used to analyze interrelations among said software assets;

software asset analyzing means for analyzing said software assets using the contents stored in said language determinant keyword storing means asset name analysis key word storing means characteristic information analysis keyword storing means and interrelation asset analysis key word storing means;

intermediate asset information storing means for storing intermediate results obtained while said software sets are analyzed by said software asset analyzing means;

asset information storing means for storing, asset information for said software assets finalized results of said software assets analyzed by said software asset analyzing means; and asset systemizing information outputting means for outputting a systemized result obtained by systemizing said asset information stored in said asset information storing means.

2. The software asset systemizing apparatus as set forth in claim 1, wherein:

said language determinant keyword storing means comprises a language determinant keyword table;

said asset name analysis keyword storing means comprises an asset name analysis keyword table;

said characteristic information analysis keyword storing means comprises a characteristics analysis keyword table;

said interrelated asset analysis keyword storing means comprise an interrelated asset analysis keyword table;

said intermediate asset information storing means comprises a basic asset information intermediate table and an interrelated asset information intermediate table;

said asset information storing means stores said asset information which is composed of a basic asset information and an interrelated asset information;

said software asset analyzing means comprises an asset information analyzer which analyzes said software assets by using the contents stored in said language determinant keyword table, said asset name analysis keyword table, said characteristic information analysis keyword table and said interrelated asset analysis keyword table and by reflecting said intermediate results of said analyses in said basic asset information intermediate table and said interrelated asset information intermediate table said asset information analyzer also outputs as said finalized result of said analyses said basic asset information and said interrelated asset information; and said asset systemizing information outputting means comprises a systemizing information outputter for outputting an output indicating said systemizing result.

3. The software asset systemizing apparatus as set forth in claim 2, wherein:

said language determinant keyword table includes a plurality of records, and each of said records includes a descriptive language name determinant keyword and a column position, said column position indicating a storage position of said descriptive language name determinant keyword in said each record.

4. The software asset systemizing apparatus as set forth in claim 2, wherein:

said asset name analysis keyword table includes a plurality of records, and each of said records includes an asset name Iysis keyword indicating an analysis condition for the descriptive language name of the corresponding one of said software assets as determined by said language determinant keyword table, a column position indicating a storage system of said language determinant keyword, an asset name obtaining condition, an asset type as an analysis result indicating a distinction at least between a job program and an environment definer, and an asset unit indicating a more detailed distinction at least between said job program and said environment definer.

5. The software asset systemizing apparatus as set forth in claim 2, wherein:

said characteristic information analysis keyword table includes a plurality of records, and each of said records includes a characteristic information analysis keyword as an analysis condition for the descriptive language name of the corresponding one of said software assets as determined by said language determinant keyword table, a column position indicating the storage position of said language determinant keyword, and an asset characteristic indicating an operation and definitive distinction for a computer system at last among a batch processing, an online processing, a database processing, and a Japanese language processing.

6. The software asset systemizing analysis as set forth in claim 2, wherein:

said interrelated asset information analysis keyword table includes a plurality of record, and each of said records includes a descriptive language name of the corresponding one of said software assets as determined by said language determinant keyword table, an interrelated asset analysis keyword used for judging whether the corresponding one of said software assets is a parent asset having at least one child asset as an analysis condition corresponding to said type and asset unit analyzed by using said asset name analysis keyword table, and a column position indicating the storage position of said interrelated asset analysis keyword, as well as the descriptive language name, asset type and asset unit of a child asset for said parent asset, obtained as an analysis result.

7. The software asset systemizing apparatus as set forth in claim 2, wherein:

said basic asset information intermediate table reflecting said intermediate results of the analyses by said asset information analyzer includes a plurality of records, and each of said records includes the library name, member name, descriptive language name and asset name of the corresponding one of said software asset, an asset type as an analysis result indicating a distinction at least between a job program and an environment definer, an asset unit indicating a more detailed distinction at least between said job program and said environment definer, an asset existence, a usage number, an asset characteristic indicating an operational and definitive distinction for a computer system at least among a batch processing, an online processing, a database processing and a Japanese language processing, and an identical asset existence.

8. The software asset systemizing apparatus as set forth in claim 2, wherein:

said interrelated asset information intermediate table reflecting said intermediate results of analyses performed by said asset information analyzer, in conjunction with said basic asset information intermediate table, includes a plurality of records, and each of said records includes:

the library name, member name asset name, asset type, asset unit and asset existence of a parent asset for the interrelated one of said software assets; and the asset name, asset type, asset unit, descriptive language name and asset existence of a child asset for said parent asset.

9. The software asset systemizing apparatus as set forth in claim 2, wherein:

said basic asset information complete table outputted as the finalized result of the analyses by said asset information analyzer includes a plurality of records, and each of said records include the same contents as said contents of each record stored in said basic asset information intermediate table.

10. The software asset systemizing apparatus as set forth in claim 2, wherein:

said interrelated asset information outputted as a finalized result by said asset information analyzer includes a plurality of records, and each of said records includes all of said contents of each record stored in said interrelated asset information intermediate table except said asset existence for said parent asset and said asset existence for said child asset.

11. A software at systemizing apparatus for systemizing existing software assets, comprising:

asset information analyzer means for analyzing software assets and generating a corresponding analyzed result; and systemizing information outputter means for systemizing said analysis result and for outputting a systemizing result, said asset information analyzer means comprising:

descriptive language name determiner means for determining the descriptive language names of said software assets by using a language determinant keyword table storing keywords for determining descriptive language names of said software assets, and for outputting a first basic asset information intermediate table reflecting the determined result;

asset name analyzer means for analyzing the asset names of said software a by using said first basic asset information intermediate table and an asset name analysis keyword table storing keywords for analyzing asset name of and software assets, and for outputting a second basic asset information intermediate table reflecting the analyzed result;

asset characteristic analyzer means for analyzing the characteristics of said software assets by using said second basic asset information intermediate table and a characteristic information analysis keyword table storing keywords for analyzing characteristics of said software assets, and for outputting a third basic asset information intermediate table reflecting the analyzed result;

interrelation analyzer means for analyzing the interrelations among said software assets by using said third basic asset information intermediate table and an interrelated asset analysis keyword table storing keywords for analyzing interrelations among said software assets, and for outputting a first interrelated asset information intermediate table reflecting the determined result;

asset type determiner means for determining the asset types of said software assets by using said third basic asset information intermediate table and said first interrelated asset information intermediate table, and for outputting a fourth basic asset information intermediate table and a second interrelated asset information intermediate table reflecting the determined result; and asset existence analyzer means for analyzing the existences of said software assets by using said fourth basic information intermediate table and said second interrelated asset information intermediate table, and for outputting a basic asset information and an interrelated asset information reflecting the analyzed result, and said systemizing information outputter means comprising:

list outputter means for outputting an output list showing the systemizing result for said software assets by using said basic asset information and said interrelated asset information.

12. The software asset systemizing apparatus as set forth in claim 11, wherein said descriptive language name determiner means in said asset information analyzer means includes means for setting:

the library names and member names of said software assets into the respective columns for the henry names and the member names in said first basic asset information intermediate table;

the determined descriptive language names into the column for the descriptive language names when said descriptive language name determiner means can determine them, and nothing into the column for the descriptive language names when said descriptive language name determiner means cannot determine a descriptive language name;

"YES" unconditionally into the column for the asset existences; and

"zero[0]" unconditionally into the column for the usage numbers.

13. The software asset systemizing apparatus as set forth in claim 11, wherein said asset name analyzer means in said asset information analyzer means includes means for setting:

said analyzed results obtained by said asset name analyzer means into the columns for the asset names, the asset types and the asset units of said first basic information intermediate table in which said descriptive language name determiner means fills library names, member names, descriptive language names, asset existences and usage numbers; and the member names "as is" into the column for the asset names for outputting said second basic asset information intermediate table, when said descriptive language name determiner means cannot analyze the asset names.

14. The software asset systemizing apparatus as set forth in claim 11, wherein said asset characteristic analyzer means in said asset information analyzer means includes means for setting:

the asset characteristics obtained as said analysis result by said asset characteristic analyzer means into the columns for the library names, the member names, descriptive language names, asset names, asset types, asset units, asset existences and usage numbers in said second basic information intermediate table to which said analyzed result obtained by said asset name analyzer means has been set; and nothing into the corresponding column for a record, when said asset characteristic analyzer means cannot analyze asset characteristics.

15. The software asset systemizing apparatus as set forth in claim 11, wherein said interrelation analyzer means in said asset information analyzer means includes means for setting:

contents stored in the columns of said third basic asset information intermediate table respectively into the corresponding columns for the same of parent assets in said fist interrelated asset information intermediate table, which said interrelation analyzer means determines to have a child asset;

said analyzed result by said interrelation analyzer means into the columns for the asset types, the asset units and the descriptive language names, the asset names obtained correspondingly to said interrelated asset analysis keywords in said interrelated asset analysis keyword table into the columns for the asset and "NO" unconditionally into the columns for asset existences, among the columns for the child assets of said fist interrelated asset information intermediate table; and contents stored in the columns for descriptive language names and the asset types supplementarily by comparison of the corresponding columns, into the columns for the same of the parent assets in said first interrelated asset information intermediate table.

16. The software asset systemizing apparatus as set forth in claim 11, wherein said asset type determiner means said asset information analyzer means includes means for setting:

contents stored in the columns for the descriptive language names, the asset types and the set units of said third basic asset information intermediate table into the columns for the same of said first interrelated asset information intermediate table for child assets, and vise verse, for such ones of said software assets in said third basic asset information intermediate table whose contents stored in the column for the asset names matching those in said first interrelated asset information intermediate table for child assets, thereby outputting, as said fourth basic asset information intermediate table for real asset information the basic asset information intermediate table obtained by the above mutual supplmentation;

contents stored in the columns for the asset names, the asset types the asset units the descriptive language names and the asset existences for the child assets in said first interrelated asset information intermediate table after said mutual supplementation "as is" and unconditionally "one[1]" as the usage number into the corresponding columns of said fourth basic asset information intermediate table for interrelated asset information as child asset information for its outputting; and contents stored in the column for asset units of said third basic asset information intermediate table into said first interrelated asset information intermediate table, if contents stored in the columns for the library names, the member names, the descriptive language names, the asset names and the asset types of said third basic asset information intermediate table are determined, by comparison, to be the same as those in the corresponding columns of said first interrelated asset information intermediate table for parent assets for such ones of said software assets in said third basic asset information intermediate table whose contents stored in the columns for the library names the member names, the descriptive language names, the asset names and the asset types matching those in said first interrelated asset information intermediate table for parent assets, thereby outputting, as said second interrelated asset information intermediate table for real asset information, the basic asset information intermediate table obtained by the above supplementation.

17. The software asset systemizing apparatus as set forth in claim 11, wherein said asset existence analyzer means in said asset information analyzer means includes means for:

sorting and concentrating said software assets by using asset names, member names and library names as sorting/concentrating keys by using child asset information of interrelated asset information and real asset information of said basic asset information in said fourth basic asset information intermediate table;

setting contents stored in the columns for the library names member names, descriptive language names, asset names, asset types, asset characteristics and asset units of the basic asset information complete table for the concentrated software assets in the contents stored in the corresponding columns of said fourth basic asset information intermediate table;

setting "YES" for the existing assets for the column of asset and "NO" for the nonexisting software assets, as well as the numbers of using child assets into the column for the usage numbers;

setting "YES(1)" into the column for the identical asset when only the asset names of software assets are identical "YES(2)" into the column for the same when only the asset names and member, names of software assets are identical, "YES(3)" when asset names and library names of software assets are identical and "NO" in an other cases, thereby outputting the basic asset information complete table; and setting the contents of all columns except for asset existences in parent assets and child asset of said second interrelated asset information intermediate table "as is" into said interrelated asset information complete table, for its outputting.

18. The software asset systemizing apparatus as set forth in claim 17, wherein:

said sorting and concentrating means in said asset existence analyzer means uses asset names as sorting and concentrating keys when said software assets include asset names and uses both asset types and asset names as sorting and concentrating keys when said software assets include both asset names and asset types.

19. The software asset systemizing apparatus as set forth in claim 18, wherein the asset existence analyzer means includes means for:

(a) opening one [1] analysis information file storing sorted records to be concentrated and one [1] concentration information file in which the records obtained as the concentration results are to be stored, turning save flag OFF, clearing the value of the usage number tallying area to "zero[0]", and then performing function (b);

(b) reading the analysis information file opened by function (a), and then performing function (c);

(c) determining whether or not the analysis information file opened in function (a) is complete, said analysis information opened file being complete if a record to be concentrated is absent, and if determined affirmatively [YES], function (j) is then performed, and if determined negatively[NO], function (d) is then performed;

(d) determining whether or not asset existence of the record is "YES", if determined affirmatively[YES], function (g) is then performed, and if determined negatively[NO], function (e) is then performed;

(e) determining whether or not the save flag is OFF, if determined affirmatively[YES], function (f) is then performed, and if determined negatively[NO], function (m) is then performed;

(f) putting the interrelated asset record in the save area, turning the save flag ON, adding the usage number of the analysis result record to the usage numbers stored in the usage number tallying area, and then performing function (b) in a loop form;

(g) determining whether or not the save flag is ON, if determined affirmatively[YES], function (h) is then performed, if determined negatively[NO], function (i) is then performed;

(h) determining whether or not the concentration keys of the currently processed record are the same as the save concentration keys, if determined affirmatively[YES], function (i) is then performed, if determined negatively [NO], function (p) is then performed;

(i) setting the real asset record in the concentration information file, the concentration keys being the same as the save concentration keys, setting the usage number stored in the usage number tallying area as the usage number of the concentration information record, outputting the concentration information record, turning the save flag OFF, clearing the value in the usage number tallying area to zero [0], and then performing function (b) in a loop form;

(j) determining whether or not the save flag is ON, if determined affirmatively[YES], function (k) is then performed, if determined negatively[NO], function (l) is then performed;

(k) retrieving the concentration information record out of the save area, setting the usage number stored in the usage number tallying area as the usage number of the concentration information record, outputting the concentration information record, and then performing function (l);

(l) closing the analysis information file and concentration information file opened by function (a), thereby ending all further functions by said asset existence analyzer means;

(m) determining whether or not concentration keys are the same as the save concentration keys, if determined affirmatively [YES] function (n) is then performed, if determined negatively[NO], function (o) is then performed;

(n) adding the usage number of the concentration information record to the usage numbers stored in the usage number tallying area, and then performing function (b) in a loop form;

(o) retrieving the concentration information record out of the save area, setting the usage number stored in the usage number tallying area as the usage number of the concentration information record, outputting the concentration information record, clearing the value in the usage number tallying area to zero [0], adding the usage number of the concentration information record to the usage numbers stored in the usage number tallying area, setting the interrelated asset record in the save area, and then performing function (b) in a loop form; and (p) retrieving the concentration information record out of the save area, setting the usage number stored in the usage number tallying area as the usage number of the concentration information record, outputting the concentration information record, clearing the value in the usage number tallying area to zero [0], and then performing function (i).

20. The software asset systemizing apparatus as set forth in claim 11, wherein:

said list outputter means in said systemizing information outputter means includes means for outputting as said output list, an asset statistical list showing the result of statistically processing all of said software assets, a job outline list showing the summary of the job assets in said software assets, analysis information list showing the results of analyzing the asset features an asset glance list showing all of said software assets, an asset interrelation list showing the unused assets among said software assets, a deficient asset list showing the non-existing asset among said software as an identical asset checklist showing identical assets existing in said software assets and n asset type information list showing said software assets classified by asset types.

*21. A software asset systemizing apparatus for systemizing existing software assets, comprising:*

*language determinant keyword storing means for storing keywords used to determine descriptive language names of software assets;*

*asset name analysis keyword storing means for storing keywords used to analyze asset names of said software assets;*

*interrelated asset analysis keyword storing means for storing keywords used to analyze interrelations among said software assets; and*

*software asset analyzing means for analyzing said software assets using the contents stored in said language determinant keyword storing means, said asset name analysis key word storing means and said interrelated asset analysis key word storing means.*

* * * * *